(12) United States Patent
Sheldon-Coulson et al.

(10) Patent No.: US 10,634,113 B2
(45) Date of Patent: Apr. 28, 2020

(54) INERTIAL WATER COLUMN WAVE ENERGY CONVERTER

(71) Applicant: LONE GULL HOLDINGS, LTD., Portland, OR (US)

(72) Inventors: Garth Alexander Sheldon-Coulson, Portland, OR (US); Brian Lee Moffat, Portland, OR (US); Daniel William Place, Portland, OR (US)

(73) Assignee: LONE GULL HOLDINGS, LTD., Los Angeles, DE (US)

( * ) Notice: Subject to any disclaimer, the term of this patent is extended or adjusted under 35 U.S.C. 154(b) by 0 days.

(21) Appl. No.: 16/234,295

(22) Filed: Dec. 27, 2018

(65) Prior Publication Data

US 2019/0203689 A1 Jul. 4, 2019

Related U.S. Application Data

(60) Provisional application No. 62/613,260, filed on Jan. 3, 2018, provisional application No. 62/614,419, filed on Jan. 7, 2018.

(51) Int. Cl.
*F03B 13/24* (2006.01)
*H02K 5/04* (2006.01)
(Continued)

(52) U.S. Cl.
CPC ............ *F03B 13/24* (2013.01); *F03B 13/142* (2013.01); *H02K 5/04* (2013.01); *H02K 7/183* (2013.01);
(Continued)

(58) Field of Classification Search
USPC ...................................................... 290/42, 53
See application file for complete search history.

(56) References Cited

U.S. PATENT DOCUMENTS 3,064,137 A * 11/1962 Corbett, Jr. ........... F03B 13/142
290/42
3,925,986 A 12/1975 Barwick
(Continued)

FOREIGN PATENT DOCUMENTS

FR 2476759 A1 8/1981

OTHER PUBLICATIONS https://www.researchgate.net/publication/319650357 Latching and Peak-Power Control of an Oscillating Water Column Based on a Discontinuous Galerkin Method.
(Continued)

*Primary Examiner* — Pedro J Cuevas
(74) *Attorney, Agent, or Firm* — Fulwider Patton LLP

(57) ABSTRACT

Disclosed is a novel device that converts some of the power in ocean waves into electrical power or other means of performing useful work. One or more tubes are arranged so that when the device is in position in a body of water, the tubes are oriented vertically with one end positioned proximate to and/or above the surface of the body of water on which the device floats, and with the other end positioned below the surface of that body of water. In some embodiments, through a differential restriction on the flow of air in and out of an upper end of the tube, the average height of the water inside the tube is different from the average height of the water outside the tube. In some embodiments, a hollow void inside a flotation structure of the embodiment is filled with water to contribute significant mass to the embodiment and increase the momentum associated with its vertical oscillations. Additional elements of the present disclosure include features that protect the device from damage during periods of large waves, and facilitate the powering and cooling of computers and/or other electronic equipment operated therein.

25 Claims, 34 Drawing Sheets

(51) Int. Cl.
*H02K 7/18* (2006.01)
*F03B 13/14* (2006.01)

(52) U.S. Cl.
CPC ..... *F05B 2240/133* (2013.01); *F05B 2240/40* (2013.01); *F05B 2240/93* (2013.01); *F05B 2240/95* (2013.01); *F05B 2250/141* (2013.01); *F05B 2270/18* (2013.01)

(56) References Cited

U.S. PATENT DOCUMENTS

| | | | | |
|---|---|---|---|---|
| 4,009,396 A * | 2/1977 | Mattera | ............... | F03B 13/1805 290/42 |
| 4,078,382 A * | 3/1978 | Ricafranca | ............. | F01D 5/141 290/53 |
| 4,271,668 A * | 6/1981 | McCormick | ......... | F03B 13/142 415/68 |
| 4,286,347 A * | 9/1981 | Modisette | ............. | F03B 13/142 290/42 |
| 4,341,959 A * | 7/1982 | Ambli | .................. | F03B 13/147 290/42 |
| 4,383,413 A * | 5/1983 | Wells | ................... | F03B 13/142 60/398 |
| 4,441,316 A * | 4/1984 | Moody | ................ | F03B 13/142 415/7 |
| 4,622,473 A * | 11/1986 | Curry | ................... | F03B 13/187 290/1 R |
| 4,719,754 A * | 1/1988 | Nishikawa | ............ | F03B 13/142 417/100 |
| 5,005,357 A * | 4/1991 | Fox | ...................... | F03B 13/142 416/140 |
| 5,027,000 A * | 6/1991 | Chino | .................. | F03B 13/142 290/42 |
| 5,186,822 A * | 2/1993 | Tzong | .................. | B01D 61/10 210/122 |
| 5,191,225 A * | 3/1993 | Wells | ................... | E02B 9/08 290/42 |
| 5,770,893 A * | 6/1998 | Youlton | ............... | F03B 13/142 290/42 |
| 6,194,791 B1 * | 2/2001 | Wells | ................... | F03B 13/142 290/53 |
| 6,216,455 B1 * | 4/2001 | Doleh | .................. | F03B 13/148 290/53 |
| 6,953,328 B2 * | 10/2005 | Welch, Jr. | ............ | F04B 35/004 417/331 |
| 7,355,298 B2 * | 4/2008 | Cook | ................... | F03B 13/148 290/53 |
| 7,525,213 B2 * | 4/2009 | Nagata | ................. | F03B 13/142 290/53 |
| 7,728,453 B2 * | 6/2010 | Evans | .................. | F03B 13/148 290/53 |
| 7,816,797 B2 * | 10/2010 | Nair | ..................... | H01L 41/125 290/42 |
| 7,830,032 B1 * | 11/2010 | Breen | .................. | F03B 13/142 290/42 |
| 7,964,977 B2 * | 6/2011 | Nair | ..................... | H01L 41/125 290/42 |
| 7,980,832 B2 * | 7/2011 | Ahdoot | ................ | F03B 13/182 290/42 |
| 8,030,789 B2 * | 10/2011 | Ortiz | ................... | F03B 13/142 290/42 |
| 8,269,364 B2 * | 9/2012 | Lai | .......................... | F03B 13/26 290/53 |
| 8,388,301 B2 * | 3/2013 | Tease | ................... | F03B 11/08 134/198 |
| 8,446,030 B2 * | 5/2013 | Brown | .................. | E02B 9/08 114/264 |
| 8,564,149 B2 * | 10/2013 | Holle | .................... | F01D 5/225 290/42 |
| 8,596,955 B2 * | 12/2013 | Freeman | ................ | F01D 1/02 415/3.1 |
| 8,629,572 B1 * | 1/2014 | Phillips | ............... | F03B 13/16 290/53 |
| 8,745,981 B1 | 6/2014 | Hanna | | |
| 8,841,792 B2 * | 9/2014 | Teichman | ............... | F03B 13/24 290/53 |
| 8,882,440 B2 * | 11/2014 | Maier | ................... | F03B 13/142 415/3.1 |
| 8,946,919 B2 * | 2/2015 | Phillips | .................. | F03B 13/16 290/53 |
| 8,946,920 B2 * | 2/2015 | Phillips | .................. | F03B 13/16 290/53 |
| 8,952,560 B2 * | 2/2015 | Phillips | .................. | F03B 13/16 290/53 |
| 8,963,358 B2 * | 2/2015 | Phillips | .................. | F03B 13/16 290/53 |
| 8,974,184 B2 * | 3/2015 | Becker | ...................... | F01D 7/00 416/136 |
| 9,151,266 B2 * | 10/2015 | Bulaclac, Jr. | ........ | F03B 13/1855 |
| 9,476,400 B2 * | 10/2016 | Phillips | .................. | F03B 13/16 |
| 9,624,900 B2 * | 4/2017 | Phillips | .................. | F03B 13/20 |
| 9,644,601 B2 * | 5/2017 | Phillips | .................. | F03B 13/16 |
| 9,765,753 B2 * | 9/2017 | Freeman | .................. | F01D 1/02 |
| 10,011,910 B2 * | 7/2018 | Phillips | ................ | H02K 7/1853 |
| 10,041,467 B2 * | 8/2018 | Zabala | ................. | F03B 13/142 |
| 10,047,717 B1 * | 8/2018 | Phillips | .................. | F03B 13/20 |
| 10,161,379 B2 * | 12/2018 | Nanehkaran | ............. | E02B 9/08 |
| 10,385,820 B2 * | 8/2019 | Moffat | ................... | F03B 13/10 |
| 2005/0169774 A1 * | 8/2005 | Welch, Jr. | ............. | F04B 35/004 417/337 |
| 2007/0130929 A1 * | 6/2007 | Khan | ................... | F03B 13/185 60/398 |
| 2008/0088133 A1 * | 4/2008 | Nagata | ................. | F03B 13/142 290/53 |
| 2008/0260548 A1 * | 10/2008 | Ahdoot | ................ | F03B 13/182 417/333 |
| 2008/0309088 A1 * | 12/2008 | Agamloh | ............ | F03B 13/1845 290/53 |
| 2009/0121486 A1 * | 5/2009 | Ganley | ................. | F03B 13/262 290/53 |
| 2010/0133843 A1 * | 6/2010 | Nair | ..................... | H01L 41/125 290/53 |
| 2010/0209236 A1 * | 8/2010 | Freeman | ................ | F01D 1/02 415/208.1 |
| 2010/0237623 A1 * | 9/2010 | Brown | .................. | E02B 9/08 290/53 |
| 2011/0012357 A1 * | 1/2011 | Lai | .......................... | F03B 13/26 290/53 |
| 2011/0089697 A1 * | 4/2011 | Nair | ..................... | H01L 41/125 290/53 |
| 2011/0101696 A1 * | 5/2011 | Holle | .................... | F01D 5/225 290/53 |
| 2011/0133463 A1 * | 6/2011 | Nair | ..................... | H01L 41/125 290/53 |
| 2011/0187102 A1 * | 8/2011 | Sirseth | ................. | F03B 13/145 290/42 |
| 2012/0193920 A1 * | 8/2012 | Jeon | ..................... | F03B 13/266 290/53 |
| 2014/0117673 A1 * | 5/2014 | Phillips | .................. | F03B 13/16 290/53 |
| 2014/0117674 A1 * | 5/2014 | Phillips | .................. | F03B 13/16 290/53 |
| 2014/0313001 A1 * | 10/2014 | Phillips | .................. | F03B 13/16 335/306 |
| 2014/0339928 A1 * | 11/2014 | Phillips | .................. | F03B 13/16 310/30 |
| 2015/0145258 A1 * | 5/2015 | Phillips | .................. | F03B 13/16 290/53 |
| 2015/0308401 A1 * | 10/2015 | Edwards | .................. | F03G 7/05 60/496 |
| 2016/0010619 A1 * | 1/2016 | Phillips | .................. | F03B 13/16 290/53 |
| 2016/0186715 A1 * | 6/2016 | Fait | ........................ | F03B 13/20 290/53 |
| 2016/0252071 A1 * | 9/2016 | Phillips | .................. | F03B 13/20 290/50 |

(56) References Cited

U.S. PATENT DOCUMENTS

2017/0198401 A1* 7/2017 Phillips ................ H02K 7/1853
2019/0353139 A1* 11/2019 Sheldon-Coulson ........................
                                                H02K 7/1823
2019/0368462 A1* 12/2019 Moffat .................. F03B 13/183

OTHER PUBLICATIONS https://www.researchgate.net/publication/266373778 Testing of a small-scale floating OWC model in a wave flume.
International Search Report dated May 1, 2019.

* cited by examiner

INERTIAL WATER COLUMN WAVE ENERGY CONVERTER

CROSS-REFERENCES TO RELATED APPLICATIONS

This application claims priority from U.S. Ser. No. 62/613,260, filed Jan. 3, 2018 and U.S. Ser. No. 62/614,419, filed Jan. 7, 2018, incorporated by reference in their entirety.

BACKGROUND

Very large amounts of energy are available in the waves that traverse the surface of the world's oceans. Few if any inventions of the prior art have permitted the capture and beneficial use of this energy in a manner that is both economical and robust to ocean storms.

The disclosed wave energy converter is both economical and robust, requiring a relative economy of structural material and having few moving parts.

SUMMARY OF THE INVENTION

The present invention is a floating wave energy converter that converts wave motion into electrical power when it oscillates vertically in response to the passage of ocean waves. Vertical oscillations of the wave energy converter structure can be out of phase with those of a volume of water located inside one or more typically open-bottomed, vertically-oriented tubes that form part of the structure and descend downwardly into the body of water on which the structure floats. In some embodiments, a volume of air is periodically pressurized and compressed between the aforementioned volume of water and a rigid upper wall or ceiling of an enclosure of the structure, thereby being driven out of the enclosure through air turbines, and (in some embodiments) one-way valves permit air to enter the enclosure freely. A hollow void of the structure, near the nominal waterline of the structure, is completely or partially filled with water (e.g. seawater) to contribute significant mass to the structure and increase the momentum associated with its vertical oscillations. In some embodiments, the hollow void can be at least partially evacuated, causing the structure to vertically rise out of the water to change its waterplane area. In some embodiments, one or more annular jackets around the one or more vertically-oriented tubes are also filled with water (e.g. seawater) to contribute further mass to the structure and further increase the momentum associated with its oscillations. In some embodiments, the structure can propel itself across a body of water using directed lateral expulsions of pressurized air (including, but not limited to, air that has passed through turbines of the embodiment).

This disclosure, as well as the discussion regarding same, is primarily made in reference to ocean wave energy converters of the types disclosed and discussed. However, many of the of the parts, systems, devices, mechanisms, etc., disclosed herein, and utilized in the design of the disclosed energy device embodiments, may have application to other devices, systems, and/or mechanisms, and/or to the solution of other problems, and the scope of the current disclosure extends to these components, as well as to the energy device embodiments that contain them.

The current disclosure includes many different embodiments, and variations of embodiments, of a novel device that extracts energy from ocean waves. Each of the following device features, behaviors, and/or attributes, is represented by, incorporated within, and/or associated with, at least one embodiment of the current disclosure:

1. Buoy

An embodiment of the current disclosure incorporates, includes, and/or utilizes a buoy in order to keep at least a portion of the device adjacent to the surface of a body of water. The buoy is located at an upper portion of the disclosed device. In some embodiments, the buoy has a bulb-like, conical, and/or hemicylindrical shape. When the device is in position in a body of water, a water-plane area of the buoy is typically larger than the (combined) horizontal cross-sectional area(s) of the water tube(s) of the device, unless the device is in an elevated (storm-protection) mode. Buoys of the current disclosure include, but are not limited to: flotation modules, flotation platforms, hulls.

Buoys of the current disclosure may include, but are not limited to, those which are composed and/or fabricated of, and/or may incorporate, include, and/or contain: air-filled voids, foam, wood, bamboo, steel, aluminum, cement, fiberglass, and/or plastic.

Buoys of the current disclosure may include, but are not limited to, those which are fabricated as a substantially monolithic body or interconnected assemblage of parts, e.g., of which individual parts may not be positively buoyant. They may also be fabricated as assemblies of positively buoyant sub-assemblies, e.g., of buoyant canisters or modules.

Buoys of the current disclosure include, but are not limited to, those which displace water across and/or over areas of the surface of body of water as small as 2 square meters, and as great as 4,000 square meters.

Buoys of the current disclosure include, but are not limited to, those which have a nominal, resting draft as shallow as 10 cm, and as deep as 30 meters.

Buoys of the current disclosure include, but are not limited to, those which have a horizontal cross-sectional shape (i.e., a shape with respect to a cross-section parallel to the resting surface of a body of water) that is approximately: circular, elliptical, rectangular, triangular, and hexagonal.

Buoys of the current disclosure include, but are not limited to, those which have a vertical cross-sectional shape (i.e., a shape with respect to a cross-section normal to the resting surface of a body of water) that is approximately: rectangular, frusto-triangular, hemi-circular, semi-circular, and semi-elliptical.

2. Water Tube

An embodiment of the current disclosure incorporates, includes, and/or utilizes a tube, cylinder, channel, conduit, container, canister, object, and/or structure, i.e., a "water tube," an upper end of which is nominally positioned above the mean water line of the device, and a lower end of which is nominally positioned at some depth below the surface of the body of water (e.g. 20 m, 40 m, 60 m, 80 m, 100 m, 150 m, 200 m and/or near, adjacent to, and/or below, a wave base of the body of water on which the embodiment floats).

Water tubes of the current disclosure include, but are not limited to, those which have an approximately circular, square, teardrop-shape, ovular, and/or rectangular horizontal cross-section, i.e., a cross-section through a plane normal to a longitudinal axis of the tube.

Water tubes of the current disclosure include, but are not limited to, those which have an internal channel, e.g., through which water and/or air may flow, with an approximately circular horizontal cross-section, i.e., a cross-section through a plane normal to a longitudinal axis of the tube, of approximately constant area and/or shape. However, water tubes of the current disclosure also include, but are not limited to, those which have an internal channel, e.g., through which water and/or air may flow, with a variable, inconsistent, and/or changing, cross-sectional area, i.e., a variable, inconsistent, and/or unequal, area with respect to at least two cross-sections through a plane normal to a longitudinal axis of the tube.

Water tubes of the current disclosure include, but are not limited to, those which are fabricated, at least in part, of: steel, and/or other metals; one or more types of plastic; one or more types of fabric (e.g., carbon fiber or fiberglass); one or more types of resin; and/or one or more types of cementitious material.

Water tubes of the current disclosure include, but are not limited to, those which are, at least in part, and/or at least to a degree, flexible with respect to at least one axis, as well as those that are, at least in part, rigid and/or not flexible with respect to at least one axis.

Water tubes of the current disclosure include, but are not limited to, those which are comprised of tube walls of approximately constant thickness and/or strength; as well as those which are comprised of tube walls of variable, inconsistent, and/or changing, thicknesses and/or strengths.

Embodiments of the current disclosure incorporate, include, and/or utilize one or more water tubes, and the scope of the present disclosure includes embodiments that incorporate, include, and/or utilize different numbers, and/or any number, of water tubes.

3. Air Turbine

An embodiment of the current disclosure incorporates, includes, and/or utilizes "air turbines," i.e., devices and/or mechanisms that cause a shaft to rotate in response to the passage of air through a channel.

An embodiment of the current disclosure incorporates, includes, and/or utilizes a "mono-directional air turbine" that causes a shaft to rotate in a first direction, and/or with a first torque, and/or a first rate of rotation in response to the passage of air through a channel in a first direction of flow, but causes that shaft to rotate in a second direction (or not rotate), and/or with a second torque (or no torque) and/or a second rate of rotation (or no rotation) in response to the passage of air through the channel in a second, e.g., opposite, direction of flow.

An embodiment of the current disclosure incorporates, includes, and/or utilizes a "bi-directional air turbine" that causes a shaft to rotate in a first direction, and/or with a first torque and/or a first rate of rotation in response to the passage of air through a channel in a first direction of flow, and causes that shaft to rotate in the same first direction, and/or with torque that is approximately equal in magnitude to the first torque and/or causes that shaft to rotate at a rate of rotation that is approximately equal to the first rate of rotation in response to the passage of air through the channel in a second, e.g., opposite, direction of flow.

An embodiment of the current disclosure incorporates, includes, and/or utilizes "air turbines" that are of known types, including, but not limited to, the following types:

Wells turbines
Wells turbines with guide vanes
biplane Wells turbine with guide vanes
contrarotating Wells turbine
Impulse turbines
Impulse turbines with guide vanes
McCormick counterrotating turbine
Cross-flow turbines
Savonius turbines The scope of the current disclosure includes embodiments that incorporate, include, and/or utilize "boundary layer effect turbines" including, but not limited to, those of the "Tesla turbine" design.

Embodiments of the current disclosure incorporate, include, and/or utilize one or more turbines, and the scope of the present disclosure includes embodiments that incorporate, include, and/or utilize different numbers, and/or any number, of turbines.

4. Ducted Turbine

An embodiment of the current disclosure incorporates, includes, and/or utilizes an "air turbine" positioned within a constricted portion of a water tube, or extension of a water tube. By positioning an air turbine in a constricted portion of a tube through which air will flow, the speed of the air is increased thereby facilitating the efficient extraction of power from the flow.

An embodiment of the current disclosure incorporates, includes, and/or utilizes "air turbines" positioned within cowlings, tubes, and/or shrouds, that are of known types, including, but not limited to, the following types:

| | |
|---|---|
| ducted turbines | uni-directional ducted turbines |
| shrouded turbines | bi-directional ducted turbines |
| venturi shaped ducted turbines | |
| diffuser-augmented wind turbines | |

An embodiment of the current disclosure incorporates, includes, and/or utilizes "air turbines" positioned within tubes, and/or portions of tubes, that comprise constrictions of known types, including, but not limited to, the following types:

| | |
|---|---|
| venturi tubes | nozzles |
| flow nozzles | orifice plates |
| Dall tubes | venturi nozzles |

Embodiments of the current disclosure incorporate, include, and/or utilize one or more constricted tubes, ducts, and/or ducted turbines, and the scope of the present disclosure includes embodiments that incorporate, include, and/or utilize different numbers, and/or any number, of constricted tubes, ducts, and/or ducted turbines.

5. One-Way Valve

An embodiment of the current disclosure incorporates, includes, and/or utilizes "one-way vents," and/or "one-way valves," i.e., devices and/or mechanisms positioned within, and/or in the path of, a channel that respond to higher pressure within the channel on a first side of the vent by allowing air to flow in a first flow direction, at a first rate of flow, from the first higher-pressure side to a lower pressure side; and, conversely, that respond to higher pressure within the channel on a second, i.e., opposite, side of the valve by allowing air to flow in a second, i.e., opposite, direction, at a second rate of flow which is less than the first rate of flow (or zero). Typically, and nominally, a one-way valve will only allow air to flow through the respective channel when the pressure is relatively higher on one side of the valve, but will not allow air to flow when the pressure is relatively higher on the other side of the valve.

An embodiment of the current disclosure incorporates, includes, and/or utilizes "one-way valve" that are of known types, including, but not limited to, the following types:

| | | |
|---|---|---|
| ball check valves | diaphragm check valves | reflux valves |
| Belleville valves | duckbill valves | retention valves |
| check valves | in-line check valves | stop-check valves |
| clack valves | lift-check valves | swing check valves |
| clapper valves | non-return valves | umbrella valves |
| cross-slit valves | pneumatic non-return valves | wafer check valves |

The scope of the current disclosure includes embodiments that incorporate, include, and/or utilize "solid-state check valves" including, but not limited to, those of the "Tesla valve" (i.e. "Tesla valvular conduit") design.

Embodiments of the current disclosure incorporate, include, and/or utilize one or more one-way valves, and the scope of the present disclosure includes embodiments that incorporate, include, and/or utilize different numbers, and/or any number, of one-way valves.

6. Power Take Off (PTO)

The scope of the current disclosure includes embodiments that include, incorporate, and/or utilize, air turbines that are directly and/or indirectly connected to PTOs including, but not limited to, those comprising:

an electrical generator a pump (e.g., of air or water)

a gearbox and rotatably connected electrical generator and/or pump (e.g., of air or water)

a hydraulic ram and/or piston, and, a cam shaft that is operatively connected to a hydraulic ram and/or piston;

The scope of the current disclosure includes embodiments that include, incorporate, and/or utilize, air turbines that are directly and/or indirectly connected to linearly extensible components, and/or elements, of extensible PTOs such as hydraulic pistons, rack-and-pinon assemblies, sliding rods/shafts of linear generators, etc.

7. Combinations and derivative variations

The current disclosure includes many novel devices, devices that are hybrid combinations of those novel devices, and variations, modifications, and/or alterations, of those novel devices, all of which are included within the scope of this disclosure. All derivative devices, combinations of devices, and variations thereof, are also included within the scope of this disclosure.

The scope of the present disclosure includes embodiments that include, incorporate, and/or utilize, air turbines, valves, and other means of regulating and/or controlling the flow of air and water, in any combination, and incorporating and/or characterized by any and all embellishments, modifications, variations, and/or changes, that would preserve their essential function and/or functionality.

This disclosure, as well as the discussion regarding same, is made in reference to wave energy converters on, at, or below, the surface of an ocean. However, the scope of this disclosure applies with equal force and equal benefit to wave energy converters and/or other devices on, at, or below, the surface of an inland sea, a lake, and/or any other body of water or fluid.

All potential variations in sizes, shapes, thicknesses, materials, orientations, and/or other embodiment-specific variations of the general inventive designs, structures, systems, and/or methods disclosed herein are included within the scope of the present disclosure.

8. Hyper-Pressurized Air Pocket and Water Hammer

The current disclosure includes embodiments that comprises a buoyant (i.e., a buoy) portion, and a water tube. The water tube has an upper end positioned above the mean water level of the body of water on which the embodiment floats, and has a lower end positioned at a depth some distance below the mean water level of the body of water (e.g. 50, 100, or 150 m below). The tube is substantially hollow, providing a vertical channel or conduit for water.

An upper end of the water tube, an end that is nominally filled with air, contains at least one exit channel typically including a constricted portion (i.e., a "throat") of reduced cross-sectional area (with respect to the tube's average and/or median cross-sectional area). In other words, the water tube has an upper end to which is appended, and/or which incorporates, a constriction, such as a Venturi constriction.

A turbine is positioned inside the tube, near the throat, typically where the speed of the flow of air out of the tube is approximately maximal.

Rise of water in tube lags behind water outside tube

When the embodiment begins to rise in response to an approaching wave crest, the wave-induced increase in the depth of the water increases the pressure of the water adjacent to the lower end of the water tube which causes water to move into the tube in order to raise the level of the water therein (so as to match the level of the water outside the tube). However, the inertia of the water trapped inside the tube prevents that water from rising instantaneously and in perfect concert with the water outside the tube, i.e., the water that lifts the embodiment.

In other words, the water tube partially isolates the water inside the tube from the wave-induced motions of the water outside the tube. The level of the water inside the tube rises (or falls) principally in response to changes in the pressure of the water adjacent to its lower mouth. As the water level rises around the embodiment, i.e., as the depth of the embodiment increases, in response to an approaching wave crest, the pressure of the water at the lower mouth of the embodiment's water tube also increases. However, in the absence of, and/or isolation from, the effect and influence of the water-driven forces propagated within a wave, the inertia of the water inside the tube prevents it from instantaneously rising and falling in concert with the water outside the tube.

As a consequence, the level of the water inside the tube, when measured with respect to the seafloor, or some other stationary reference point, tends to rise relatively slowly. However, with respect to the embodiment rising with an approaching wave, the level of the water inside the tube seems to fall (since it doesn't rise as quickly as the buoy and tube).

Volume of Air Above Water Increases

And, as a consequence of the latency between the rise of the embodiment and the rise of the water inside the water tube, the volume of the air-filled portion of the tube increases. The increasing volume of the air gap inside the tube decreases the pressure of the air therein, and, as a result, air outside the tube, having a relatively greater pressure, is drawn in to the upper portion of the tube, in some embodiments through a one-way valve, and in other embodiments through a turbine.

The air entering the tube enters at approximately the ambient air pressure of approximately one atmosphere. The air is able to enter freely in some embodiments, with minimal, if any, resistance to that inflow. The free inflow of ambient air to equilibrate the pressure of the expanding air-filled upper portion of the water tube facilitates the ability of the water in the tube to rise slowly (e.g., rather than being aided by the upward force created by the air pocket above the water having significantly lower than atmospheric pressure).

Water Rises with Increasing Momentum

As the water height around the embodiment continues to rise, e.g., as a wave crest more closely approaches, and the embodiment accelerates upward to keep pace, the water inside the tube begins to accelerate upward, albeit more slowly than the embodiment, due to the effect of the increased pressure of the water surrounding the lower mouth of the tube. The upward acceleration of the water inside the tube imbues that water with a degree of momentum commensurate with its substantial mass.

Manifestation of a Water Hammer Effect

By the time the embodiment reaches the apex of its heave motion, and as the wave crest is passing underneath, the level of the water inside the tube is still accelerating upward. Then, as the embodiment begins to fall, as the wave crest passes, and a corresponding wave trough approaches, the gravitational weight of the embodiment carries it down in concert with the wave, and the downward momentum of the embodiment grows.

As the embodiment accelerates downward, and the water inside the tube accelerates upward, the air in the top of the tube is compressed, and its pressure increases. The tube's one-way valve (if present) does not allow high-pressure air inside the tube to escape. In order to escape, the high-pressure air must pass through a turbine to which a power take-off (PTO) applies a resistive torque, thereby inhibiting its turning.

Typically, the only exit aperture provided to the pressurized air inside the tube is through a turbine, the resistive torque, applied to the turbine by an associated power take off (PTO), of which regulates the rate of the air's out flow as well as the amount of power extracted from its flow. The turbine extracts power from the outflowing air as the embodiment descends in concert with the descending water level created by the approaching wave trough, and for a short time thereafter while residual high-pressure remains.

Preparation for Another Cycle

Air escapes through the turbine as the embodiment descends, and eventually the amplified pressure of the air is dissipated, as is the relative upward momentum of the water that helped to produce that pressure.

Thereafter, the pressure within the water tube again reaches approximately 1 atmosphere and is approximately equilibrated with the pressure of the ambient air.

And, the cycle repeats as air is once again drawn into the tube as the embodiment rises on a new wave.

Overview

An embodiment generates power by:

1) letting air freely enter the water tube when the mass and/or inertia-driven latency of the water inside the tube causes the water inside the tube to rise more slowly than the device (i.e. buoy and tube) as the outside water level rises in response to an approaching wave crest;

2) when the water level falls in response to an approaching wave trough, pressurizing the air inside the water tube by compressing it between a falling tube (i.e. the falling "ceiling" or top closed portion or wall of the tube) and a rising level of water inside the tube; and, 3) constraining the pressurized air to leave the water tube through a turbine that extracts power from its out flow, thereby energizing a PTO.

Some embodiments use a differential and/or unequal resistance to the flow of air in to, versus out of, the water tube to drive the air, and its associated water level, below the ambient water level, and/or the outer water level, thereby increasing the average pressure of the air inside the tube above that of the ambient air, causing the water level in the tube to be driven down and causing the mean water level inside the tube to be lower than the mean water level of the surrounding ocean.

Average Water Level

In embodiments in which the mean water level inside the tube is pushed down by a high-pressure pocket of air in the tube, the level of the water inside the tube is allowed to rise passively as the embodiment rises. However, it is actively pushed down through the pressurization of the air above it, when the embodiment falls. As a result the average level of the water inside the tube is lower and/or below that of the average level of the water outside the tube (i.e., the mean water level of the body of water on which the embodiment floats, and/or the level that would characterized the body of water in the absence of waves). In some embodiments the internal water level oscillates in a range that, at least for several waves cycles, is spaced from and below the average ambient (outer) water level, i.e. the range in which the internal water level oscillates does not, for at least several wave cycles at a time, include the mean outer water level.

9. Hypo-Pressurized Air Pocket

The current disclosure includes embodiments that comprises a buoyant (i.e., a buoy) portion, and a water tube. The water tube has an upper end or mouth positioned above the mean water level of the body of water on which the embodiment floats, and that has a lower end positioned at some depth below the buoy (e.g. 50 m, 100 m, 150 m, and/or adjacent to, or below, a wave base of the water).

An upper end of the water tube, an end that is nominally filled with air, contains an entry port and/or constricted portion (i.e., a "throat") of reduced cross-sectional area, with respect to the tube's average and/or median cross-sectional area. In other words, the water tube has an upper end to which is appended, and/or which incorporates, a constriction such as a Venturi constriction.

A turbine is positioned inside the tube, near the throat, where the speed of the flow of air out of the tube is approximately maximal.

Rise of Water in Tube Lags Behind Water Outside Tube

When the embodiment begins to rise in response to an approaching wave crest, the wave-induced increase in the depth of the water increases the pressure of the water adjacent to the lower end of the water tube which causes water to move into the tube in order to raise the level of the water therein (so as to match the level of the water outside the tube). However, the inertia of the water trapped inside the tube prevents that water from rising instantaneously and in perfect concert with the water outside the tube, i.e., the water that lifts the embodiment.

In other words, the water tube isolates the water inside the tube from the wave-induced motions of the water outside the tube. The level of the water inside the tube rises (or falls) principally in response to changes in the pressure of the water adjacent to its lower mouth. As the water level rises around the embodiment, i.e., as the depth of the embodiment increases, in response to an approaching wave crest, the pressure of the water at the lower mouth of the embodiment's water tube also increases. At least partially isolated from the effect and influence of the water-driven forces propagated within a wave at the surface, the inertia of the water inside the tube prevents it from instantaneously rising and falling in concert with the water outside the tube.

As a consequence, the level of the water inside the tube, when measured with respect to the seafloor, or some other stationary reference point, tends to rise relatively slowly. However, with respect to the embodiment rising with an approaching wave, the level of the water inside the tube seems to fall (since it doesn't rise as quickly as the tube that surrounds it).

Volume of Air Above Water Increases

And, as a consequence of the latency between the rise of the embodiment and the rise of the water inside the water tube, the volume of the air-filled portion of the tube increases. The increasing volume of the air gap inside the tube decreases the pressure of the air therein to a pressure below the outside air pressure, and, as a result, air outside the tube, having a relatively greater pressure, is driven to enter the water tube through a turbine.

In embodiments, the only entry and/or inflow aperture provided to the pressurized air outside the tube is through a turbine, the resistive torque of which, applied to the turbine by an associated power take off (PTO), regulates the rate of the air's flow in to the tube, as well as the amount of power extracted from its flow. The turbine extracts power from the inflowing air as the embodiment rises in concert with the ascending water level around the embodiment created by the approaching wave crest.

The tube's one-way valve does not allow high-pressure air outside the tube to enter. In order to enter, the higher pressure air outside the tube must pass through a turbine to which a power take-off (PTO) applies a resistive torque, thereby inhibiting its turning.

The degree of "suction," or the difference between the outside air pressure and the pressure of the air inside the tube, is increased by raising the mean water level inside the tube higher than the mean water outside water level. When the buoy and tube are moving upward due to a rising outside water level (i.e. when the buoy is rising on a wave), the water inside the tube is typically moving downward under gravity due to the head pressure created by this elevated internal water level. The water's substantial downward momentum creates a tendency for the air-filled portion of the tube to maintain a lower-than-atmospheric pressure longer than it otherwise would.

Overview

An embodiment generates power by:

1) when the mass and/or inertia-driven latency of the water inside the water tube causes it to rise more slowly than the tube surrounding it as the water level rises in response to an approaching wave crest, and the pressure of the air inside the water tube falls;

2) constraining air to enter the relatively under-pressurized air pocket at the top of the water tube through a turbine that extracts power from its inflow, thereby energizing a PTO; and, 3) when the outside water level falls in response to an approaching wave trough, allowing air inside the water tube pressurized by its compression between a falling tube and water level inside the tube to exit the tube freely.

This embodiment uses a differential and/or unequal flow of air in to, and out of, the water tube to hold the average internal water level above the average ambient (outer) water level, thereby decreasing the average pressure on the air below that of the ambient air. In some embodiments the internal water level oscillates in a range that, at least for several waves cycles, is spaced from and above the average ambient (outer) water level.

Average Water Level

The level of the water inside the tube is allowed to fall passively as the embodiment falls. However, it is actively pulled up through the depressurization of the air above it, when the embodiment rises. As a result the average level of the water inside the tube is higher and/or above that of the average level of the water outside the tube (i.e., the mean water level of the body of water on which the embodiment floats, and/or the level that would characterized the body of water in the absence of waves). Some embodiments use a differential and/or unequal resistance to the flow of air in to, versus out of, the water tube to drive the air, and its associated water level, above the ambient water level, and/or the outer water level, thereby decreasing the average pressure of the air inside the tube below that of the ambient air, causing water in the tube to be sucked up and causing the mean water level inside the tube to be higher than the mean water level of the surrounding ocean.

10. Neutrally-Pressurized Air Pocket

An embodiment of the current disclosure compels air to enter and exit the water tube through a turbine, or a pair of turbines, that extract(s) power from both its inflow and outflow, thereby energizing a PTO. Unlike the "hyper-" and "hypo-" pressurized embodiments discussed above, the water tube of this "neutrally-" pressurized embodiment has an average level of water inside its tube that is approximately equal to the average level of the water outside the tube.

Instantiations of these embodiments may utilize separate "uni-directional" turbines for the extraction of power from inflowing and outflowing air, and/or "bi-directional" turbines to extract power from flows of both directions.

11. Variable Device Mass

The current disclosure includes embodiments in which various "water ballast chambers," compartments, voids, spaces, and/or containers, within the embodiment may be filled with, and/or emptied of, water, thereby altering the average density of the embodiment, and its average depth (i.e., waterline) in the water on which it floats.

By emptying water from one or more of these water ballast chambers, an embodiment can reduce its average density and rise up to a shallower average depth, thereby projecting its upper portions out of the water and above potentially damaging storm waves and/or surges.

By adding water to one or more of these water ballast chambers, an embodiment can increase its average density and sink down to a greater average depth, for example, a depth in which it can become more responsive to the waves passing beneath and/or around it (i.e. by exhibiting a greater waterplane area), thereby increasing the amount of power it is able to extract from those waves.

12. High-Pressure Air Accumulator

The current disclosure includes embodiments in which the upper portion of a water tube is separated by the turbine driven by the flow in to, and/or out of, that tube by an "accumulator" in which high- and/or low-pressure air is trapped and then equilibrated by means of a flow through the associated turbine at a steadier rate than would be possible with a direct, and/or unbuffered, flow.

13. Composite and/or Cement-Reinforced Tube Wall

The current disclosure includes embodiments in which a water tube is comprised of an internal wall, e.g., made of steel, and an outside wall, e.g., also made of steel, and a gap that is filled, at least in part, with concrete and/or another cementitious material.

14. Truss Reinforced Tubes

The current disclosure includes embodiments in which a water tube is structurally reinforced and/or strengthened by an exterior truss. Another embodiment includes a water tube is structurally reinforced and/or strengthened by an interior truss, e.g., a truss within a concrete-filled gap between interior and exterior tube walls, and/or a truss within the lumen, conduit, aperture, and/or channel, through which water and/or air flow.

15. Flexible Tube

The current disclosure includes embodiments in which a water tube is, at least in part, not entirely rigid, and/or in which a water tube contains joints or a composite structure enabling the tube to flex while maintaining circumferential strength (to stay "open," like a water hose).

Alternate embodiments each have a water tube comprised, at least in part, of:

a flexible tube;

rigid tube segments that are conjoined, interconnected, and/or linked, by means of flexible joints, and/or connectors;

a flexible material utilizing rigid circumferential bands to prevent the collapse of the tube while permitting it to bend with respect to its longitudinal axis and a limiting maximal bend radius;

an accordion-like extensible material that both allows the tube to flex along its longitudinal axis and allows its length to increase and decrease through flexes of the accordion-like pleats that define its walls.

16. On-Board Computing

The current disclosure includes embodiments in which a plurality of computers perform computational tasks that may not be directly related to the operation, navigation, inspection, monitoring, and/or diagnosis, of the embodiment, its power take-off, and/or any other component, feature, attribute, and/or characteristic of its structure, systems, sub-systems, and/or physical embodiment. Such an embodiment may contain computers, computing systems, computational systems, servers, computing networks, data processing systems, and/or information processing systems, that are comprised of, but not limited to, the following modules, components, sub-systems, hardware, circuits, electronics, and/or modules:

graphics processing units (GPUs)
computer processing units (CPUs)
tensor processing units (TPUs)
hard drives
flash drives
solid-state drives (SSDs)
random access memory (RAM)
field programmable gate arrays (FPGAs)
application-specific integrated circuits (ASICs)
network switches, and
network routers.

Such an embodiment may contain computers, computing systems, computational systems, servers, computing networks, data processing systems, and/or information processing systems, that are powered, at least in part, from electrical energy extracted from the energy of ocean waves by the embodiment.

17. Ambient Cooling of Computers

The current disclosure includes embodiments in which a plurality of computers, computing systems, computational systems, servers, computing networks, data processing systems, and/or information processing systems, are cooled by methods, mechanisms, processes, systems, modules, and/or devices, that include, but are not limited to, the following:

direct conduction of at least a portion of the heat generated by at least some of the computers, generators, rectifiers, and/or other electronic components comprising the embodiment, to air surrounding the embodiment;

direct conduction of at least a portion of the heat generated by at least some of the computers, generators, rectifiers, and/or other electronic components comprising the embodiment, to water surrounding the embodiment;

indirect conduction of at least a portion of the heat generated by at least some of the computers, generators, rectifiers, and/or other electronic components comprising the embodiment, to the air surrounding the embodiment by means of one or more fluid media and/or heat exchangers, at least one heat exchanger of which is in contact with air surrounding the embodiment;

indirect conduction of at least a portion of the heat generated by at least some of the computers, generators, rectifiers, and/or other electronic components comprising the embodiment, to the air surrounding the embodiment by means of one or more fluid media and/or heat exchangers, at least one heat exchanger of which is in contact with water surrounding the embodiment;

18. Remote Exchange of Data and/or Power

Exchange of Data by Means of a Fiber Optic Cable

The current disclosure includes embodiments in which one end of a cable is suspended adjacent to the surface of the body of water on which the embodiment floats. The other end of the cable is directly and/or indirectly connected to a computer or other electronic device, component, and/or system, directly and/or indirectly connected at least one other computing device on the embodiment.

A vessel, e.g., an unmanned autonomous vessel, can approach the embodiment, secure the free end of the cable, and by communicating through that cable with the associated computer or other electronic device, component, and/or system, on board the embodiment, exchange copious amounts of data with the computer or other electronic device, component, and/or system, on the embodiment, e.g., in order to download the results of a calculation and/or simulation performed on the embodiment, and/or to upload a body of data and/or applications with which to perform a calculation.

Embodiments of the present disclosure achieve this remote data exchange capability by means of cables including, but not limited to, the following types:

fiber optic cables
Infiniband cables
LAN cables
RS-232 cables, and
Ethernet cables.

Embodiments of the present disclosure may also exchange data with other computers, vessels, networks, data-relay stations, and/or data repositories, by means of communication technologies including, but not limited to, the following types:

Wi-Fi
5G
radio
pulse-modulated underwater sounds, e.g., sonars
pulse-modulated lasers
pulse-modulated LEDs, and,
physical semaphores (e.g., 2D arrays of MEMs).

Embodiments of the present disclosure may also exchange data with other computers, vessels, networks, data-relay stations, and/or data repositories, by means of communication channels mediated by, and/or including, but not limited to, the following types:

boats and/or other manned surface vessels
autonomous surface vessels
submarines
autonomous underwater vessels
planes
autonomous unmanned aerial vehicles (AUVs)

satellites balloons ground stations, e.g., transmission stations positioned on shore, and, other embodiments of the current disclosure.

19. Self-Propulsion

The current disclosure includes embodiments in which the embodiment possesses devices, mechanisms, structures, features, systems, and/or modules, that actively and purposely move the embodiment, primarily laterally, to new geospatial locations and/or positions. Such self-propulsion capabilities allow embodiments to achieve useful objectives, including, but not limited to, the following:

to seek out optimal wave conditions to avoid adverse wave and/or weather conditions to avoid other ships, vessels, and/or potential hazards to avoid shallow waters, rocks, land masses, islands, and/or other geological hazards to maintain proximity to other embodiments, e.g., so as to exchange data with one another, and/or cooperate in the execution of relatively large computing tasks to provide energy to other vessels, and/or disaster areas in time of emergency, and, to return to port in order to receive inspection, maintenance, repair, upgrades, and/or in order to be decommissioned.

Embodiments of the current disclosure may achieve self-propulsion by devices, mechanisms, structures, features, systems, and/or modules, that include, but are not limited to, the following:

rigid sails flexible sails

Flettner rotors keel-shaped tube chambers rudders ducted fans propellers propeller-driven underwater thrusters directed outflows of air from water tubes utilized as thrust water jets submerged, wave-heave-driven flaps, and sea anchors and/or drogues 20. Airfoil-Shaped Tubes and/or Tube Shrouds and/or Cowlings The current disclosure includes embodiments in which a water tube does not have a circular cross-section, but, instead, has an airfoil-shaped cross-section. Another embodiment has a water tube is embedded within an airfoil-shaped casing, shroud, and/or cowling.

An embodiment minimizes its drag, and facilitates its motion, e.g., by means of self-propulsion, through the use of an airfoil-shaped or otherwise hydrodynamically-shaped (low drag) water tube and/or outer tube casing, shroud, cowling, and/or enclosure. An embodiment with an airfoil-shaped water tube and/or casing also includes rudders and/or ailerons that allow the airfoil-shaped water tube to be steered after the manner of a keel, or an airplane wing.

21. Utilization of Turbine Exhaust as Thrust

The current disclosure includes embodiments in which the air flowing out of the air-filled portion of a water tube, e.g. through a turbine exhaust, when the air at the top of the water tube is compressed, is directed laterally in a desirable direction so as to propel the embodiment.

22. Pitch-Inhibiting Weight

The current disclosure includes embodiments in which a weight is suspended beneath one or more water tubes by flexible cables such that when the orientation of the embodiment deviates from vertical, and/or from normal with the resting, nominal surface of the body of water on which the embodiment floats, then the downward gravitational force of the weight is imparted to the bottom of the water tube, thereby creating a restoring torque, or is imparted to the most raised of two or more water tubes, again thereby creating a restoring torque.

Scope of the Disclosure

While much of this disclosure is discussed in terms of wave energy converters, including both floating and submerged components and/or modules, it will be obvious to those skilled in the art that most, if not all, of the disclosure is applicable to, and of benefit with regard to, other types of buoyant devices and/or submerged devices, and all such applications, uses, and embodiments, are included within the scope of the present disclosure.

DETAILED DESCRIPTIONS OF THE DRAWINGS

For a fuller understanding of the nature and objects of the disclosure, reference should be made to the following detailed descriptions, taken in connection with the accompanying drawings. However, the scope of the current disclosure is in no way limited by the drawings, illustrations, descriptions, and/or embodiments, suggested by, in, and/or with respect to, the following figures and descriptions. The following figures and descriptions are offered for the purpose of explanation and illustration of certain aspects and/or attributes of the current disclosure. Other aspects, attributes, possibilities, and variations will be obvious to those skilled in the art.

DETAILED DESCRIPTION OF THE PREFERRED EMBODIMENTS

Figure 1:
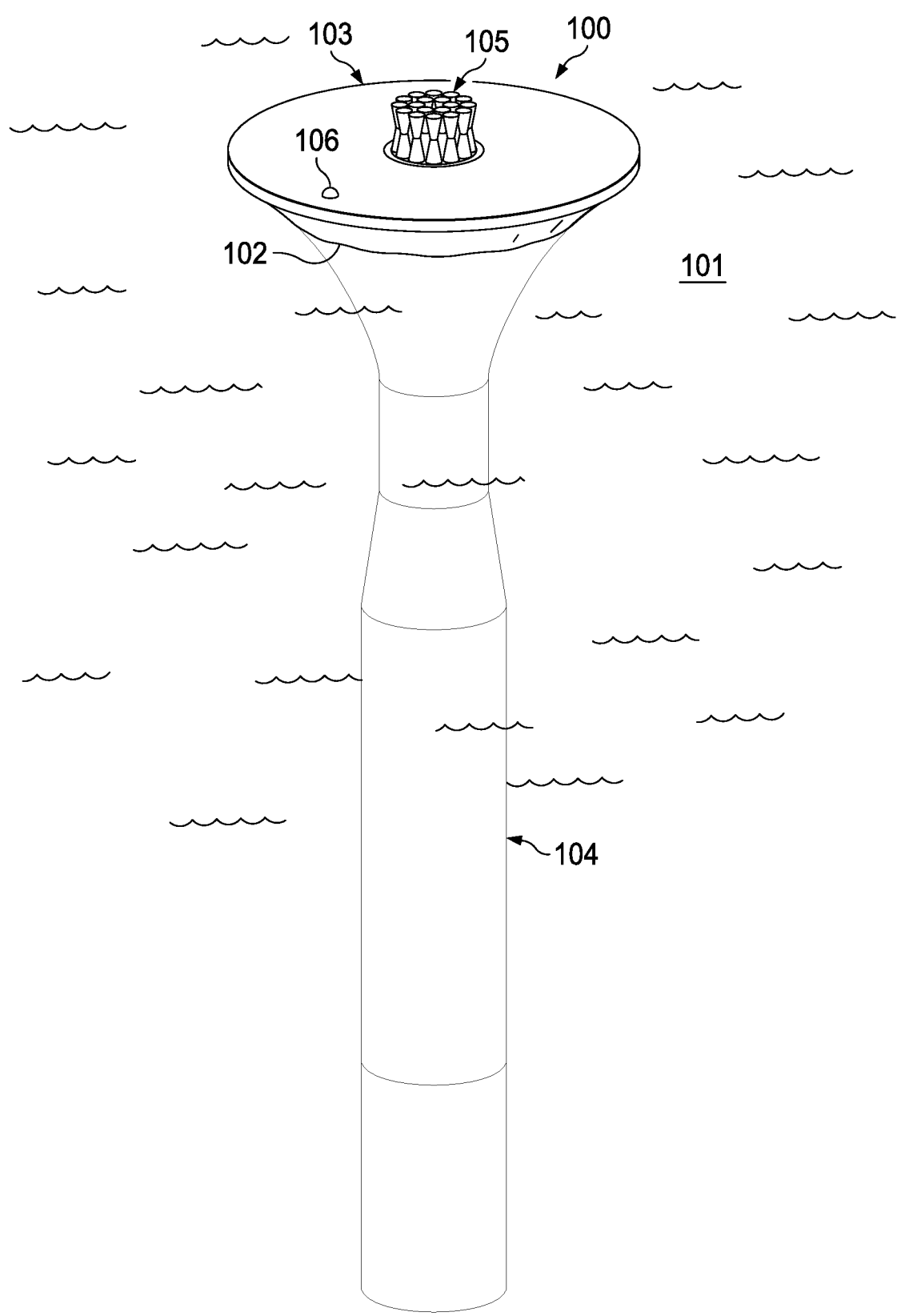
FIG. 1 a perspective schematic view of a first embodiment of the present invention.

FIG. 1 shows a perspective view of an embodiment of the current disclosure. The illustrated embodiment 100 is of the type described above in the section entitled, "Hyper-Pressurized Air Pocket and Water Hammer." Especially when water within the embodiment's water column tube 104 is rising, over pressurized air within the water column tube is driven out through a plurality of turbines 105 positioned in the throats of venturi shrouds. Especially when water within the embodiment's water column tube 104 is falling, under pressurized air within the water column tube is supplemented and/or equilibrated through the admission of ambient outside air through a one-way valve positioned among the venturi shrouds 105 at the top of the embodiment.

Inertial water column wave energy convertor (IWC) 100 is floating in a body of water 101 with waterline 102. IWC 100 is comprised of two primary components, flotation structure 103 and water column tube 104. Flotation structure 103 has a concave (and approximately conical) profile which is intersected by waterline 102. A hollow chamber runs from the bottom of water column tube 104 to the top of flotation structure 103. This opening, tube, and/or chamber, is shown in detail in FIG. 4 and allows a column of water to rise and fall within it. Pneumatic power take-off modules (PTOs) 105 cover the top of the hollow water-column-tube opening which penetrates floatation structure 103. These power-take-off modules each include a turbine that turns a generator when air passes through the respective module's venturi shroud. Valve 106 is also shown which assists in allowing 104 to rise partially out of the water (causing waterline 102 to be located farther down on water column tube 104).

Figure 2:
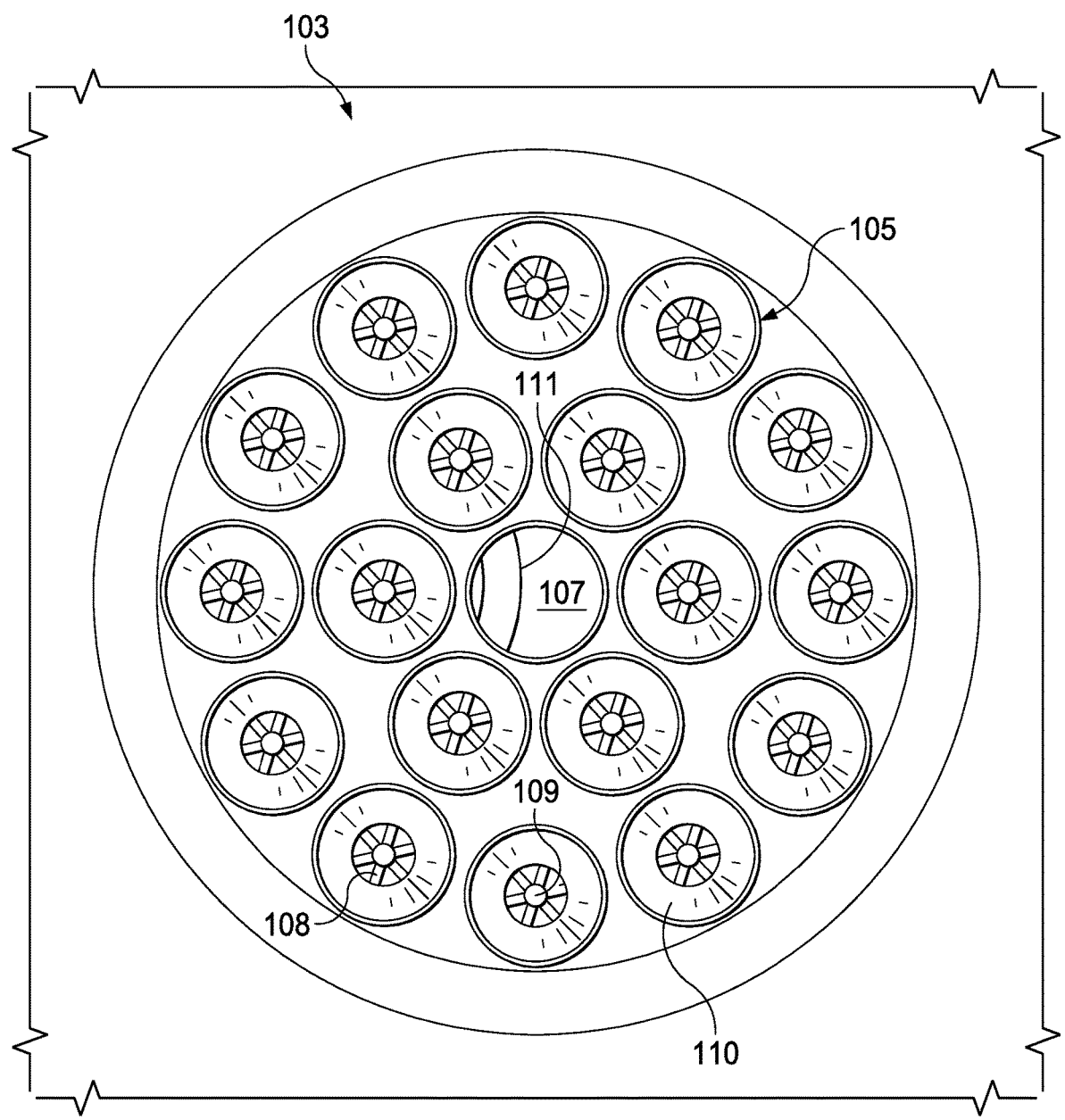
FIG. 2 is a top view of the embodiment of FIG. 1.

FIG. 2 shows a plan view of the same embodiment of the current disclosure illustrated in FIG. 1.

Pneumatic power take-off modules 105 are shown arranged on top of the hollow chamber 107 positioned within flotation module 103. The PTOs are each shown to be comprised of a turbine, e.g., 108, which rotates when air flows past it. This rotation causes a respective generator, e.g., 109, to spin, thereby generating electricity. Each turbine, e.g., 108, and each generator, e.g., 109, is contained within a respective housing, tube, or shroud, e.g., 110, which is shaped like a venturi tube or shroud. The convergent/divergent nozzle shape accelerates air entering the housings, as it flows through the respective turbine blades, and slows the flow exiting the housings, after it has flowed through the respective turbine, while minimizing turbulence. Check (i.e., one-way) valve 111 is shown, which allows air to be inhaled into hollow chamber 107 relatively freely, but which closes if air is exhaled (forced out) of hollow chamber 107. Instead of exiting the hollow chamber 107 through the check valve 111, air exiting hollow chamber 107 is routed through PTOs, e.g., 105, which enables the respective turbines, e.g., 108, to rotate.

Figure 3:
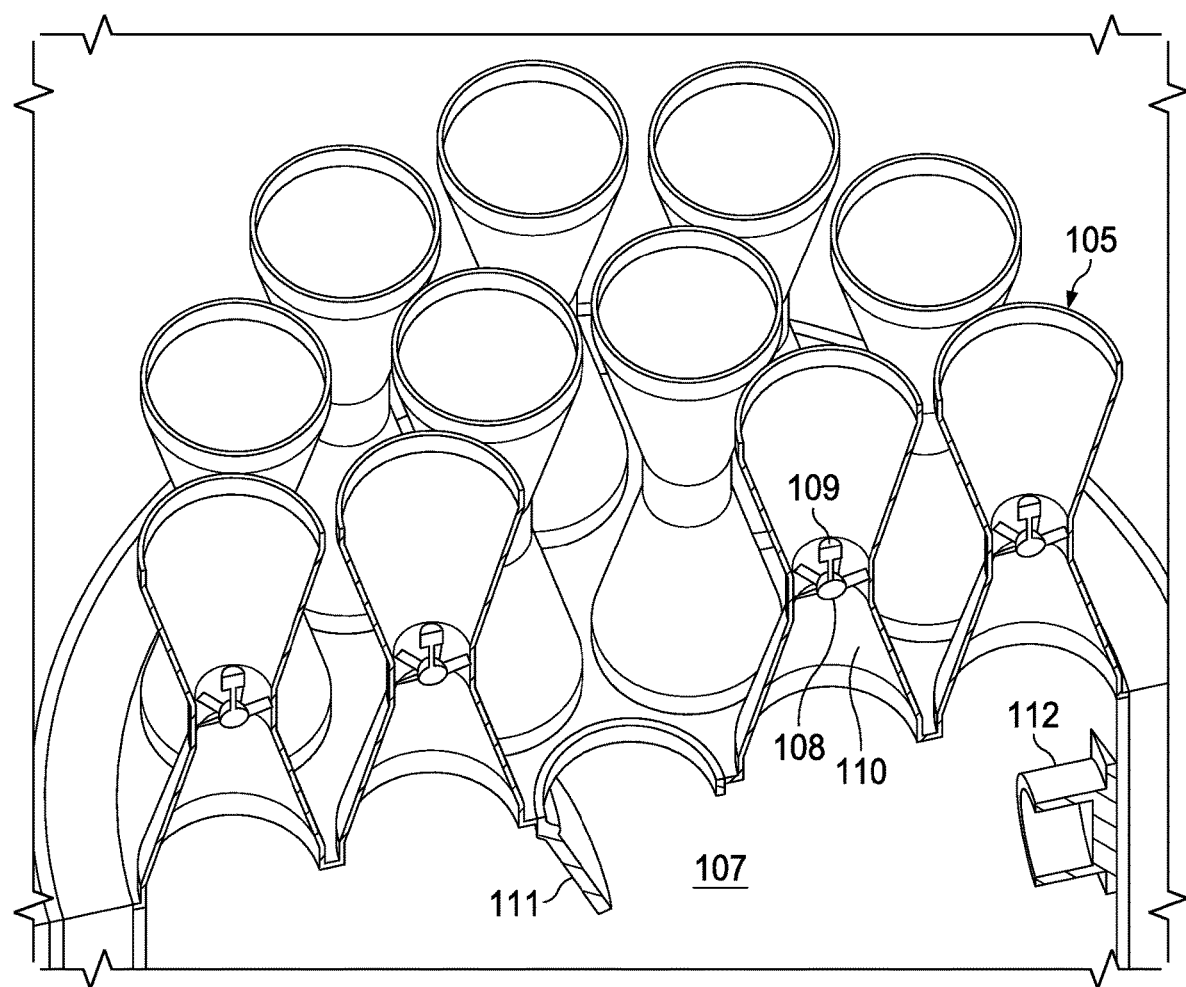
FIG. 3 is an enlarged, sectional view of an upper portion of the embodiment of FIG. 1.

FIG. 3 shows a perspective cutaway view of the same embodiment of the current disclosure that is illustrated in FIGS. 1 and 2.

Pneumatic power take-off modules, e.g., 105, are shown in a cutaway and/or sectional view. The PTOs are comprised of a turbine, e.g., 108, and a generator, e.g., 109, contained within a venturi-shroud housing, e.g., 110, which is shaped like a venturi tube. Check valve 111 opens to admit higher pressure air from the atmosphere into the hollow chamber 107. And, check valve 112 provides an alternate path for air to escape the hollow chamber 107 in the event that the pressure in hollow chamber 107 exceeds a preset value. Its operation is further described with respect to FIGS. 4 and 5.

Figure 4:
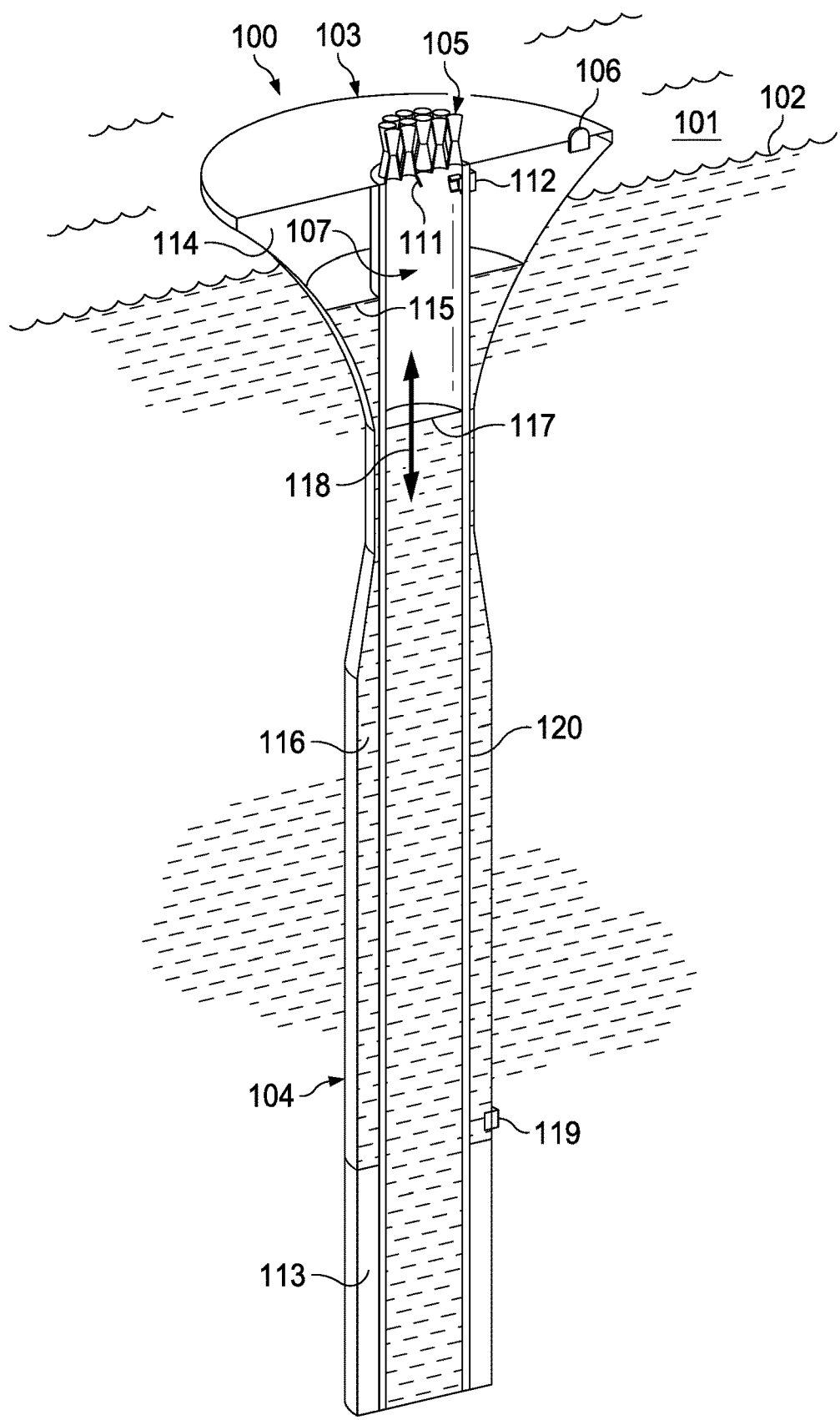
FIG. 4 is a perspective view of a cross section of the embodiment of FIG. 1.

FIG. 4 shows a perspective cutaway view of the same embodiment of the current disclosure that is illustrated in FIGS. 1-3. The funnel- or cone-shaped buoy 103 at the top of the embodiment 100 contains a water ballast chamber 114 that can be filled and/or emptied of water in order to add or reduce ballast within the embodiment, and thereby adjust the depth of the embodiment and the position of its average waterline 102. In alternate embodiments (not shown but substantially similar to that of the present figure), the water ballast chamber can be subdivided into multiple compartments by dividers or bulkheads, and depending on the configuration of the embodiment, each compartment can be either completely separated from, or alternately can communicate with, others of the compartments.

IWC 100 is floating in a body of water 101 with waterline 102. Flotation structure 103 is shown to contain hollow void 114 which is partially filled with a volume of water ballast 115 (e.g. seawater that has entered hollow void 114). Void 114 in flotation structure 103 is continuously connected by a channel to hollow flotation collar and/or annular tube 116 that is defined, at least in part, by interior water tube chamber wall 120 and by exterior flotation collar wall 116, which is also filled with water ballast. Water can pass through this channel from void 114 to hollow flotation collar 116.

Ballast collar 113 is comprised of concrete, stone, metal, or other ballast material having a density greater than that of the water 101 on which the embodiment 100 floats, and is installed to increase the stability of IWC 100.

Hollow tubular chamber 107 is shown to be continuous through flotation structure 103 and water column tube 104. A water column with waterline 117 is present in hollow tubular chamber 107 and is continuous with the surrounding body of water through the opening, aperture, and/or mouth, in the bottom of water column tube 104. Waterline 117 is at a different height than the waterline 102 of surrounding body 101 of water. This is due to tubular chamber 107 having an air pressure greater than that of the external atmospheric pressure, which circumstance comes to pass because of the mode of operation of the shown embodiment of the disclosed device.

In this embodiment, during operation internal waterline 117 typically oscillates around a mean waterline (i.e. mean vertical position) that is lower than the external mean waterline (i.e. the mean vertical position of 102). And, in some embodiments, during operation internal waterline 117 oscillates in a range that does not overlap/include the external mean waterline over the course of several wave cycles e.g. at least 30 seconds at a time, if not significantly longer. The oscillation of the internal waterline about a mean waterline that is lower than the external mean waterline occurs because "inhaling" through valve 111 (i.e. entry of air to the hollow chamber 107) is easier (i.e. less inhibited; experiences a lower pressure drop; experiences less resistance to flow) than is "exhaling" through power take off units 105 (i.e. exit of air from the hollow chamber 107). Accordingly, within the internal water column the internal waterline 117 is "pumped" downward by the vertical oscillations of the device caused by the passage of waves. This has the advantage of increasing the pressures across the power take off turbines.

As IWC 100 rises and falls on waves in body of water 101, water column 117 does not tend to oscillate with the same phase as the waves passing by the device 100 because it is isolated from wave action due to water column tube 104 extending to a depth where waves influence water particle motion less acutely. When IWC 100 rises toward a wave crest, water column 117 lags, requiring air to be inhaled through check valve 111. When IWC 100 falls toward a wave trough, the air inside chamber 107 is pressurized, check valve 111 closes, and air is forced out through PTOs 105. Water column 117 lags descending as well. This behavior continues, resulting in an oscillatory behavior 118 of waterline 117. During operation, the amount of pressurized air exhaled is controlled in such a way that chamber 107 is on average pressurized some amount above atmospheric pressure, which forces the mean level of water column waterline 117 to remain below the mean level of waterline 102 of surrounding body of water 101.

Valve 112 is a check valve set to open at a given pressure of air chamber 107 which is higher than typical operating pressures. Higher pressures can be experienced when wave heights increase (e.g. storms, etc.) or when wave periods decrease. When chamber 107 pressure exceeds the opening pressure of valve 112, air is diverted into void 114 of flotation structure 103. This forces some of the ballast water 115 to exit, and return to the body of water 101, through ballast opening 119. Increasing the amount of air inside flotation structure void 114 and decreasing ballast water 115 allows IWC 100 to float higher in the surrounding body of water 101 (i.e. more of IWC 100 will protrude above waterline 102, increasing its freeboard). The result of this passive deballasting can be seen in FIG. 5.

During normal operation, i.e. when the embodiment is ballasted to contain a large amount of ballast water 115 and therefore "rides low" in the water to obtain a relatively large waterplane area, the amount of ballast water in flotation structure 103 can fill a major part of the volume of the flotation structure. For instance, in some embodiments, during periods of operation, enough water ballast is contained within flotation structure 103 and/or within hollow flotation collar 116 that the average density of the device (not counting the mass and volume of the water/air contained within the interior channel of water tube 104, but counting the mass and volume of the remainder of the structure, including any ballast water therein) is greater than 500 kg per cubic meter, greater than 700 kg per cubic meter, and/or greater than 850 kg per cubic meter. In some embodiments, during periods of operation, enough ballast water is contained within flotation structure 103 and/or within hollow flotation collar 116 that more than 50%, more than 60%, more than 70%, and/or more than 80% of the mass of the structure (again, not counting the mass of the water/air contained within the interior channel of water tube 104, but counting the mass of the remainder of the structure, including any ballast water therein) is from the mass of the ballast water.

Figure 5:
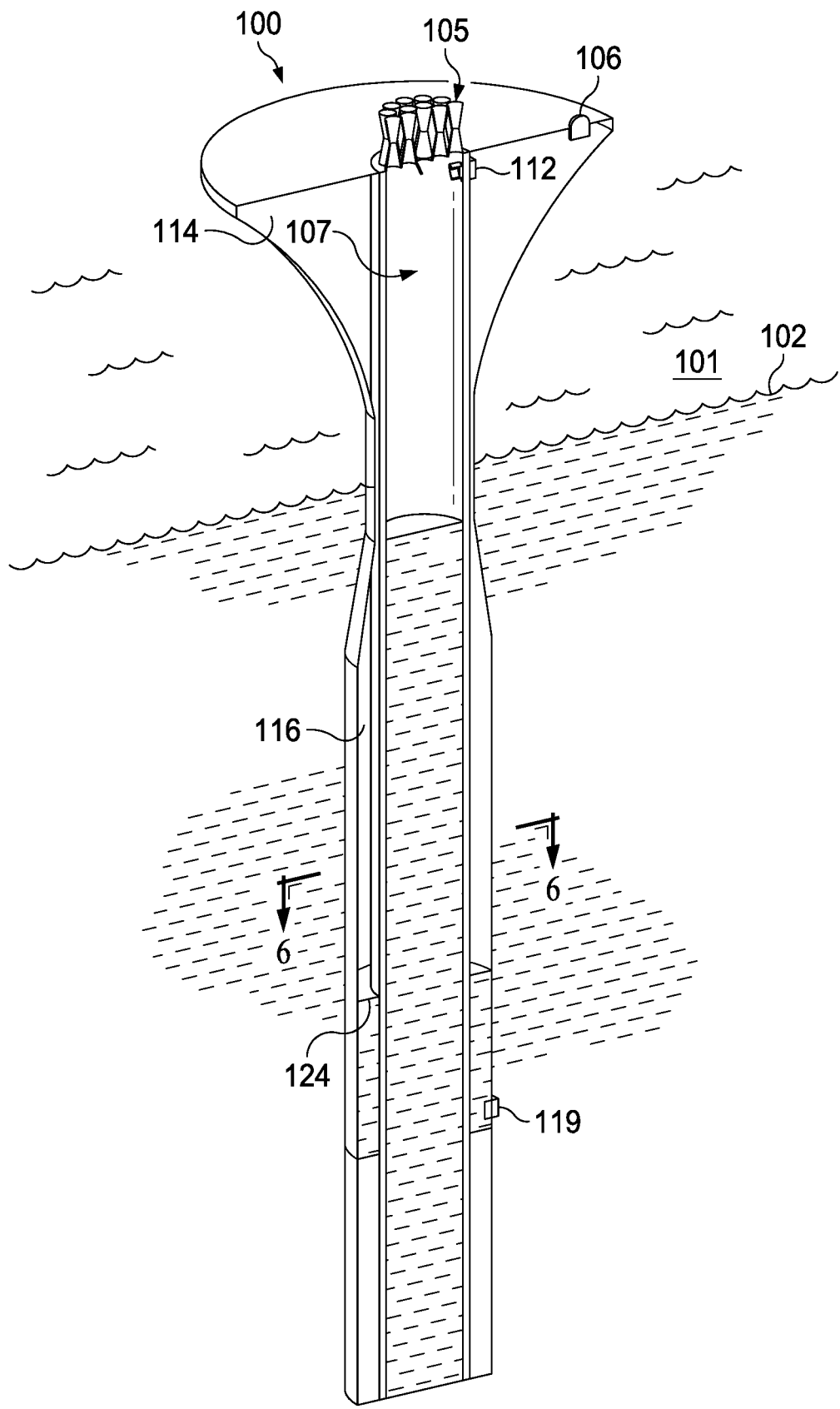
FIG. 5 is another perspective view of a cross section of the embodiment of FIG. 1

FIG. 5 shows a perspective cutaway view of the same embodiment of the current disclosure that is illustrated in FIGS. 1-4.

IWC 100 is shown floating in a body of water 101 with waterline 102. Ballast water has been passively pumped out of floatation structure void 114 through ballast opening 119 such that the ballast water's new waterline is 124, in buoyancy collar 116. (In other embodiments, deballasting can occur actively, using e.g. an electrically powered mechanical pump.) The decreased weight of IWC 100 has allowed it to increase its freeboard such that its waterline 102 in the surrounding body of water 101 is close to the bottom of IWC 100. The waterplane area intersected and/or defined by waterline 102 of the IWC 100 configuration illustrated in FIG. 5 is smaller than the corresponding waterplane area of the configuration illustrated in FIG. 4, thus the motion and/or vertical responsiveness of the IWC 100 configuration illustrated in FIG. 5 due to waves will be less than that of the configuration illustrated in FIG. 4 as well. The relatively reduced motion of the configuration IWC 100 illustrated in FIG. 5 means that less pressure will be developed in chamber 107. Once the pressure peaks decrease below the pressure setting of check valve 112, air flow will then predominately pass through PTOs 105. In this way, IWC 100 has a passive feature to allow it to handle increased wave excitation without overloading PTOs 105 and without subjecting the device to excessive structural loads. When wave excitation has decreased and IWC 100 requires a lower freeboard to continue making power, valve 106 can open (e.g. by electronic control), allowing air inside of flotation structure void 114 to escape and water to flow into buoyancy collar 116, and floatation structure void 114, through ballast opening 119. As more of flotation structure void 114 is filled with water, waterline 102 will move higher on IWC 100 and can, if ballasting continues, eventually resume the configuration shown in FIG. 4.

Figure 6:
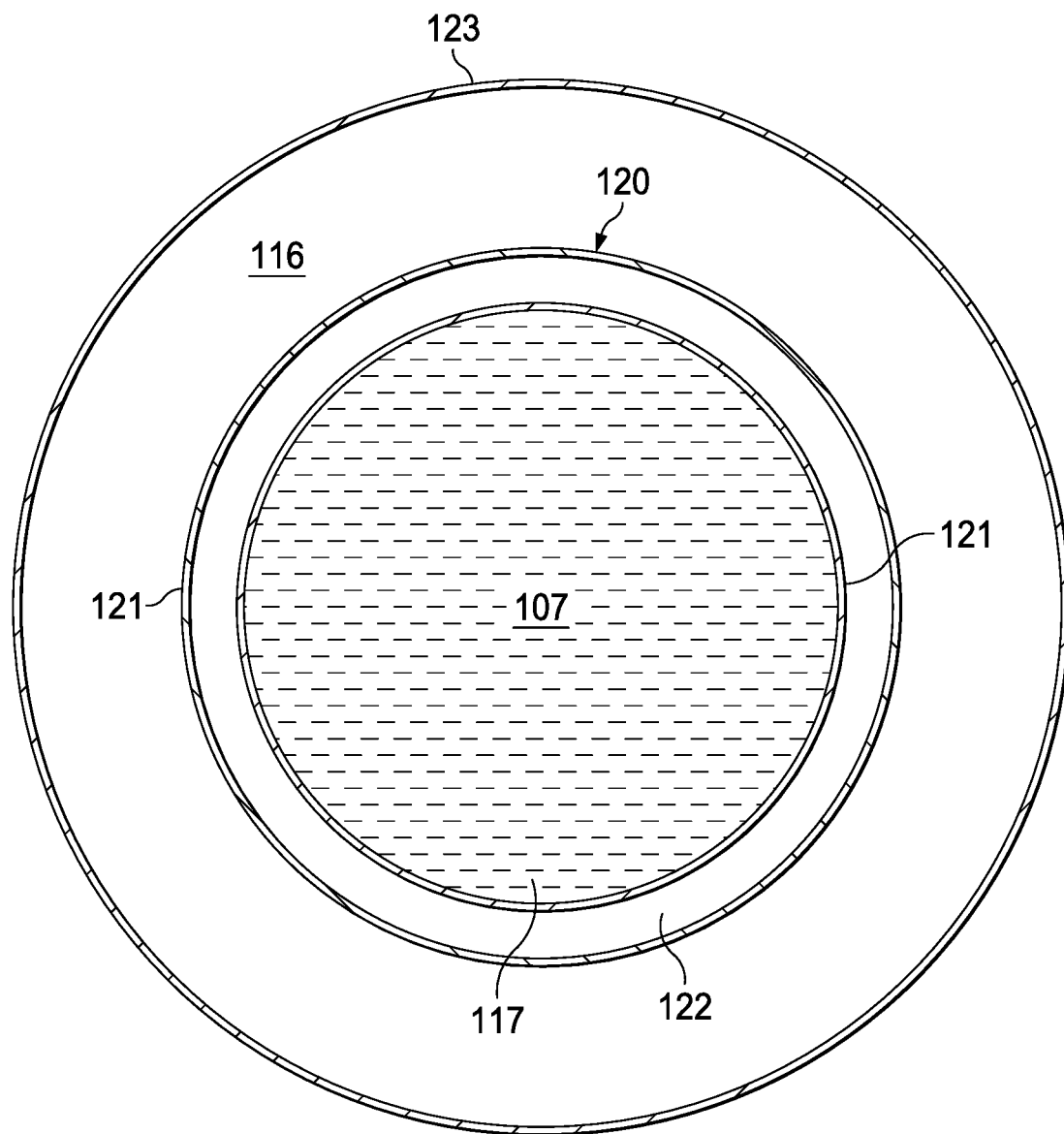
FIG. 6 is a bottom view of the embodiment of FIG. 1.

FIG. 6 shows a cross-sectional view of the same embodiment of the current disclosure that is illustrated in FIGS. 1-5. The sectional plane of illustration in FIG. 6 is taken across line 6-6 in FIG. 5. Water tube 117 is formed of inner 121 and outer 121 tube walls, between which is cement and/or another cementitious material and/or mixture of materials.

FIG. 6 shows the cross section of water column tube (104 in FIG. 5) and its components. The central columnar tube of the IWC (100 in FIG. 5) is 120, which encloses tube and/or chamber 107 which contains water column 117. Central column 120 is comprised of inner and outer skins 121 (e.g. steel or aluminum), between which is filled structural material (e.g. concrete) 122. This composite sandwich of materials creates a strong spine around which the components of IWC (100 in FIG. 5) can attach to and built out from. Nominally water-filled flotation collar 116 is shown to be comprised of an outer skin 123 and shares its inner skin 121 with the outer wall of central column 120 in the shown embodiment.

Figure 7:
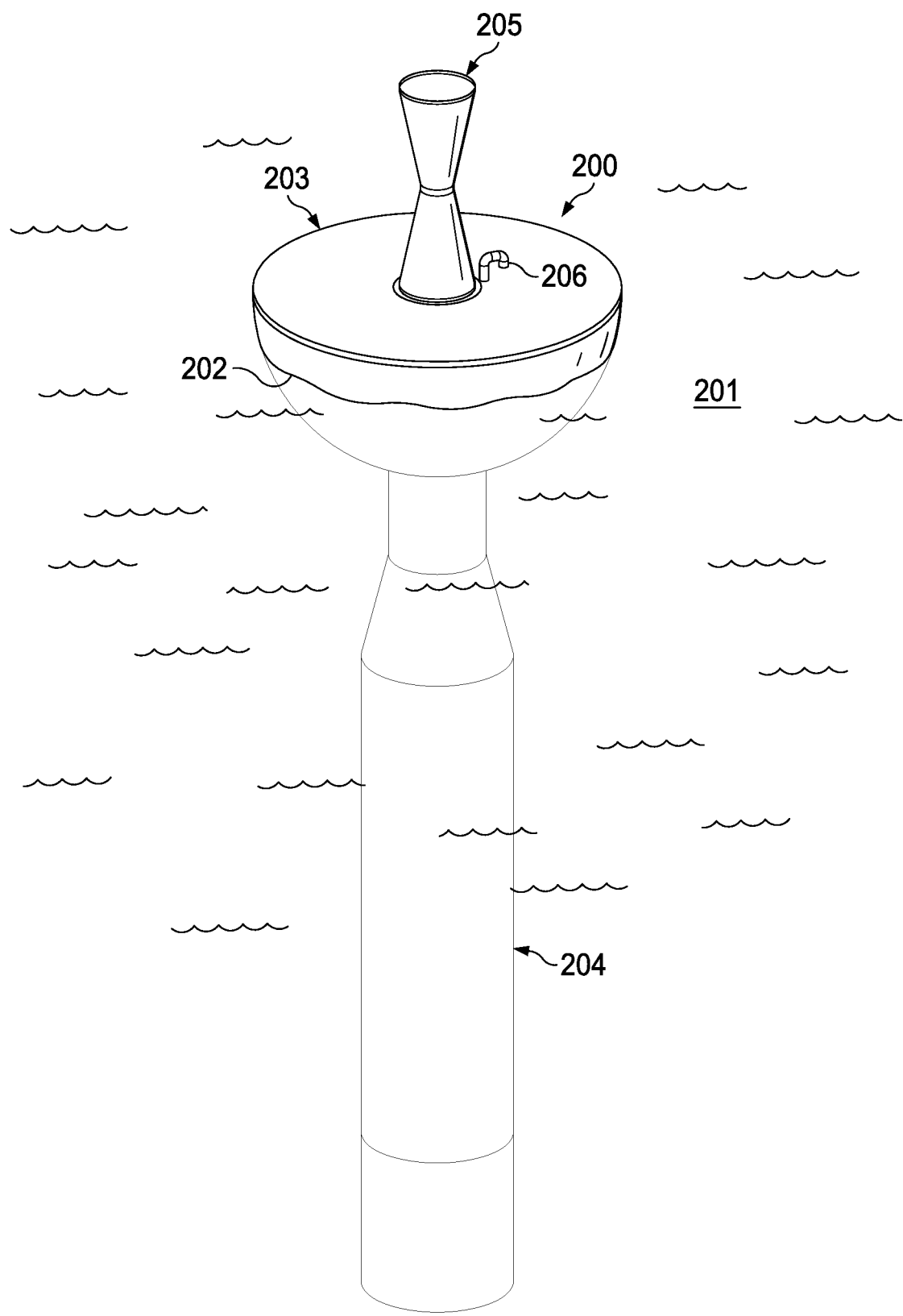
FIG. 7 is a perspective schematic view of a second embodiment of the present invention.

FIG. 7 shows a perspective view of an embodiment of the current disclosure.

Inertial water column wave energy convertor (IWC) 200 is floating in a body of water 201 with waterline 202. IWC 200 is comprised of two primary components, flotation structure 203 and water column tube 204. Flotation structure 203 has a hull structure intersected by waterline 202. A hollow chamber or tube runs from the bottom of water column tube 204, to the top of flotation structure 203. This chamber or tube is shown in detail in FIG. 8 and allows a column of water to rise and fall within it. A pneumatic power take-off module (PTO) 205 covers the top of the upper hollow opening in the hollow tube which penetrates floatation structure 203. Ballast discharge pipe 206 allows IWC 200 to change its weight and rise partially out of the water (causing waterline 202 to become located farther down, and/or on water column tube 204).

Figure 8:
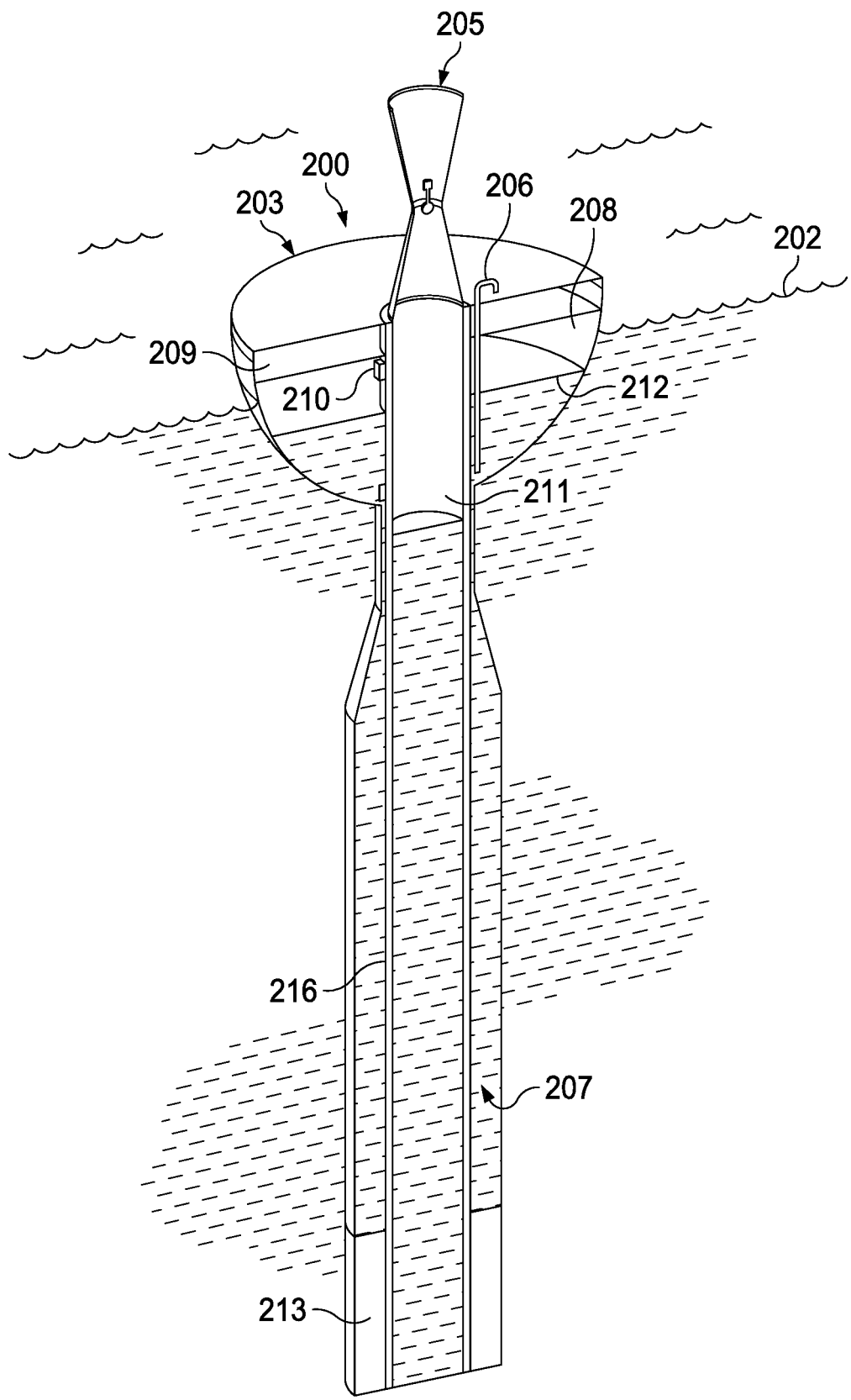
FIG. 8 is a perspective view of a cross section of the embodiment of FIG. 7.

FIG. 8 shows a perspective cutaway or sectional view of an embodiment of the current disclosure.

IWC 200 is shown to have an internal configuration similar to that of IWC 100 shown in FIG. 4. Tubular wall 216 establishes, at least in part, a tubular structure with upper and lower mouths through which water tends to oscillate, and an inner wall about which buoyancy collar 207 is positioned. Key differences are that buoyancy collar 207 is no longer continuously connected to floatation structure void 208. Instead, it has been either sealed as a separate air-filled compartment or filled with a material with less density than water (e.g. structural foam, aerated concrete, etc.) to provide permanent buoyancy. Floatation structure 203 now contains two chambers, void 208, which is partially filled with water and permanent buoyancy chamber 209, which is an isolated air-filled void.

In this embodiment and others, void 208 has larger internal volume than the volume of (i.e. enclosed inside) chamber 211. In other words, if void 208 were completely filled with a first fluid, and chamber 211 were completely filled with a second fluid, the volume of the first fluid enclosed in void 208 would be larger than the volume of the second fluid enclosed in chamber 211. For instance, the volume of void 208 can be 4 times larger than the volume of chamber 211.

Furthermore, in this embodiment and others, the area of the free surface of the ballast water 212 inside void 208 is greater (in fact substantially greater) than the area of the free surface of the column of water enclosed in chamber 211.

Furthermore, in this embodiment and others, a horizontal cross-sectional area of void 208 (e.g. at the location of the free surface of ballast water 212) is greater (in fact substantially greater) than the maximal horizontal cross-sectional area of the chamber 211.

Furthermore, in this embodiment and others, the mass of the water inside void 208 is greater than the mass of the embodiment as a whole (the latter excluding the mass of the water inside void 208). In other words, the mass of the water inside void 208 is greater than the "dry" or "unballasted" mass of the embodiment. A fortiori, the product of (1) the total interior volume of void 208 (the volume occupied by water plus the volume occupied by air) and (2) the density of water is greater than the "dry" or "unballasted" mass of the embodiment.

PTO 205 is a bi-directional turbine (e.g. Wells turbine, impulse turbine, etc.). Air directed through check valve 210 during over pressure events in chamber 211 acts to displace ballast water 212 by forcing it up and out of ballast discharge pipe 206. In this way, IWC 200 can decrease its weight and achieve a higher freeboard during high energy wave conditions in a manner similar to IWC 100 of FIGS. 1-6. In smaller waves, water can be pumped back into ballast discharge pipe 206 and/or water can be admitted to the chamber 208 by opening valve 210, thereby increasing the volume of ballast water 212, increasing the weight of IWC 200, and thereby lowering its freeboard back to 202. Permanent ballast collar 213 provides additional stability, similar to the permanent ballast collar incorporated within IWC 100 of FIGS. 1-6.

Figure 9:
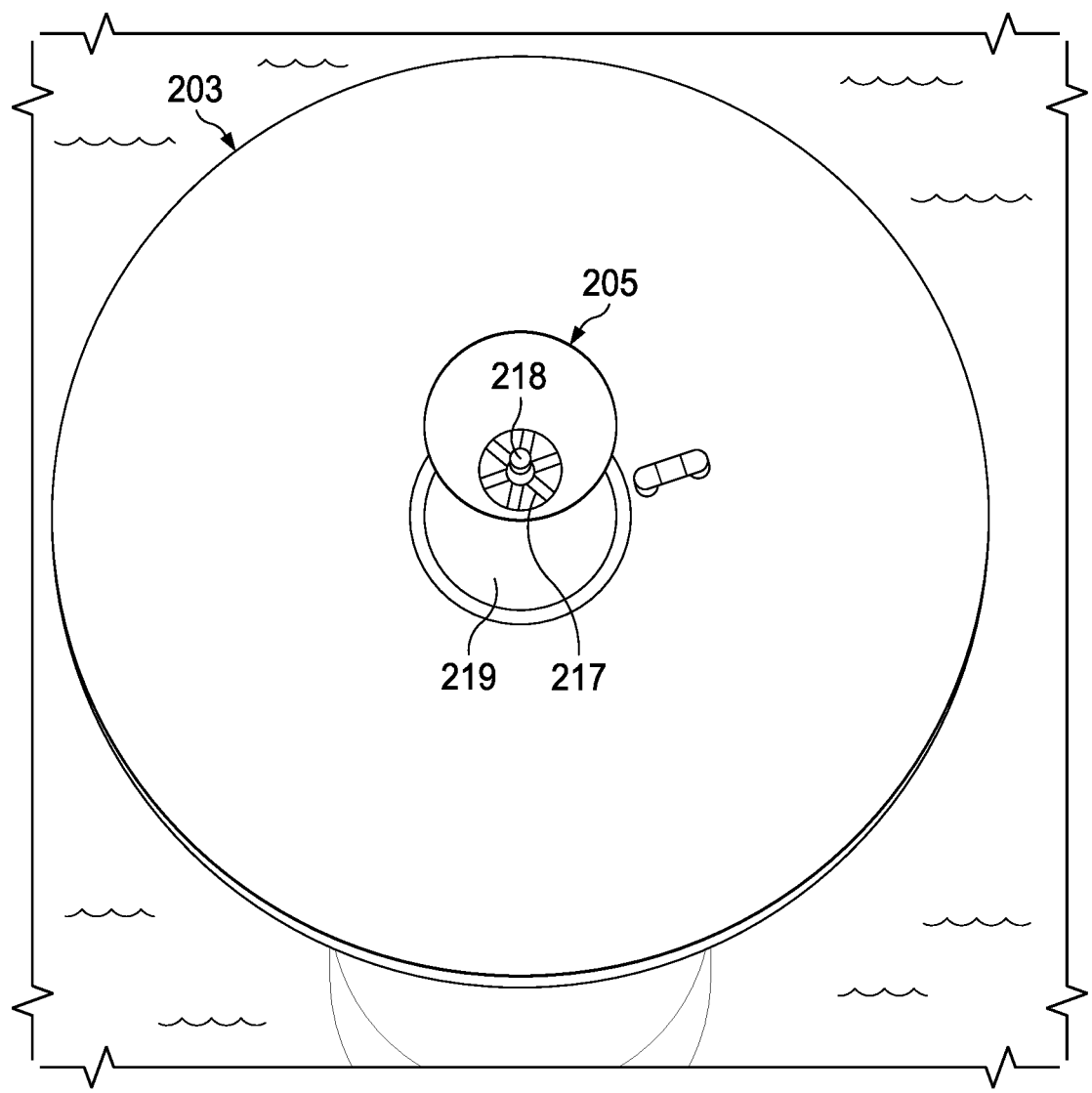
FIG. 9 is an elevated, perspective view of the embodiment of FIG. 7.

FIG. 9 shows a perspective view of the same embodiment of the current disclosure that is illustrated in FIGS. 7 and 8.

Pneumatic power take-off module 205 is shown arranged on top of the hollow chamber 211 (see FIG. 8) in flotation module 203. The PTO is comprised of a turbine 217 and a generator 218 contained within a venturi-shroud housing 219, which is shaped like a venturi tube having a constricted portion between its upper and lower mouths. The convergent/divergent nozzle shape accelerates air entering the turbine blades and slows the flow exiting the turbine.

Figure 10:
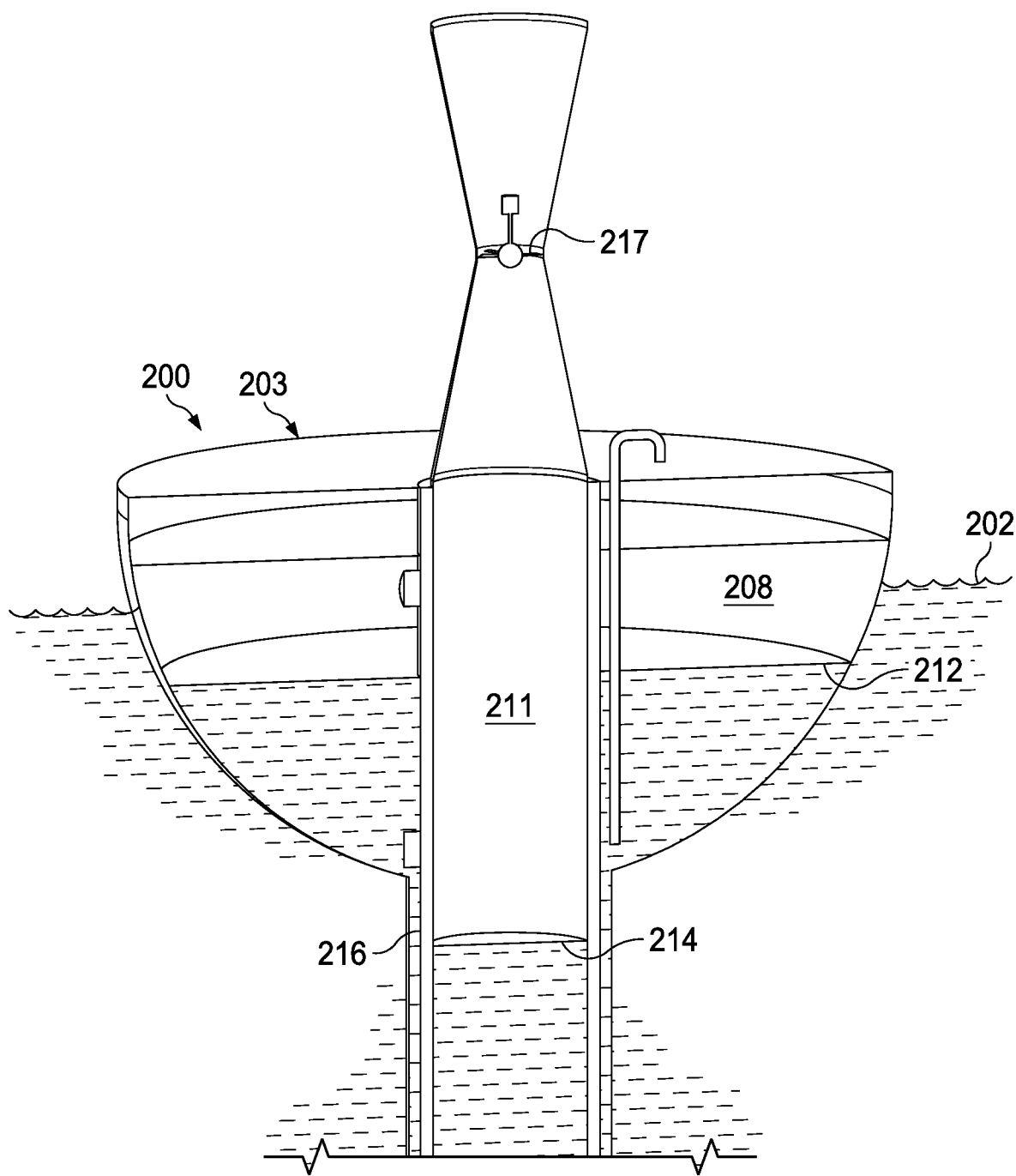
FIG. 10 is a cross sectional view of the upper portion of the embodiment of FIG. 7.

FIG. 10 shows a perspective cutaway view of the flotation module 203 of the same embodiment of the current disclosure that is illustrated in FIGS. 7-9.

IWC 200 is shown in a typical operational configuration: waterline 202 is located on the upper half of flotation structure 203 and flotation structure void 208 is partially filled with ballast water 212. The nominal resting surface 214 of water column is located below the nominal and/or average waterline 202, indicating that the uppermost air-filled portion 211 of the tube 216, is pressurized, which causes airflow through turbine 217. Similar to the embodiment 100 of FIGS. 1-6, in an embodiment, waterline 214 oscillates about a mean vertical position that is lower (e.g. at least 1 meter lower, at least 2 meters lower, or at least 3 meter lower) than the mean vertical position of waterline 202. And, in some embodiments, waterline 214 oscillates in a range (during at least some periods of operation) that is lower than, and spaced from, the mean vertical position of waterline 202. (In other embodiments, however, this is not true: in these embodiments, waterline 214 oscillates around a mean waterline having a vertical position at approximately the same vertical level as the mean waterline of waterline 202.)

Figure 11:
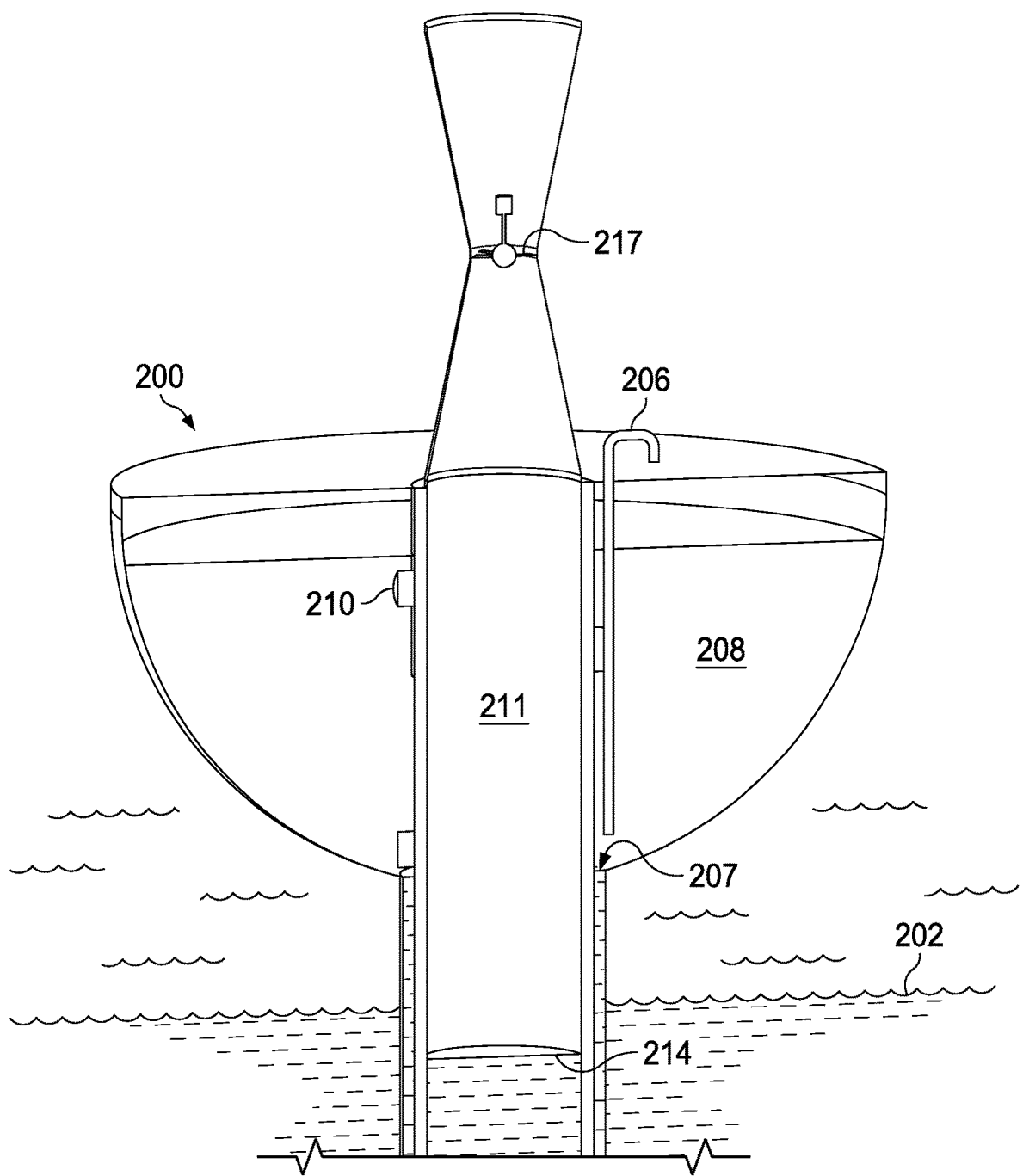
FIG. 11 is another cross sectional view of the upper portion of the embodiment of FIG. 7.

FIG. 11 shows a perspective cutaway view of the same embodiment of the current disclosure that is illustrated in FIGS. 7-10.

IWC 200 is shown in its survival configuration: ballast water (212 in FIG. 10) has been removed from chamber 208 through the passive pumping of pressured air into the chamber through check valve 210 which forced the water up and out of ballast discharge pipe 206. Waterline 202 is now located on and about the narrowest section of flotation collar 207, minimizing the response of IWC 200 to waves due to the significantly reduced waterplane area at the new waterline 202. Waterline 214 is still below waterline 202 of the surrounding body of water indicating that chamber 211 is still pressurized, thus still inducing air to flow through turbine 217.

Figure 12:
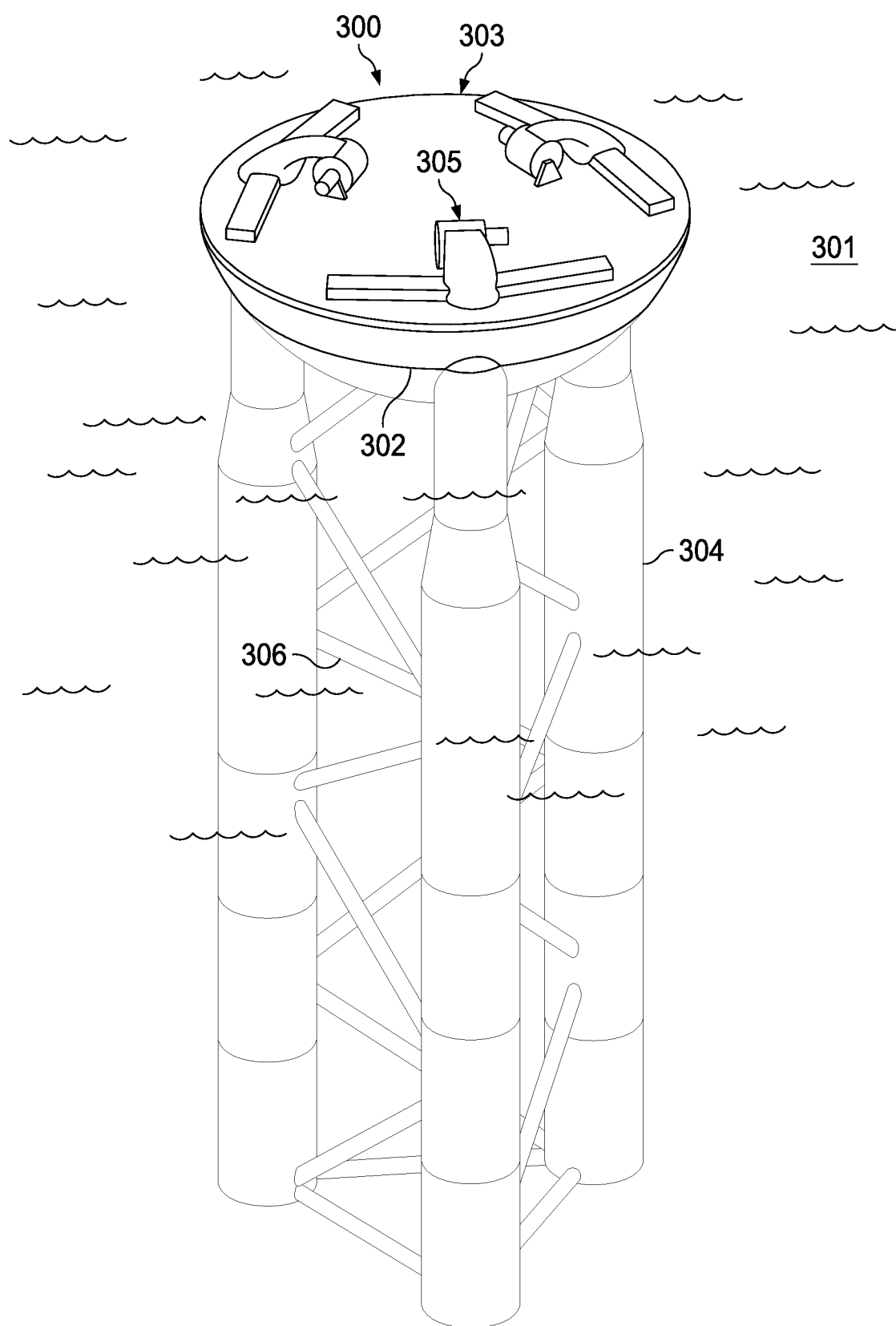
FIG. 12 is a perspective schematic view of a third embodiment of the present invention.

FIG. 12 shows a perspective view of an embodiment of the current disclosure.

IWC 300 is floating in a body of water 301 with waterline 302. IWC 300 is comprised of a flotation structure 303 and three water column tubes, e.g., 304. Water column tubes 304 are similar in construction and function to water column tubes 104 in embodiment 100 illustrated in FIGS. 1-6, i.e. they permit a column of water to move inside them so as to drive air through PTOs 305, and they can contain internal hollow void(s) (e.g., an annular tubular water-filled void) for holding ballasting water such as buoyancy collar 116 in embodiment 100 in FIG. 5, and buoyancy collar 207 in embodiment 200 in FIG. 8.

Flotation structure 303 has a convex profile beneath waterline 302. Pneumatic power take-off assemblies (PTOs) 305 are installed over the hollow central tube of respective water column tubes, e.g., 304. Water column tubes 304 are braced together with structural members 306, arranged to form a truss. In general, the operation of this embodiment can be understood as qualitatively similar to that of embodiment 100 illustrated in FIGS. 1-6, except that the tripod-like nature of the three tubes 304 enable the structure to exhibit greater stability when deballasted such that the buoy rises above the water surface (e.g. to become less sensitive and responsive to storm waves).

Figure 13:
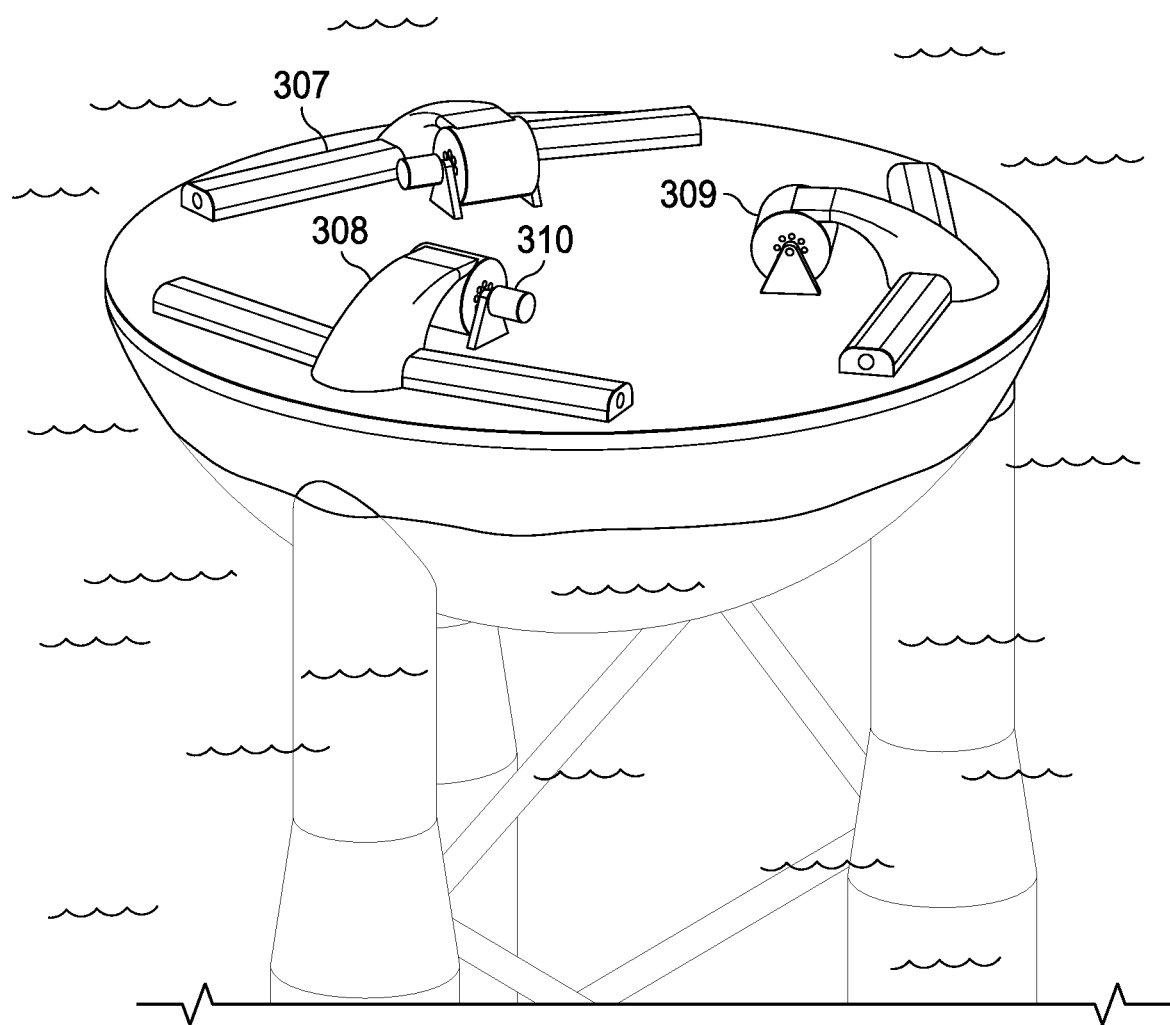
FIG. 13 is another perspective view of the third embodiment.

FIG. 13 shows a perspective view of the same embodiment of the current disclosure that is illustrated in FIG. 12.

Pneumatic power take-off assemblies (PTOs) (305 in FIG. 12) are comprised of at least one solid-state check valve 307, at least one air director 308, and at least one boundary layer effect turbine 309 which is coupled to at least one respective generator 310. The solid-state check valve 307 is configured to allow air to enter the air director 308, but not to escape therefrom.

Figure 14:
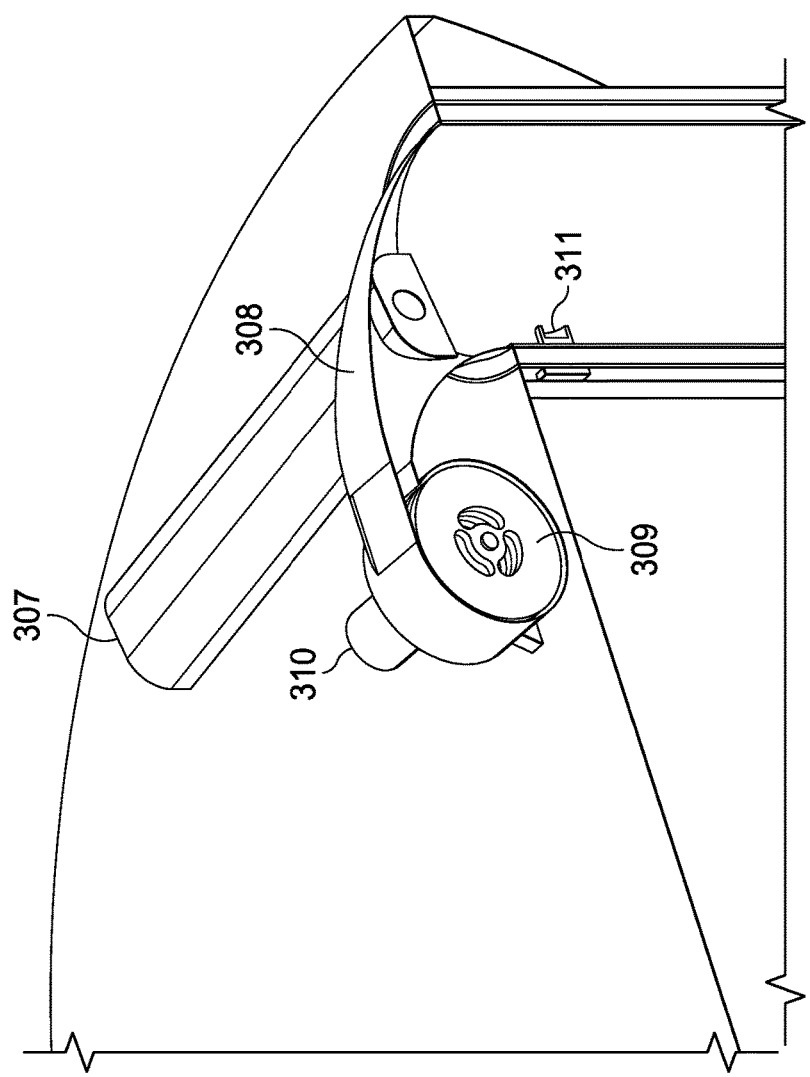
FIG. 14 is an enlarged, sectional view of the embodiment of FIG. 12.

FIG. 14 shows a perspective cut-away view of a pneumatic power take-off assembly of the same embodiment of the current disclosure that is illustrated in FIGS. 12 and 13.

Pneumatic power take-off assemblies (PTOs) (305 in FIG. 12) are comprised of at least one solid state Tesla valve 307, air cowling 308, and Tesla turbine 309 which is coupled to generator 310. Also shown is check valve 311, which is set to a pressure which could be reached in excessive wave conditions, providing a secondary air path to help to avoid damage to the PTO components.

Figure 15:
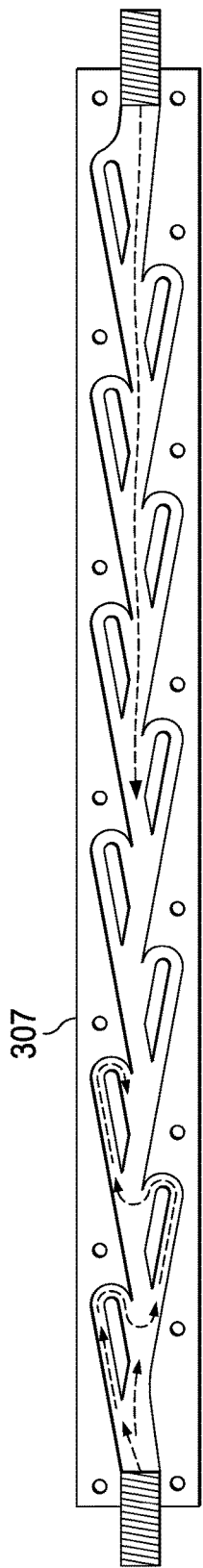
FIG. 15 is a plan cut-away view of a valve of the embodiment of FIG. 12.

FIG. 15 shows a plan cut-away view of a solid state Tesla valve 307 incorporated within a pneumatic power take-off assembly (305 in FIG. 12) of the same embodiment of the current disclosure that is illustrated in FIGS. 12-14.

The internal configuration of solid-state check valve (Tesla valve) 307 utilized in PTO 305 is shown.

Figure 16:
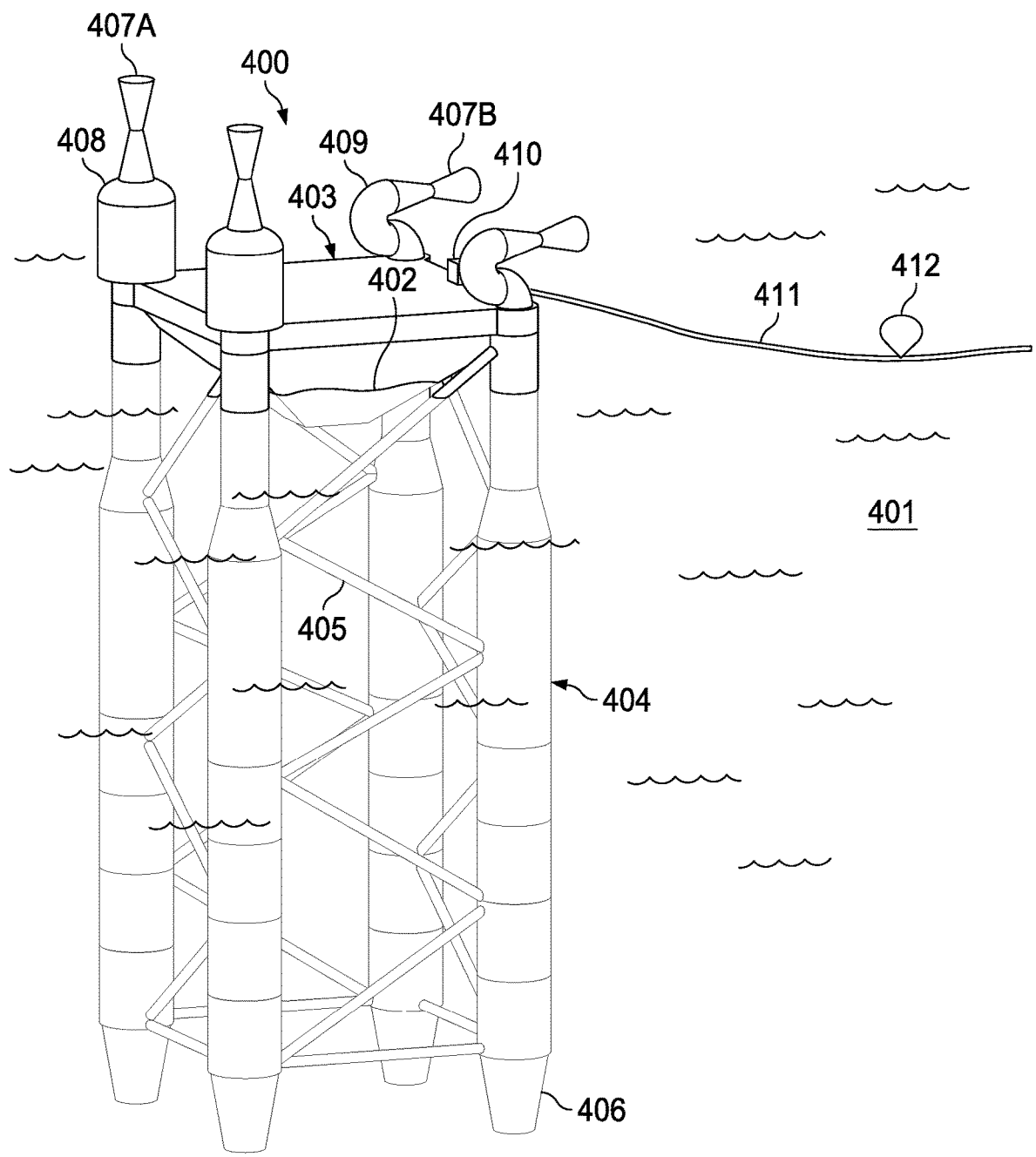
FIG. 16 is a perspective schematic view of another embodiment of the present invention.

FIG. 16 shows a perspective view of an embodiment of the current disclosure.

IWC 400 is floating in a body of water 401 with waterline 402. IWC 400 is comprised of a flotation structure 403 and four water column tubes, e.g., 404. Each water column tube 404 is similar in construction and function to the water column tube 204 incorporated within embodiment 200 illustrated in FIGS. 7-11. Flotation structure 403 has a polygonal profile and is intersected by waterline 402. Water column tubes 404 are braced together with structural members 405, arranged to form a truss. Water entering or exiting the bottom of each water column tube 404 must also pass through a respective nozzle 406, which constricts the hollow central chamber of water column tubes 404 to a smaller diameter at their bottoms. The larger upper diameter and smaller lower diameters of nozzles 406 acts to accelerate water flow exiting the water column tube. The operation of this embodiment with respect to power-generation is similar to previous embodiments.

Pneumatic power take-off assemblies (PTOs) 407 are installed over the hollow central tube of each respective water column tube 404 in one of two different configurations. Two PTOs, e.g., 407A, are installed vertically in conjunction with pneumatic accumulators 408. This arrangement allows pulsating air from respective tubes 404 due to wave oscillation to be buffered, smoothed, and/or evened out, to produce a steadier flow of air prior to being passed through respective PTOs, e.g., 407A.

The two other PTOs, e.g., 407B, are installed horizontally on directional flow mounts, e.g., 409. The directional flow mounts 409 redirect vertical air flow exiting from the respective water column tubes 404 into a horizontal direction through the respective PTOs, e.g., 407B. When air escapes from the horizontal PTO modules 407B, a thrust is produced, which can accelerate IWC 400. Directional flow mounts 409 are able to rotate about a vertical axis running through the center of the respective water column tube 404 upon which they are installed. This allows thrust produced by air exiting PTO modules 407B to be vectored (i.e. the thrust produced can be directed to produce linear and/or rotational acceleration of IWC 400) and the embodiment 400 to be steered, e.g., in a desirable direction and/or toward a desirable destination.

Junction computation box 410 is installed on, and/or attached to, the flotation module 403 and may contain a variety of electronic equipment, including, but not limited to: computers, routers, memory modules, and energy storage devices, and/or it may pass information and/or data to computation equipment contained in and/or on the structure of IWC 400. Connected to junction computation box 410, and extending into the surrounding body of water 401, is data and power cable 411. Cable 411 may contain fiber optic, high power, low power, digital signal, analog signal, and/or other types of signal/power/information/data transmission capability. Cable 411 can also be suspended in the surrounded body of water 401 at the surface by flotation device 412 which may be of an inflatable or rigid design.

Figure 17:
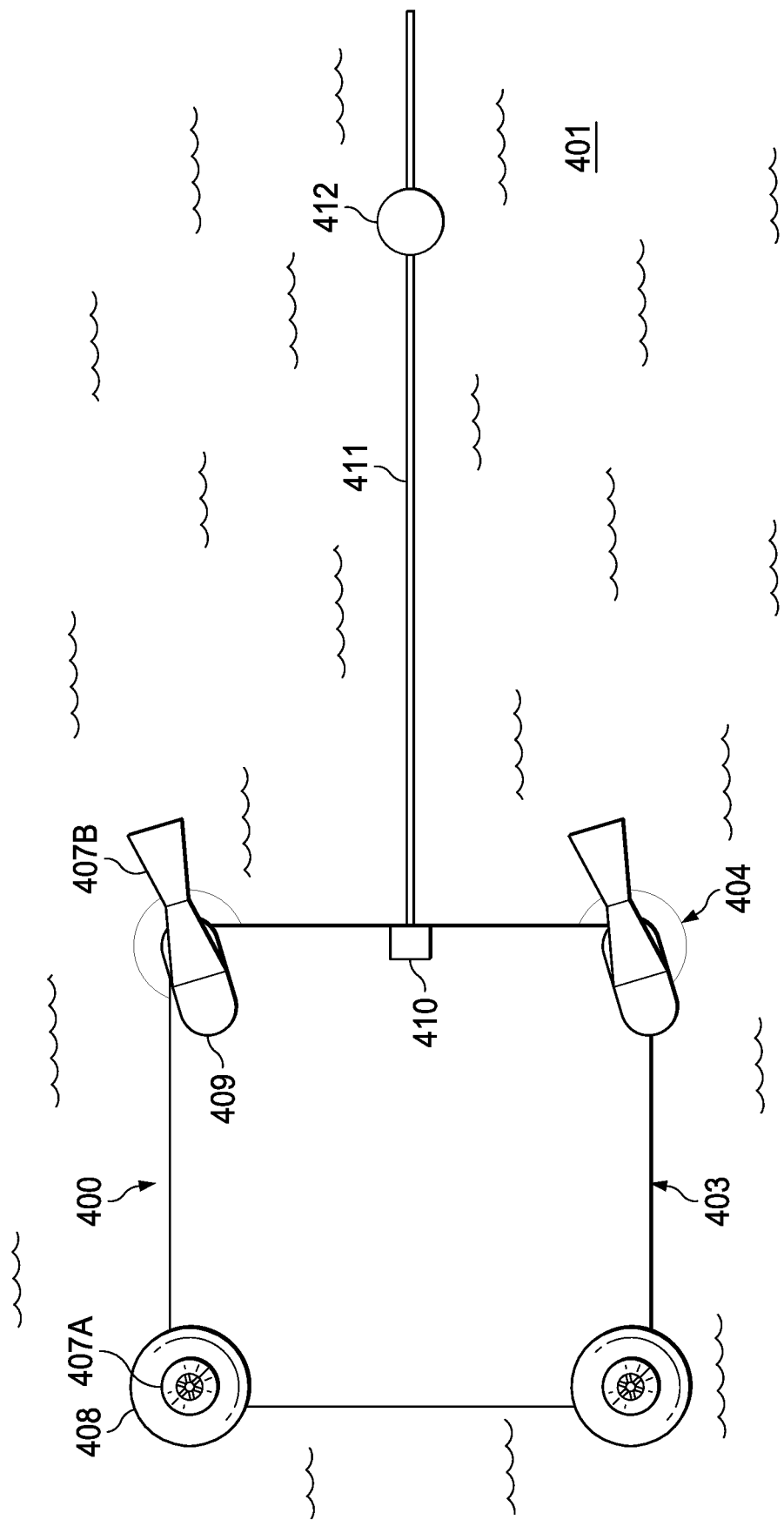
FIG. 17 is a top view of the embodiment of FIG. 16.

FIG. 17 shows a plan view of the same embodiment of the current disclosure that is illustrated in FIG. 16.

Pneumatic power take-off assemblies (PTOs) 407 are installed over respective hollow central tubes of water column tubes 404 in two different configurations. Two PTOs 407A are installed vertically atop pneumatic accumulators 408. The two other PTOs 407B shown are installed horizontally attached to directional flow mounts 409. The directional flow mounts 409 are shown with an angle of rotation relative to buoyancy structure 403, which allows a rotational acceleration to be imparted to IWC 400 allowing it to yaw in body of water 401.

Junction computation box 410 is shown in this view attached to flotation module 403 with cable 411 extending into body of water 401 with flotation device 412 attached.

Figure 18:
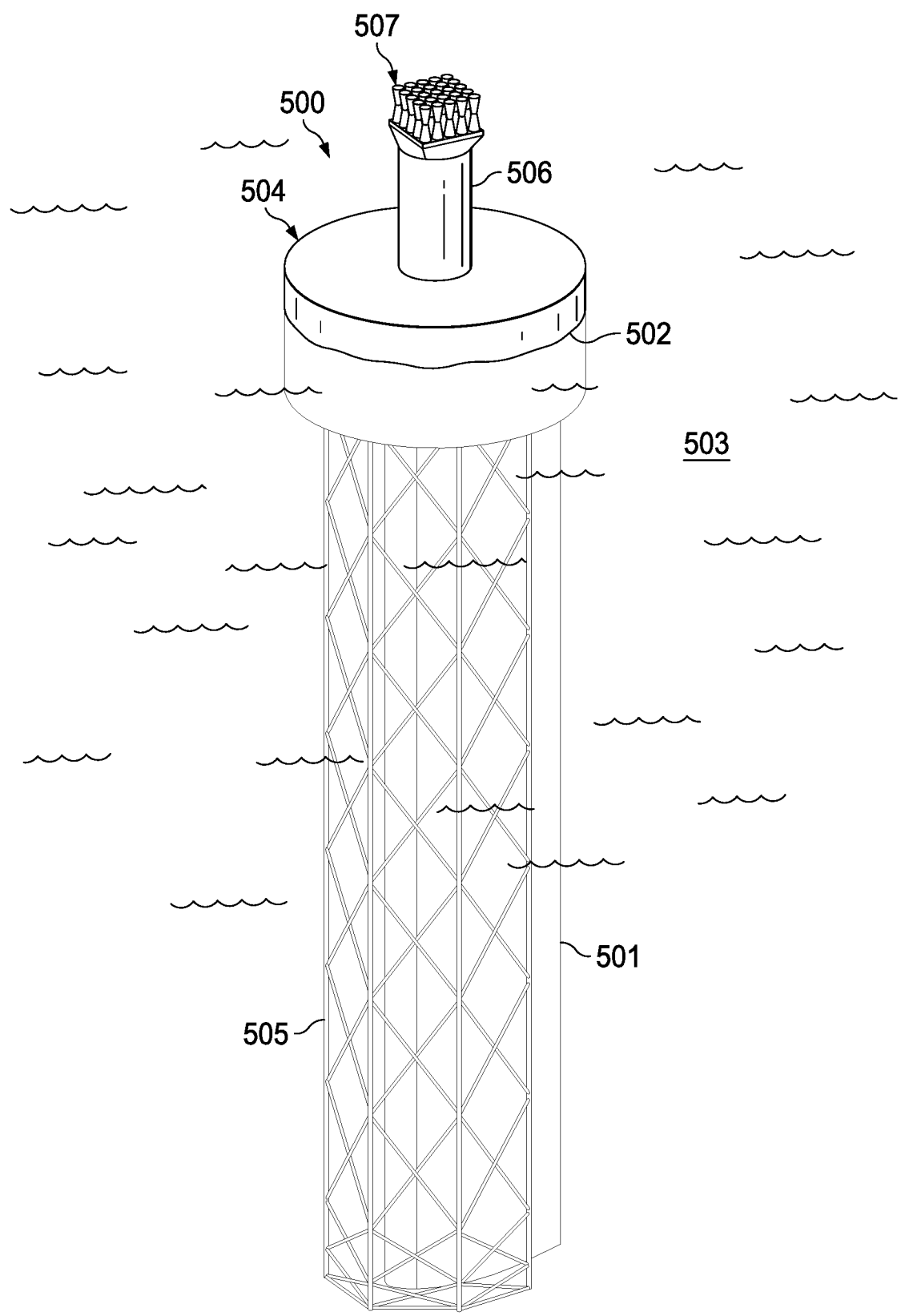
FIG. 18 is a perspective schematic view of another embodiment of the present invention.

FIG. 18 shows a perspective view of an embodiment of the current disclosure.

The illustrated embodiment 500 is of the type described above in the section entitled, "9. Hypo-Pressurized Air Pocket." Over pressurized air within the water column tube 501 is driven out through turbines 507 that offer little if any resistance to an outward direction of air flow. However, those same turbines actively resist, and extract power from, air flowing inward to the tube when the air therein is under pressurized. (In alternate embodiments the air outflow function is provided not by said turbines that offer little if any resistance, but instead by check-valves that allow air to flow outward but not inward.) As a corollary of allowing air to flow more freely outward than inward, the mean interior waterline inside water column tube 501 can rise to a level higher than the mean outside waterline 502.

Inertial water column wave energy convertor (IWC) 500 is floating in a body of water 503 with waterline 502. IWC 500 is comprised of two primary components, flotation structure 504 and water column tube 501. Flotation structure 504 has a cylindrical shape. Water column tube 501 has a non-axisymmetric shape and is supported by exterior truss structure 505. A hollow chamber runs from the bottom of water column tube 501, through the top of flotation structure 504, above flotation structure 504 inside of chimney 506. This chamber is shown in detail in FIG. 19 and allows a column of water to rise and fall within it, similar to the water column tube chamber of IWC 100 illustrated in FIGS. 1-6. Pneumatic power take-off modules (PTOs) 507 interface, and/or are arrayed or positioned, in a square grid pattern at the top of the hollow chamber inside chimney 506.

Figure 19:
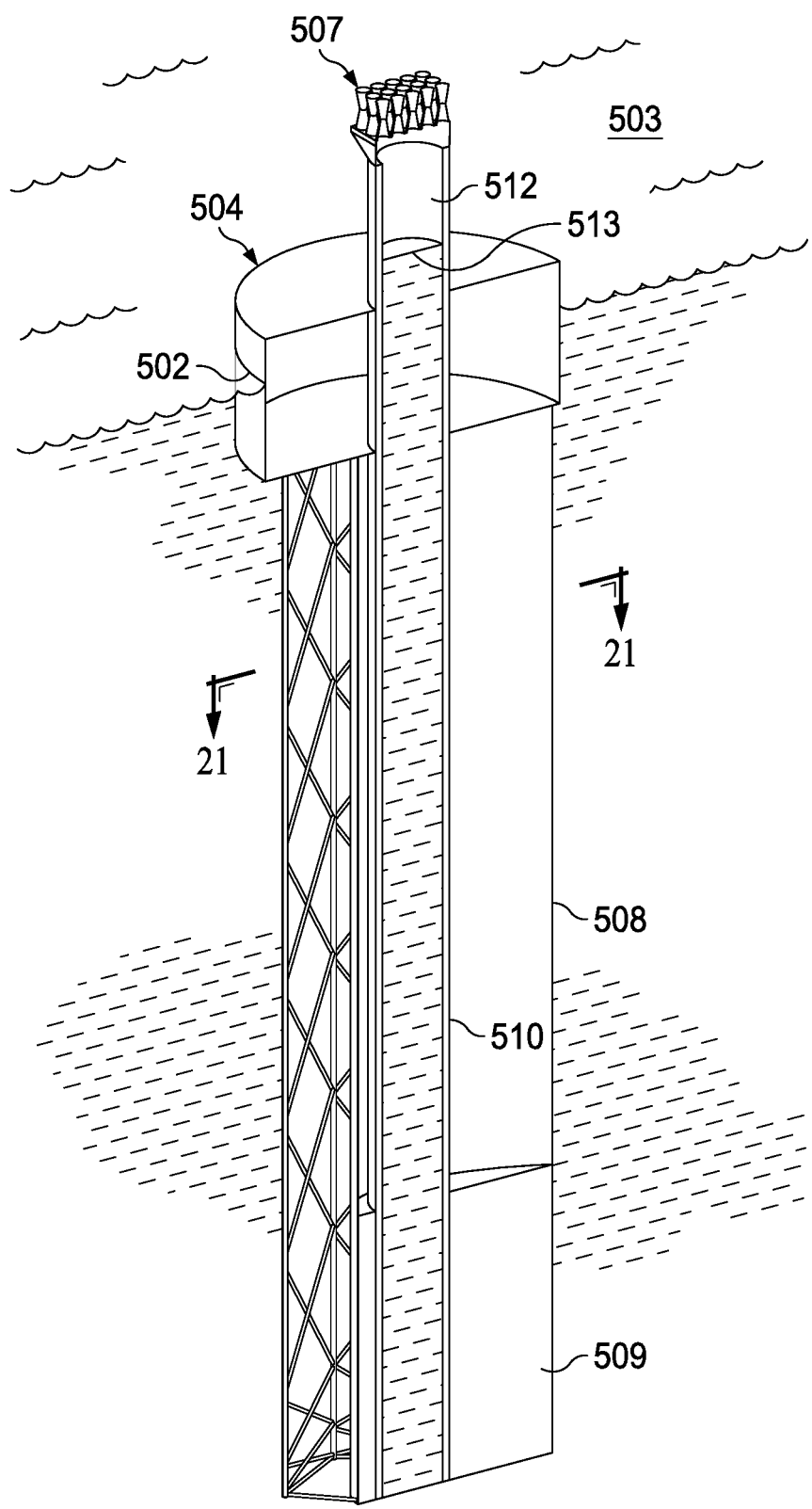
FIG. 19 is a perspective view of a cross section of the embodiment of FIG. 18.

FIG. 19 shows a perspective cutaway view of the same embodiment of the current disclosure that is illustrated in FIG. 18.

IWC 500 is floating in a body of water 503 with waterline 502. Flotation structure 504 is shown to be hollow, providing buoyancy for IWC 500. Flotation sponson 508 is shown to be filled with water, but can be evacuated and filled with air, allowing IWC 500 to rise out of the water during a storm similar to manner of storm protection utilized by embodiment IWC 200 illustrated in FIGS. 7-11 and shown in FIG. 11. The central chamber of IWC 500 is formed by hollow cylindrical tube 510, around which the components of IWC 500 are attached. Stability weight 509 is installed at the bottom of IWC 500 to lower its center of gravity and ensure stability at any prescribed waterline 502. Stability weight 509 may be comprised of one or more materials with a density greater than that of water.

The column of water, with upper surface 513, contained in hollow cylinder 510 has an average and/or resting waterline higher than the average and/or resting surface 502 of the surrounding body of water 503. This is achieved by expelling air with low or little resistance from chamber 512 when the buoy falls toward the trough of a wave, and restricting the inflow of air through the increased resistance provided by the turbine assemblies 507 when rising toward a wave crest. When the average elevation of waterline 513 reaches an equilibrium, or in otherwise normal operating conditions, it will oscillate about an average waterline that is elevated above the mean ocean waterline 502, i.e. its mean waterline might be as shown in 513. This oscillation provides the mechanism by which air is pulled through PTO modules 507. Because the waterline is elevated, it generates a head pressure that provides a downward force tending to drive the water column within tube 510 downward unless actively "held up." This downward force provides additional suction enabling the pressure differential that drives the turbines to be higher than it otherwise would be.

Figure 20:
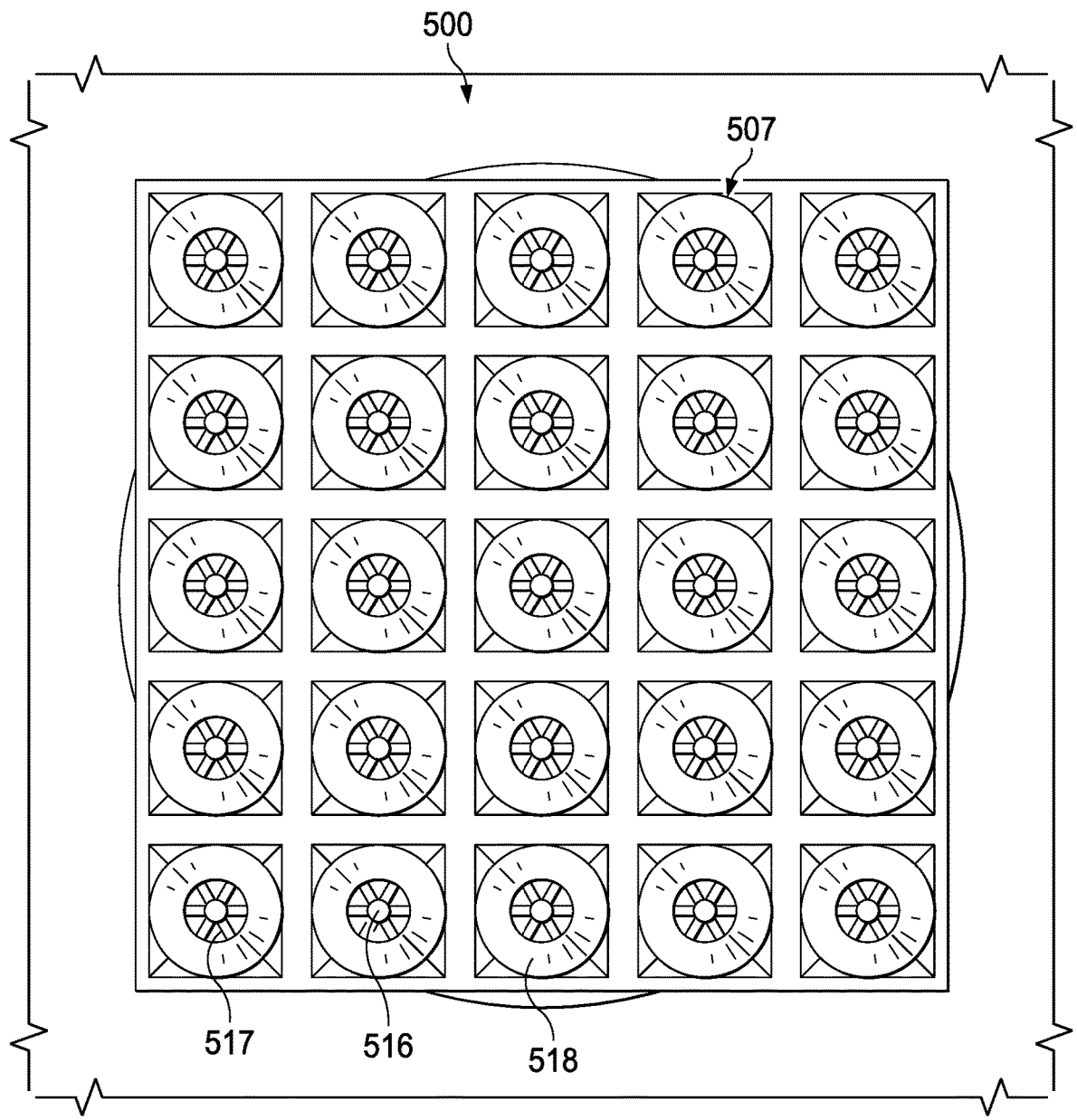
FIG. 20 is a top view of the embodiment of FIG. 18.

FIG. 20 shows a plan expanded view of the array of PTO modules 507 of the same embodiment of the current disclosure that is illustrated in FIGS. 18 and 19.

Pneumatic power take-off modules (PTOs) 507 are shown arranged in a square grid configuration at the top of chimney 506 of embodiment 500. Each PTO is shown to be comprised of a turbine, e.g., 517, which spins when air flows passed its blades, a respective rotatably connected generator, e.g., 516, whose shaft rotates when turbine 517 rotates, and a respective venturi shroud housing, e.g., 518.

The shaft rotation of generator 516 produces electricity. Turbine 517 and generator 516 are installed in tube 518, which has wide ends and a narrow middle, where the turbine is located. This shape profile results in air being accelerated when passing though the turbine, so as to pass through the respective turbine's blades at a relative increased and high velocity relative to the speed which it entered the respective tube 518 from the ambient atmosphere. The resistance of the generator is minimal when air flows out of central chamber of IWC 500, but is significant when air is being pulled inside. This behavior means that more electricity is generated when air is being pulled inside IWC 500 than when it is being expelled.

Figure 21:
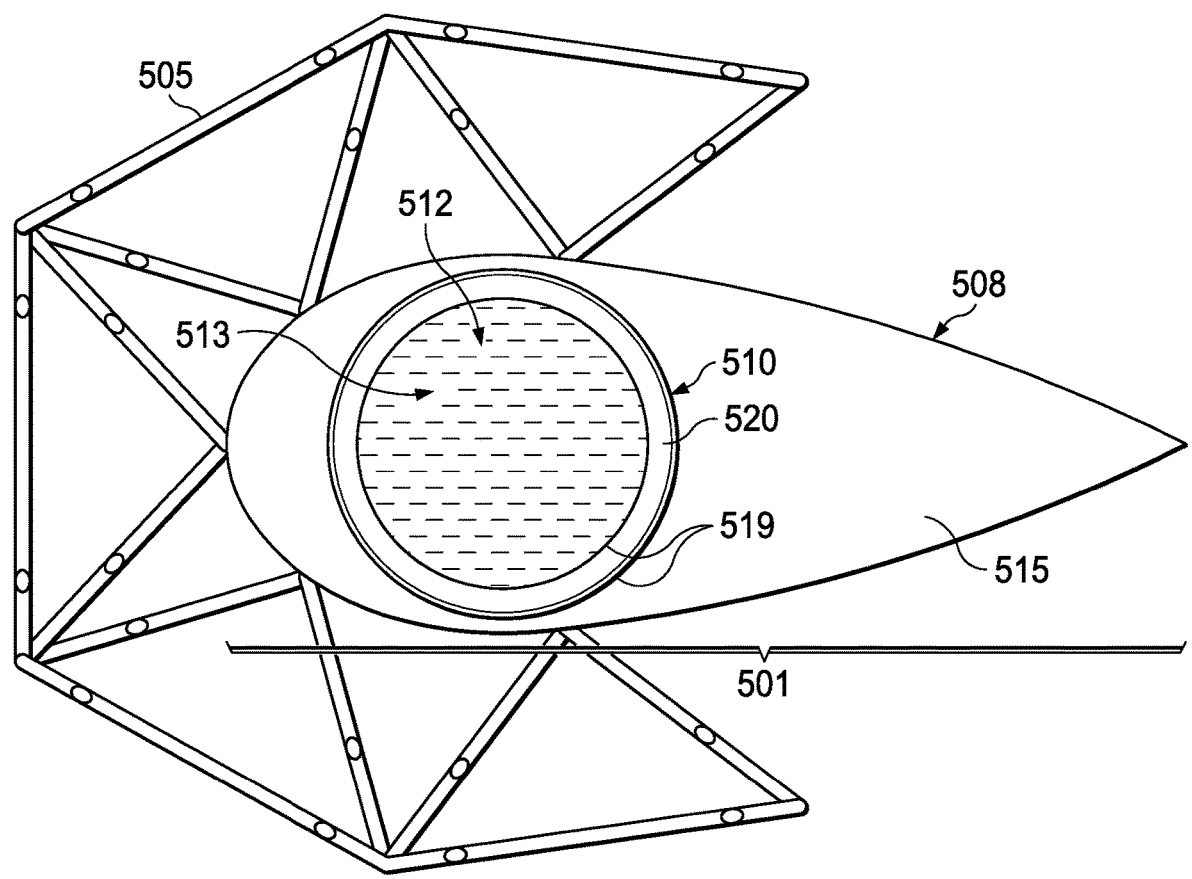
FIG. 21 is a downward cross sectional view of the embodiment of FIG. 19 taken along line 21-21.

FIG. 21 shows a cross-sectional view of the same embodiment of the current disclosure that is illustrated in FIGS. 18-20.

The section plane of the illustration in FIG. 21 is taken across line 21-21 in FIG. 19, and shows the cross section of water column tube 501 and its components. Water column tube 501 is supported by truss structure 505, enhancing its resistance to bending. The central column of IWC 500 is 510, which contains tubular chamber 512 in which water column 513 oscillates as IWC 500 moves in response to wave forces. Central column 510 is constructed with inner and outer layers 519 made from a material which is strong in tension (e.g. steel, aluminum, titanium, etc.). A structural material (e.g. concrete) 520 is contained between layers 519 which adds strength to the central column 510. In some alternate embodiments (not shown), 510 is constructed from a single material, e.g. extruded plastic pipe, and this material can be relatively weak (compared to metal) since it is supported by associated truss structure 505. Buoyancy sponson 515 is shown to be comprised of an outer skin 508 which is constructed from a material strong in tension similar to layers 519 and its inner boundary is central column 510 outermost layer 519.

Figure 22:
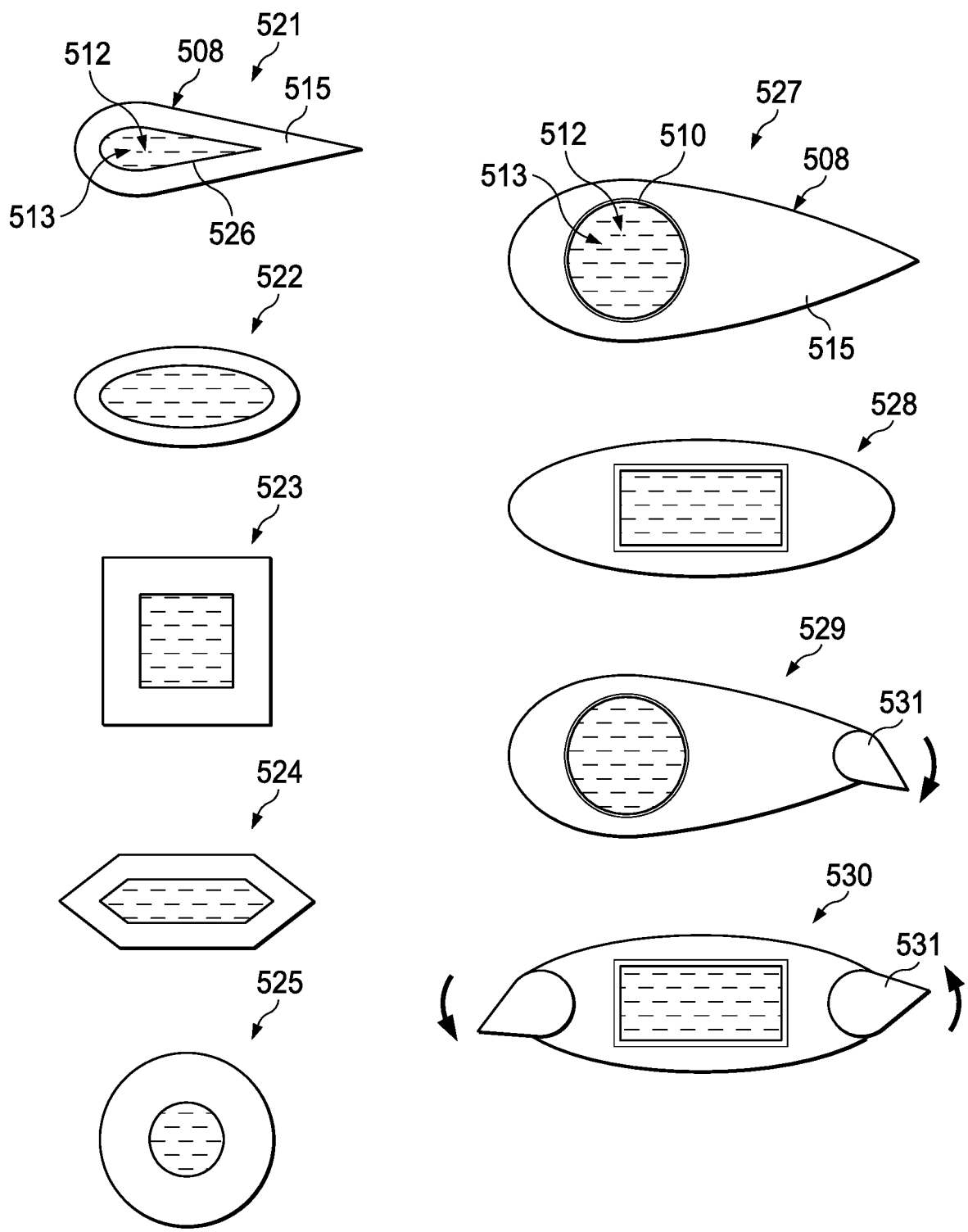
FIG. 22 depicts various cross sectional views of alternative embodiments of water column tubes.

FIG. 22 shows cross-sectional views of alternate embodiments of the current disclosure, incorporating alternate water column tubes 501, where the cross-sectional views correspond to sections of the alternate water column tubes 501 as they appear when taken across the same line 21-21 as illustrated in FIG. 19. The illustrated cross-sectional views shows some, but not all, of the tube cross-sections that characterize alternate embodiments of the current disclosure, and the scope of the present disclosure includes all such alternate embodiments.

Cross-sectional views of alternate shapes, constructions, and features are shown for the water column tube 501. Any of the embodiments taught in this disclosure, as well as others, can include water column tubes having any of these shapes, and/or any other shape.

Water column tube cross-sections 521-525, and the tubes they characterize, all share a construction style wherein the central tube chamber 512, in which slug of water 513 flows and/or oscillates, has an inner wall 526 and an outer wall 508 constructed from a material which is strong in tension. Both walls 526 and 508 may have a similar shape. Void 515 between walls 526 and 508 can be filled with a material denser than water, lighter than water, water, or air.

Water column tube cross-section 521, and the tube it characterizes, is an elongated shape with a blunt end (on the left) and a fine tail at the opposite side (on the right), and being approximately symmetrical about only one axis and/or vertical plane.

Water column tube cross-section 522, and the tube it characterizes, is an elongated shape with two blunt ends at opposing sides, and being approximately symmetric about two axes.

Water column tube cross-section 523, and the tube it characterizes, is a four-sided polygon, and being approximately symmetric about at least two axes.

Water column tube cross-section 524, and the tube it characterizes, is an n-sided polygon with sides of arbitrary length that may or may not exhibit symmetry about any axis.

Water column tube cross-section 525, and the tube it characterizes, is circle which exhibits radial symmetry about its center.

Water column tube cross-sections 527-530, and the tubes they characterize, all share a construction style wherein the central void 512, in which mass of water 513 moves and/or oscillates, is formed by a composite inner tube 510 similar to 510 and an outer wall 508 of the illustration in FIG. 21, and constructed from a material which is strong in tension. Inner tube 510 may not be the same shape as outer wall 508. Chamber 515 between walls 510 and 508 can be filled with a material denser than water, lighter than water, water, or air.

Water column tube cross-section 527, and the tube it characterizes, is a teardrop shape (i.e. airfoil, aerodynamic, or hydrodynamically shaped). Its inner tube has a circular shape.

Water column tube cross-section 528, and the tube it characterizes, is an oval shape with two blunt ends at opposing sides, symmetric about two axes. Water column tube 528 has an inner tube which is rectangular in shape.

Water column tube cross-section 529, and the tube it characterizes, is a wing shape (i.e. one broad end tapering to a narrow end). The narrow end is an articulating flap 531 which can direct air or water flow in a direction other than along the primary long axis of shape 529.

Water column tube cross-section 530, and the tube it characterizes, is an oblong rounded shape with rudder features 531 at each end of its long axis.

Figure 23:
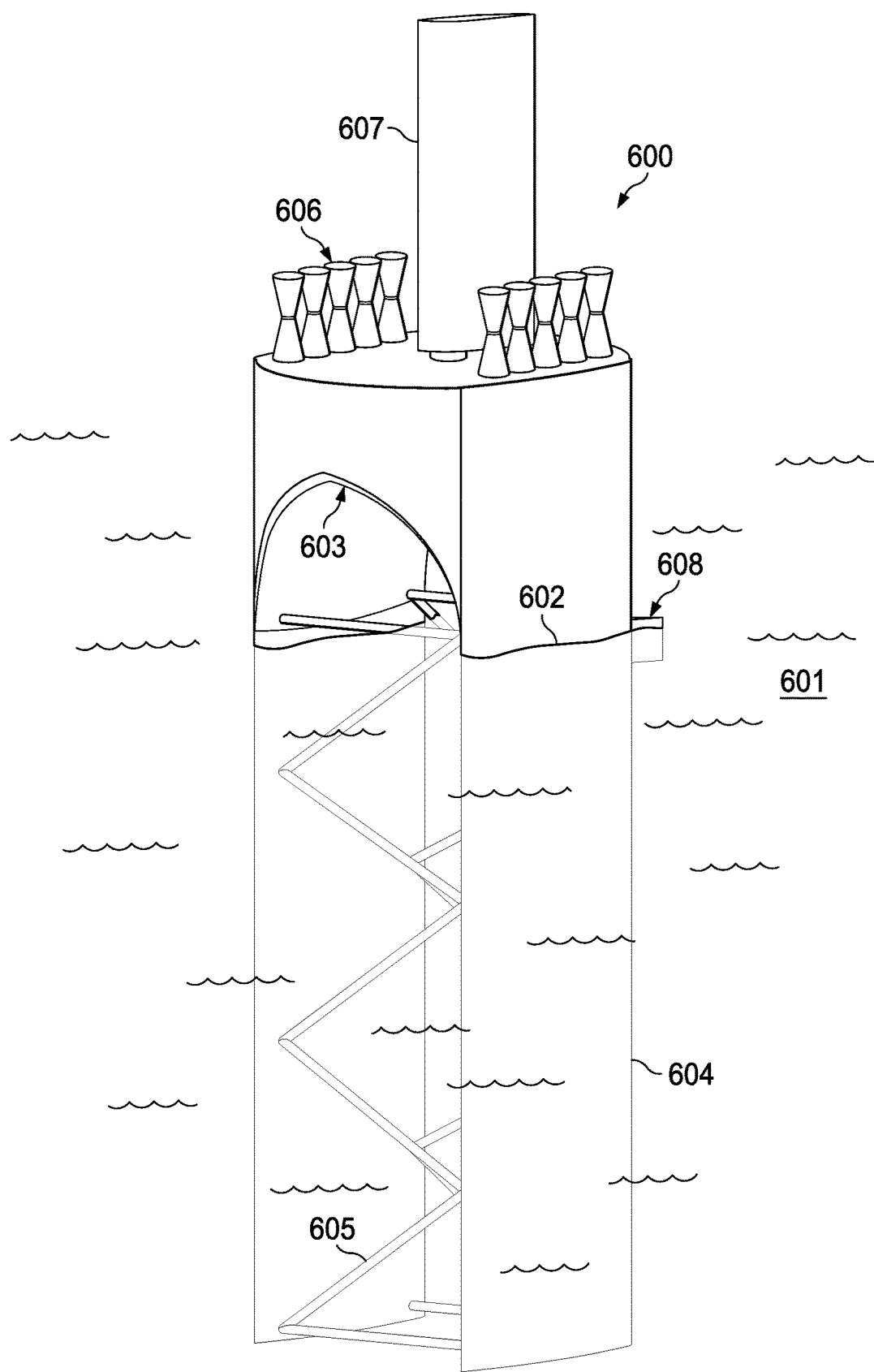
FIG. 23 is a perspective schematic view of another embodiment of the present invention.

FIG. 23 shows a perspective view of an embodiment of the current disclosure.

IWC 600 is floating in a body of water 601 with waterline 602. IWC 600 is comprised of a continuous body which can be described as having two primary structural features: flotation structure (or buoy) 603 and two elongated water column pylons 604. Water column pylons 604 are similar in construction and function to water column tube 104 in embodiment 100 of FIGS. 1-6. Flotation structure 603 has a flat upper deck with an arched underside profile. The arched underside profile allows the waterplane area of the flotation structure to decrease as it is deballasted out of, and/or above, the water. Water column pylons 604 are braced together with structural members 605, arranged to form a truss. It will be shown in FIG. 26 that the elongated water column pylons 604 each contain five individual and separate vertical tubular chambers, each with its own oscillating volume and/or column of water.

Pneumatic power take-off assemblies (PTOs) 606 are installed over each respective hollow central tube contained within water column pylons 604. A rotatable foil-shaped mast 607 is installed on the top deck of flotation structure 603, allowing IWC 600 to harness ambient wind energy in order to create a thrust vector which can linearly or rotationally accelerate IWC 600 along the surface of water 601. Maneuverable rudders 608 also provide directional authority to IWC 600. The elongated shape of pylons 604 also provide directional stability to IWC 600, acting individually, and together, in a manner similar to that of the keel of a sailboat.

Figure 24:
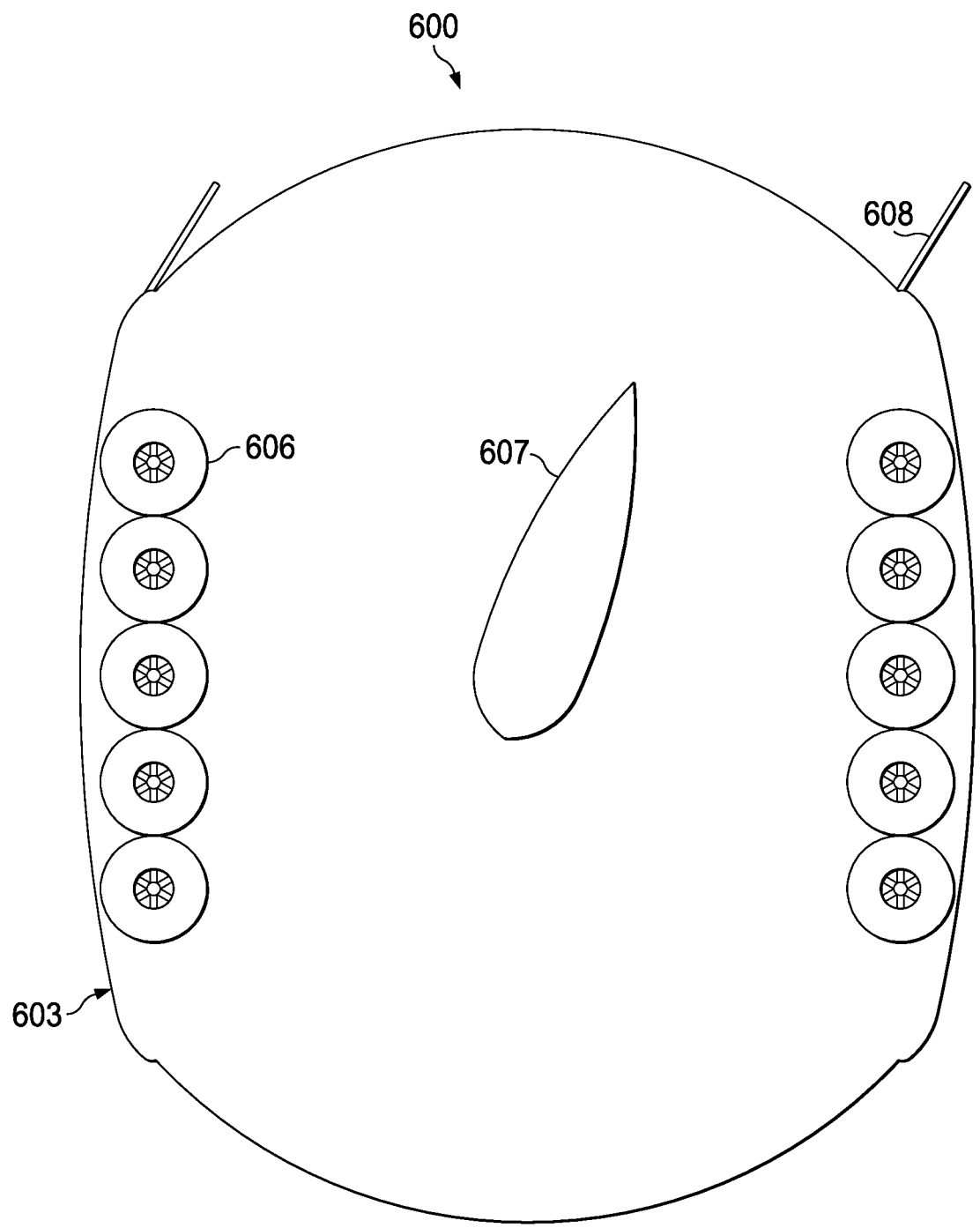
FIG. 24 is a top view of the embodiment of FIG. 23.

FIG. 24 shows a top-down view of the same embodiment of the current disclosure that is illustrated in FIG. 23.

Teardrop shaped rigid sail 607 is shown rotated to an angle of attack with respect to the wind (not shown) on the top deck of flotation structure 603. Rudders 608 are also shown angled so as to provide a yawing moment to IWC 600. Two rows of pneumatic power take-off assemblies (PTOs) 606 pass through and above the top deck of flotation structure 603.

Figure 25:
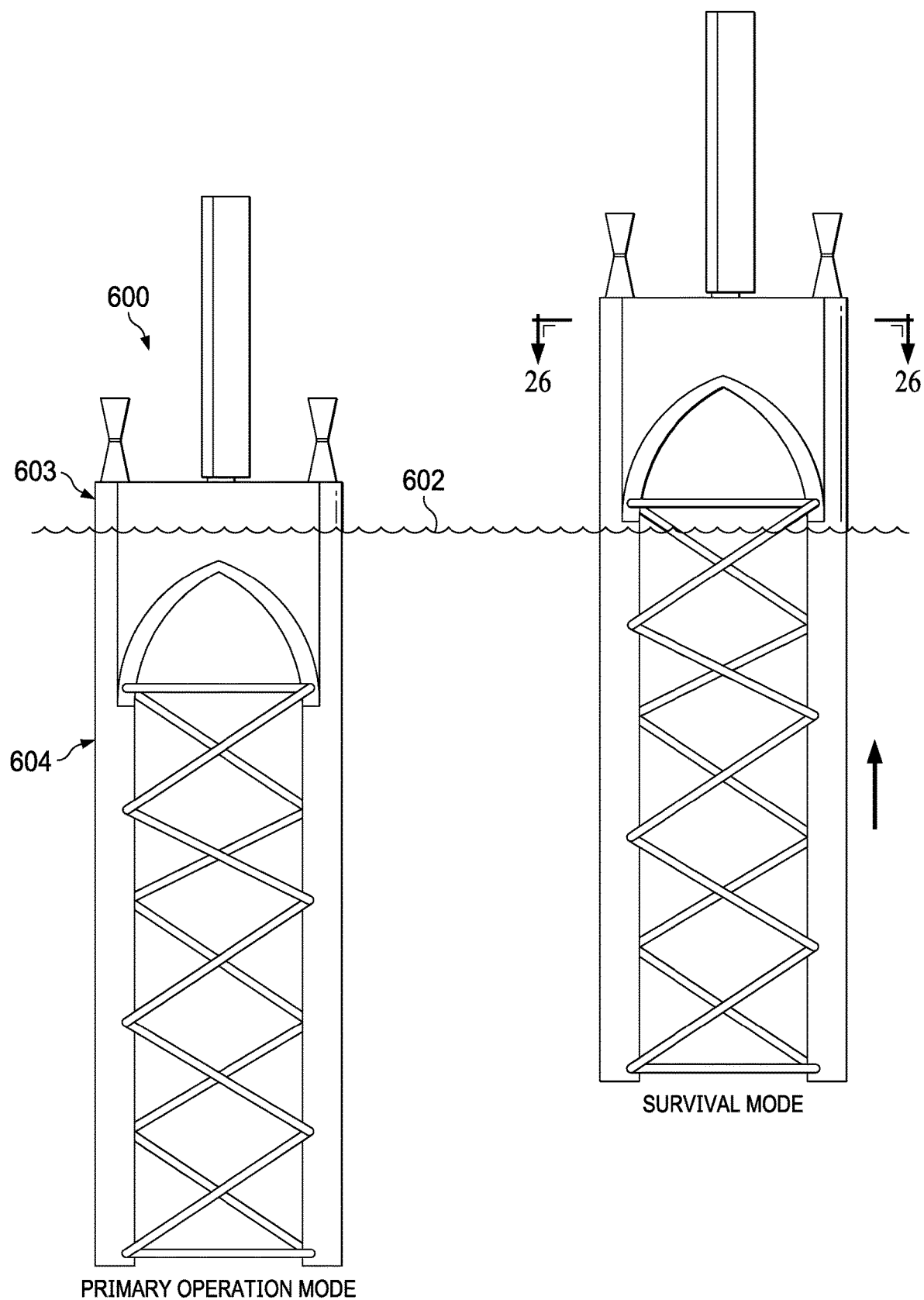
FIG. 25 depicts side views of the embodiment of FIG. 23 is operation mode and survival mode.

FIG. 25 shows a profile view of the same embodiment of the current disclosure that is illustrated in FIGS. 23 and 24.

Two modes and/or operational configurations of IWC 600 are shown. The configuration illustrated on the left side of FIG. 25 illustrates the "primary operational mode" of the embodiment, and has the primary flotation buoy structure 603 intersected by surrounding body of water surface 602. This condition is achieved by containing and/or incorporating ballast water in primary floatation buoy structure 603 and within closed voids in pylons 604.

However, when wave conditions exceed a predetermined threshold, ballast water is passively or actively removed from primary flotation buoy structure 603 and pylons 604. This behavior decreases the weight of IWC 600 and allows it to have more of its structure protruding from and/or above the surface 602 of the body of water on which the embodiment floats such that it intersects pylons 604 thereby significantly decreasing the waterplane area of the embodiment. This configuration, illustrated on the right side of FIG. 25, is referred to as "survival mode" or "deballasted mode."

Figure 26:
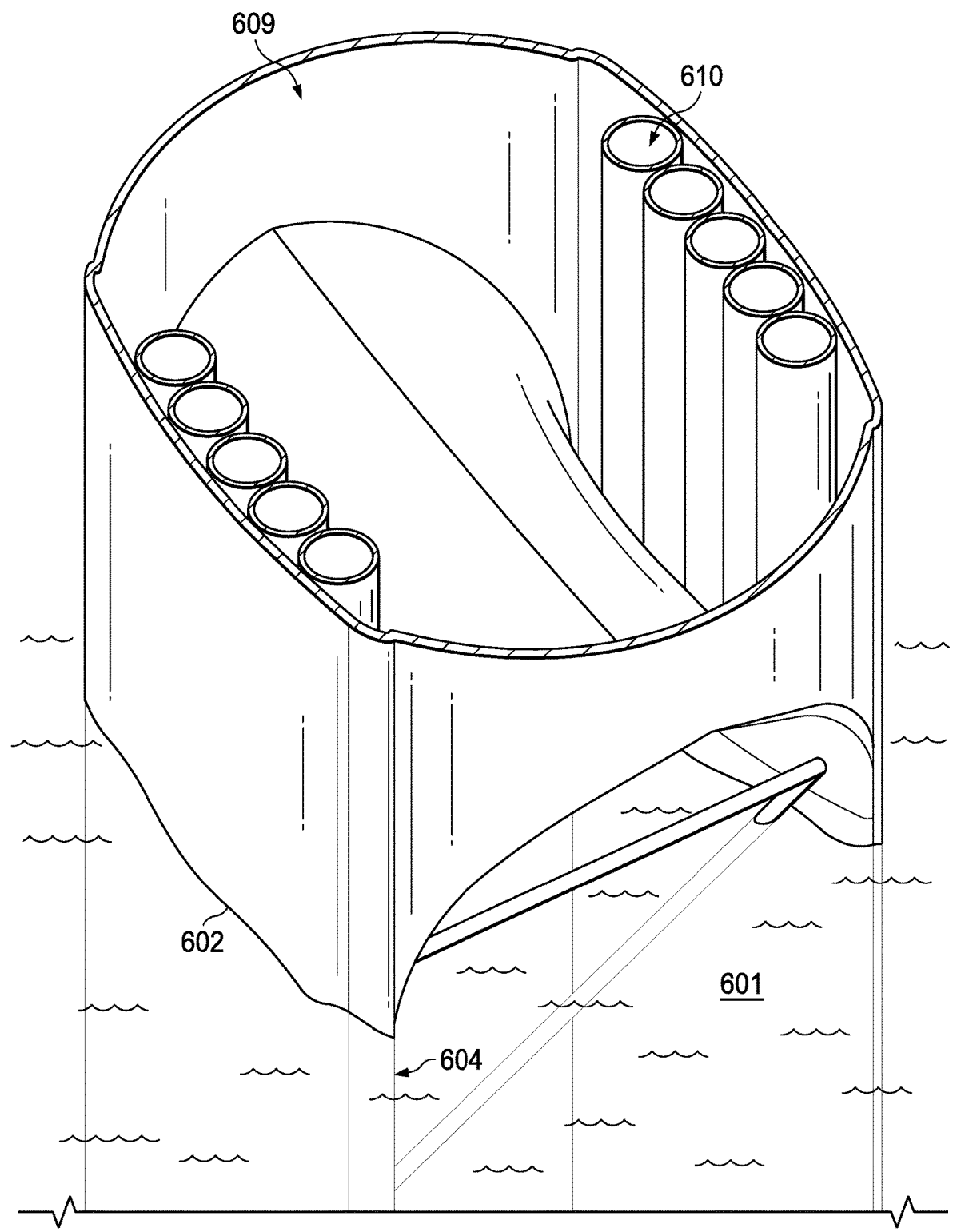
FIG. 26 is a downward cross sectional view of the embodiment of FIG. 23 taken along line 26-26.

FIG. 26 shows a cross-sectional view of the same embodiment of the current disclosure that is illustrated in FIGS. 23-25, with the sectional plane of illustration in FIG. 26 taken across line 26-26 in FIG. 25.

IWC 600 is shown in "survival mode" with the surface 602 of body of water 601 intersecting pylons 604. This higher freeboard is achieved by evacuating some or all of the ballast water which may be contained within the buoyancy chamber of flotation structure 609. Also shown are the oscillating water column chambers 610 which extend up to a respective pneumatic power take-off assembly (606 in FIGS. 23 and 24) and down and out the bottom of each pylon 604 where they allow water to freely flow in and out of each respective tube from and to, respectively, the body of water 601 on which the embodiment floats.

Figure 27:
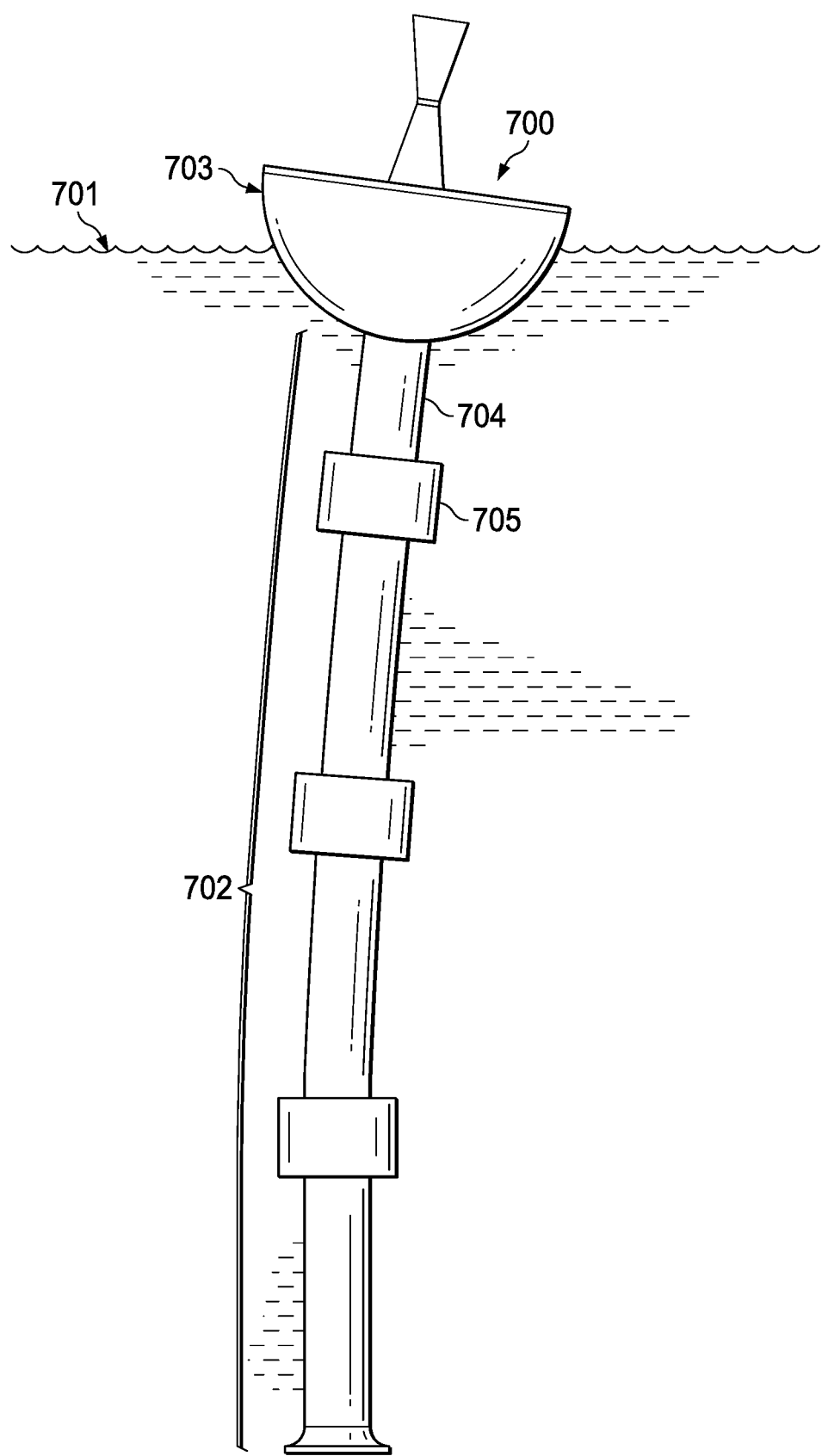
FIG. 27 is a perspective schematic view of another embodiment of the present invention.

FIG. 27 shows a profile view of an embodiment of the current disclosure.

IWC 700 is floating in body of water 701 and is similar in form, function, and behavior to IWC 200 in FIGS. 7-11. The primary difference is that water column tube 702 is comprised of sections 704, connected by elastomeric links 705. This sectional construction allows water column tube 702 to bend conformally when its upper sections and flotation module 703 are accelerated translationally/horizontally by wave forces.

Figure 28:
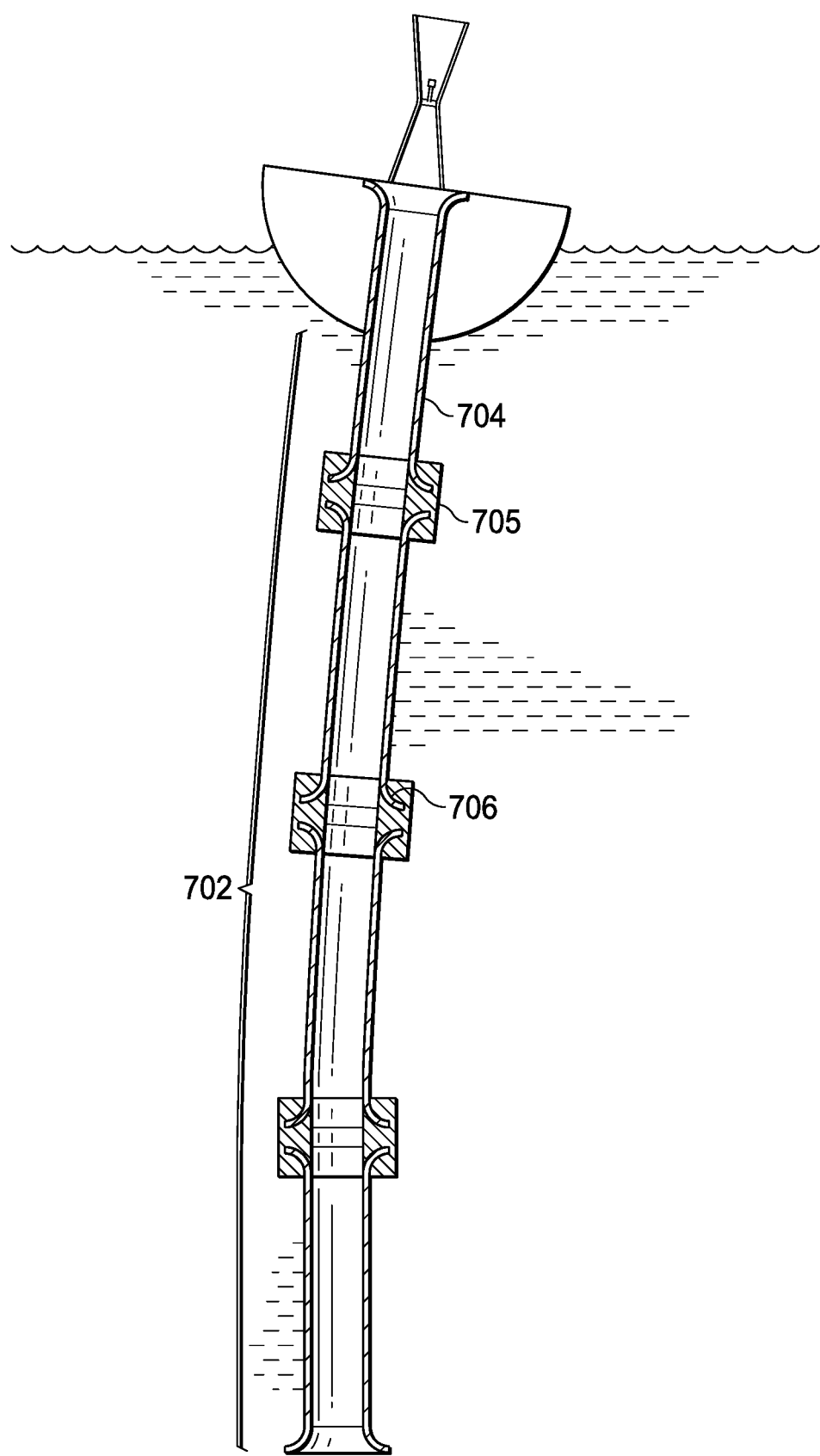
FIG. 28 is a cross sectional view of the embodiment of FIG. 27.

FIG. 28 shows a profile sectional and/or cut-away view of same embodiment of the current disclosure that is illustrated in FIG. 27.

Sections 704 comprising water column tube 702 have flared ends 706. These flared ends allow elastomeric links 705 to be clamped around and/or cast around the ends of respective sections 704, thereby coupling the sections together.

Figure 29:
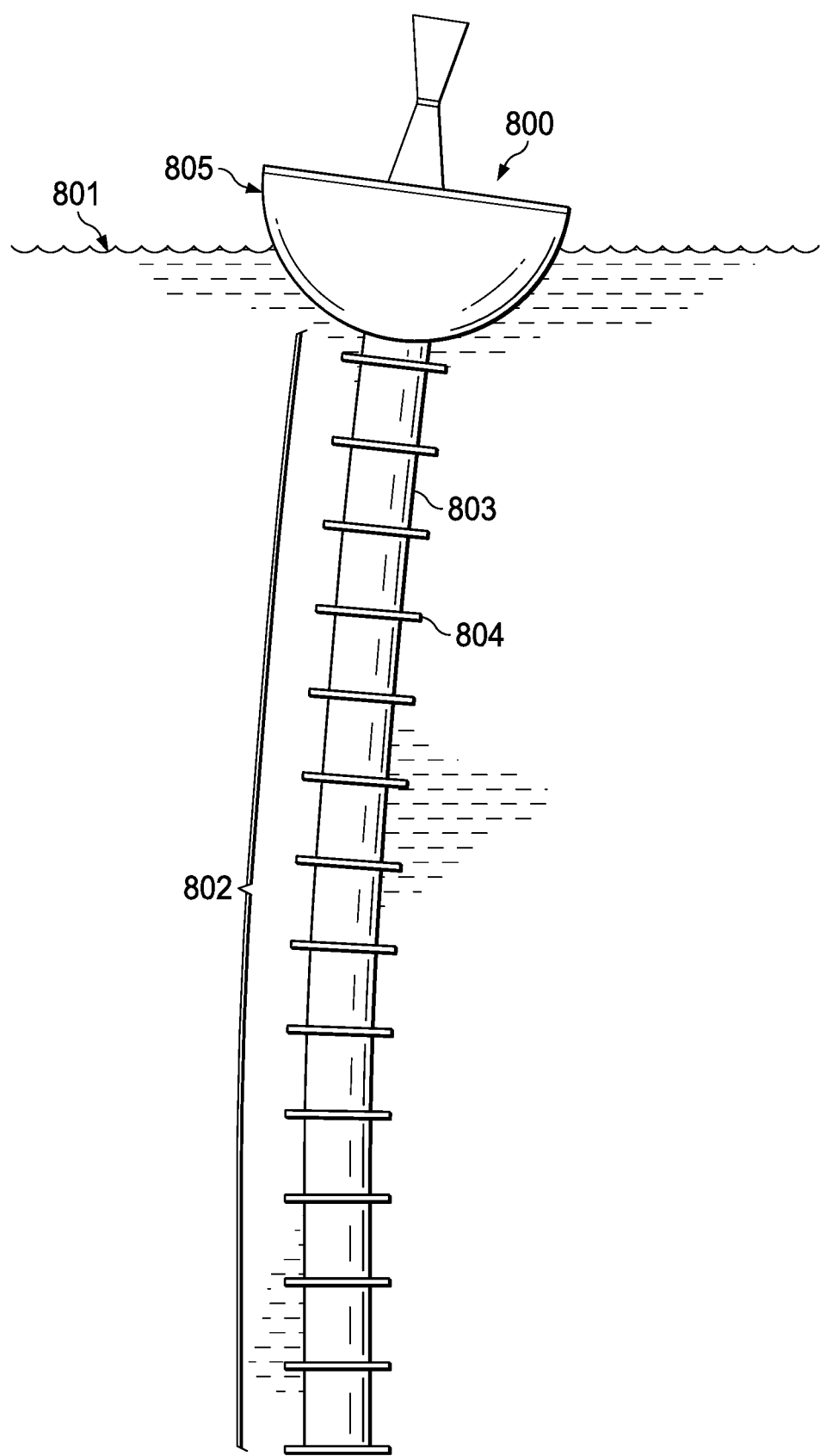
FIG. 29 is a perspective schematic view of another embodiment of the present invention.

FIG. 29 shows a profile view of an embodiment of the current disclosure.

IWC 800 is floating in body of water 801 and is similar in form, function, and behavior to IWC 200 of FIGS. 7-11. The primary difference is that water column tube 802 is comprised of a flexible central tube 803 (e.g. constructed from an elastomer, polymer, fabric, net, etc.) and is kept round by stiffening rings 804. The stiffening rings 804 prevent the flexible tube from collapsing inward due to pressure differentials between the inside and outside of water column tube 802. Stiffening rings 804 would be constructed of a stiff material such as steel, aluminum, PEEK, etc. Constructing the water column tube from flexible materials and sectional stiffeners allows water column tube 802 to bend conformally when its upper portion and flotation module 805 are accelerated translationally by wave forces.

Figure 30:
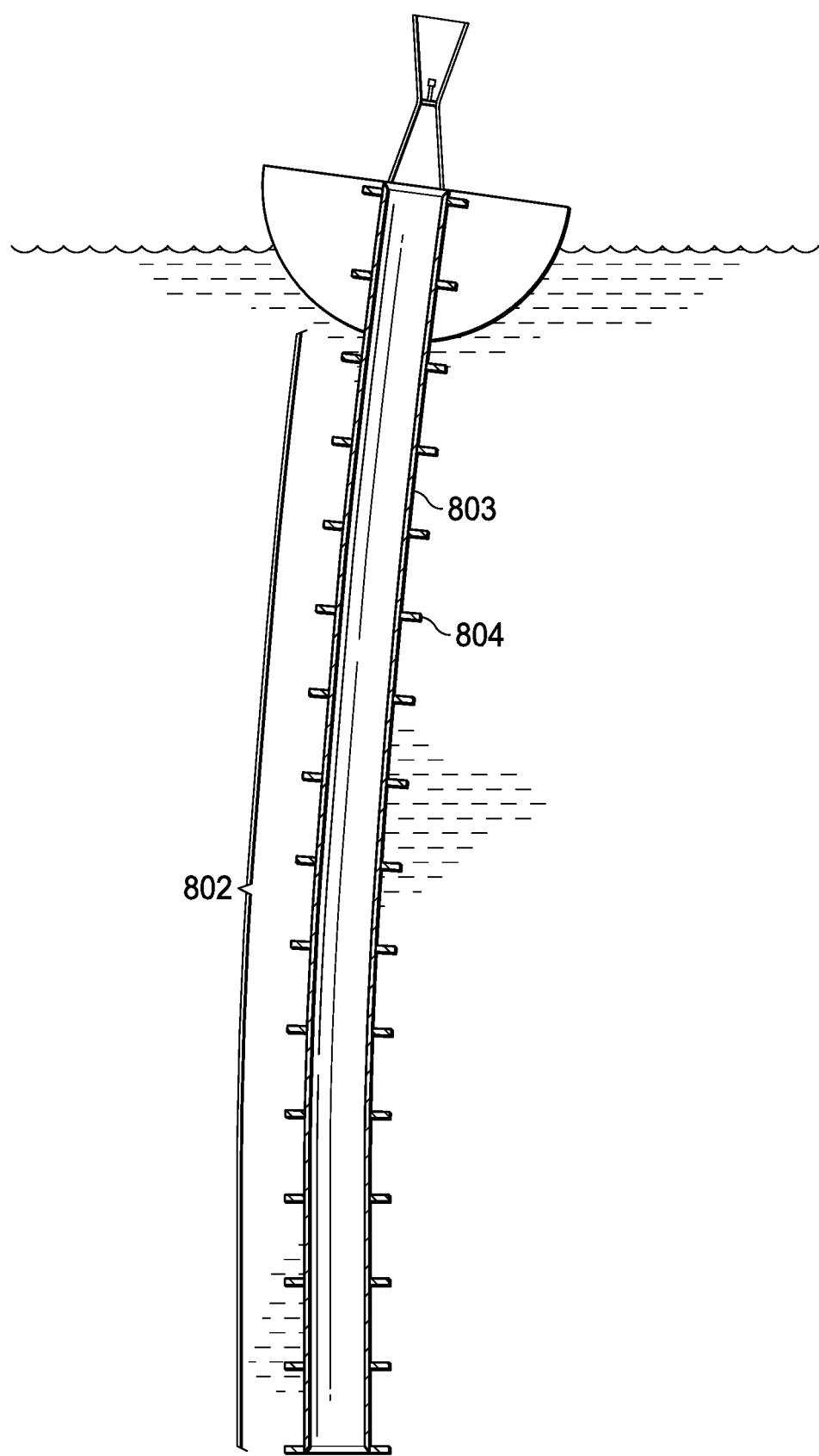
FIG. 30 is a cross sectional view of the embodiment of FIG. 29.

FIG. 30 shows a profile cut-away and/or sectional view of the same embodiment of the current disclosure that is illustrated in FIG. 29.

Stiffening rings 804 are shown to exist on the exterior of flexible central tube 803 comprising water column tube 802.

Figure 31:
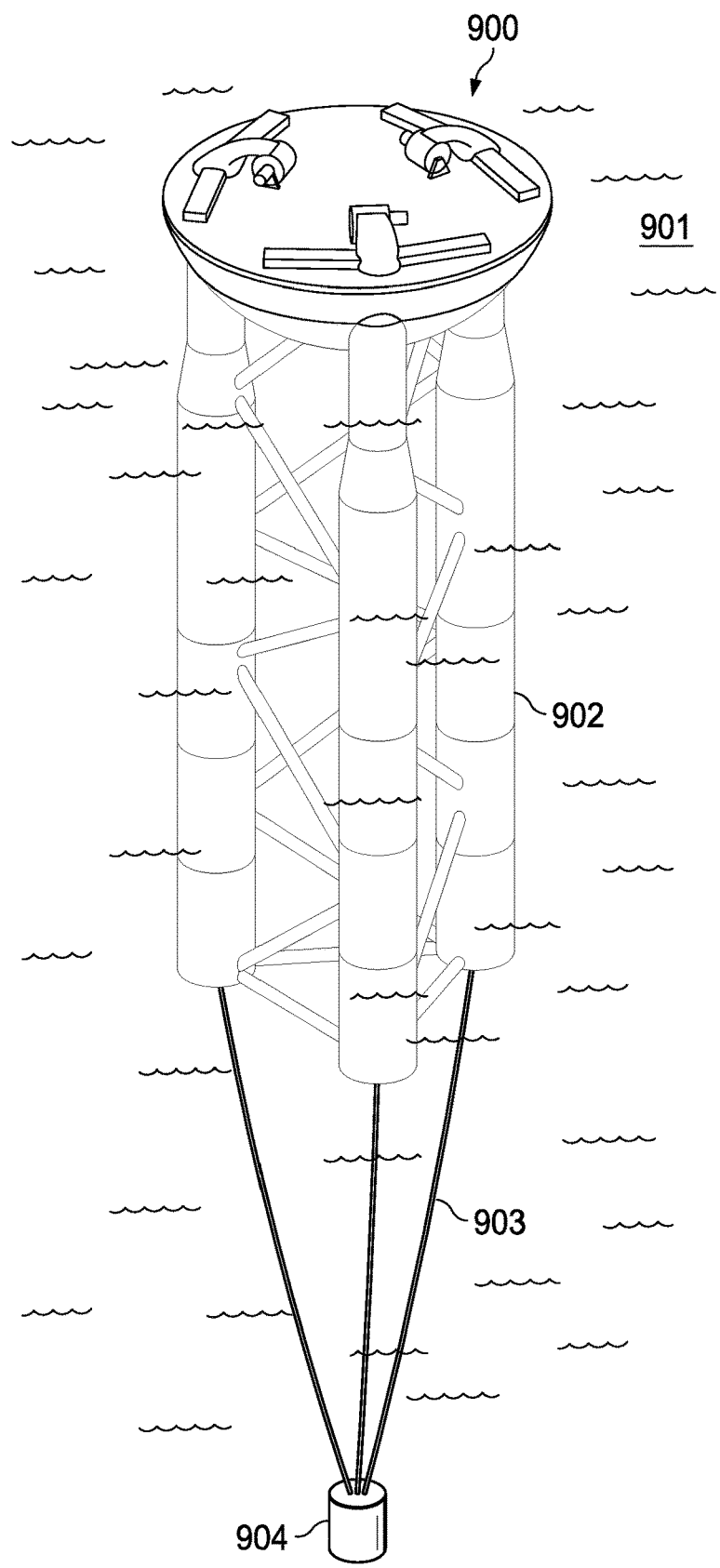
FIG. 31 is a perspective schematic view of another embodiment of the present invention.

FIG. 31 shows a perspective view of an embodiment of the current disclosure.

IWC 900 is floating in a body of water 901 with water column pylons 902 extending beneath the water surface. Flexible connecting members 903 are attached to each of the pylons 902 and are all connected to weight 904. Weight 904 is of a substantial mass and provides a restoring torque to IWC 900 whenever IWC 900 pitches or rolls in body of water 901.

Figure 32:
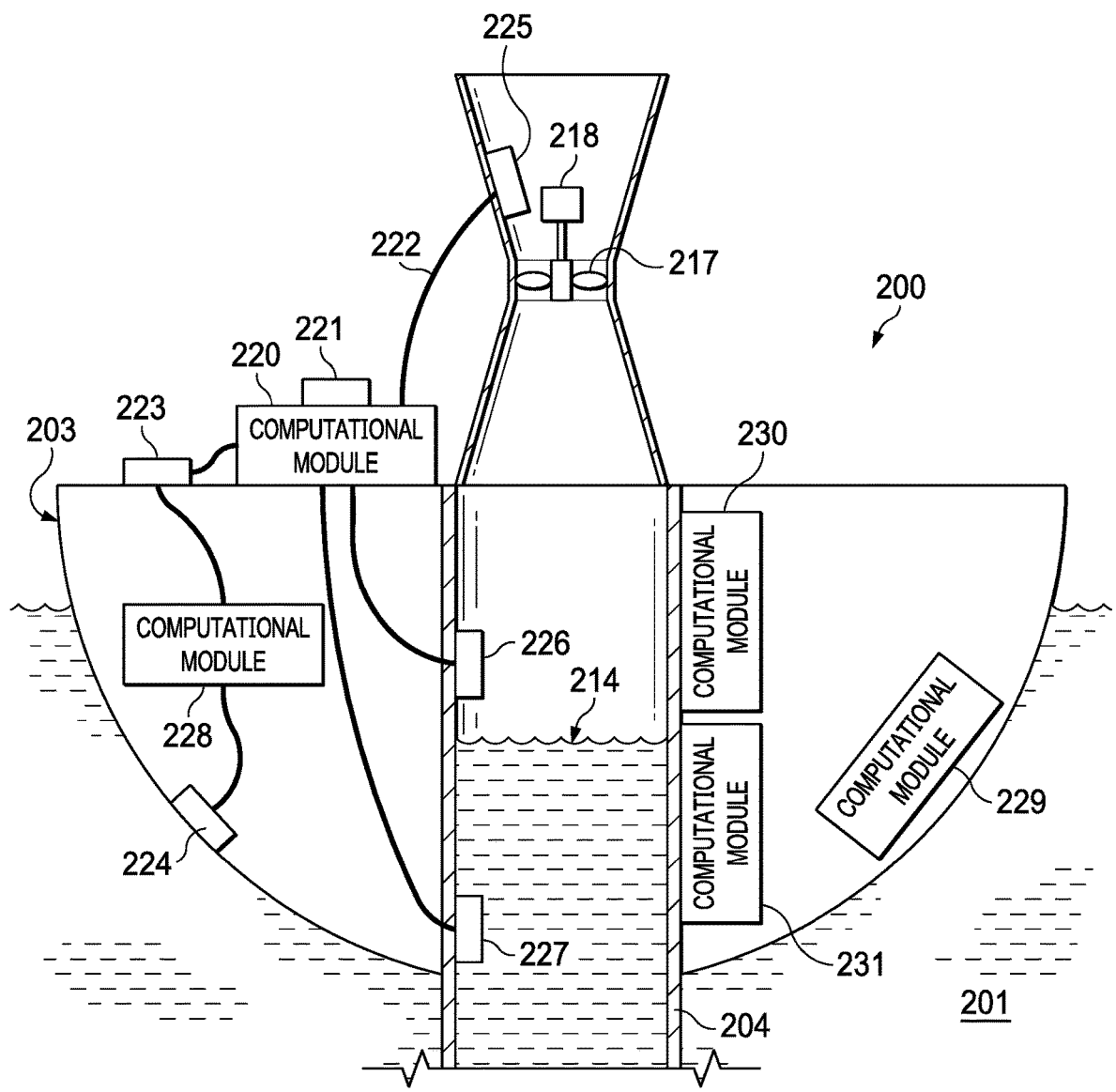
FIG. 32 is a cross sectional schematic view of another embodiment of the present invention.

FIG. 32 shows a profile cut-away view of the same embodiment IWC 200 of the current disclosure illustrated in FIGS. 7-11.

A simplified cut-away diagram of IWC 200 of FIGS. 7-11 is shown floating in body of water 201. IWC 200 is operating in such a way that the waterline 214 within central column 204 is below the surface of body of water 201, as described in FIG. 8.

Computational modules 220, 228-231 may be installed on the deck of flotation module 203 or inside that flotation structure 203. Computational modules 220, 228-231 may receive electrical power from electricity generated by turbine 217 driving generator 218. Computational modules 220, 228-231 contain one or more computational processing nodes (CPU, GPU, TPU, ASIC, etc.) and may utilize cooling by exposure to ambient or forced air, conductive cooling through a solid-state heat sink, or fluidic cooling with passive or pumped fluid conducting heat away to a remote heat sink.

Computational module 220 is cooled, at least in part, by an external radiator 221 attached directly to the module structure. Computational modules 220 and 228 are cooled, at least in part, by remotely positioned external radiators 223-225 in which heat is transmitted to the radiators by means of piping/hoses, e.g., 222. Remote radiators may be located on an exterior surface 223 of the IWC 200 (exposed to ambient air/wind), on an interior structure or surface 224 of the flotation module 203 (utilizing the hull as a heat sink), inside of the PTO air flow path 225, and/or inside of the water column chamber 204 (exposed to moving air 226 and/or moving water 227 and/or both).

Multiple computational modules (e.g. 228 and 220) may share a heat dissipation path and/or radiator (e.g. 223).

Computational modules 229-231 are mounted directly to a structure and/or surface of IWC 200 so as to directly conduct heat away from the modules. Computational modules 230 and 231 are mounted to, on, and/or against, the central water column structure 204 above or below (e.g. 230/231) the waterline 214 inside the water column. Computational module 229 is mounted to an interior structure and/or surface of flotation module 203. In some embodiments, only one of the above described heat dissipation paths or heat exchange locations is used. In some embodiments, multiple heat dissipation paths or heat exchange locations are used.

Figure 33:
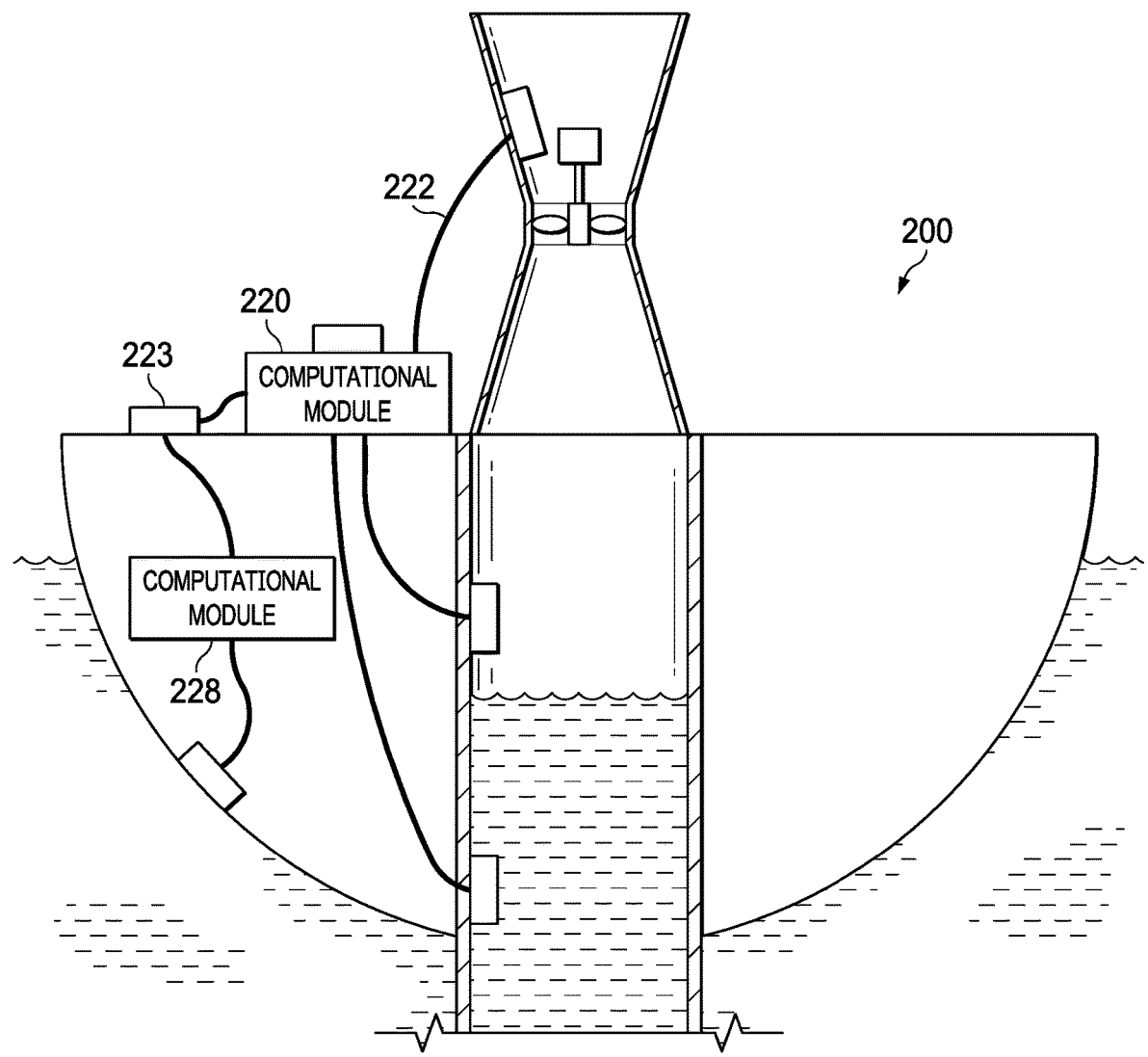
FIG. 33 is a cross sectional view of the embodiment of FIG. 32 with different heat dissipation paths.

FIG. 33 shows a profile cut-away view of the same embodiment IWC 200 of the current disclosure illustrated in FIGS. 7-11.

A simplified cut-away diagram of IWC 200 of FIGS. 7-11 is shown floating in body of water 201. IWC 200 is operating in such a way that the waterline 214 within central column 204 is below the surface of body of water 201, as described in FIG. 8.

FIG. 33 illustrates a configuration of embodiment 200 that incorporates two computational modules that utilize independent heat dissipation paths (e.g., 222), and that incorporates two computational modules 220 and 228 that share a heat dissipation path and/or radiator 223.

Figure 34:
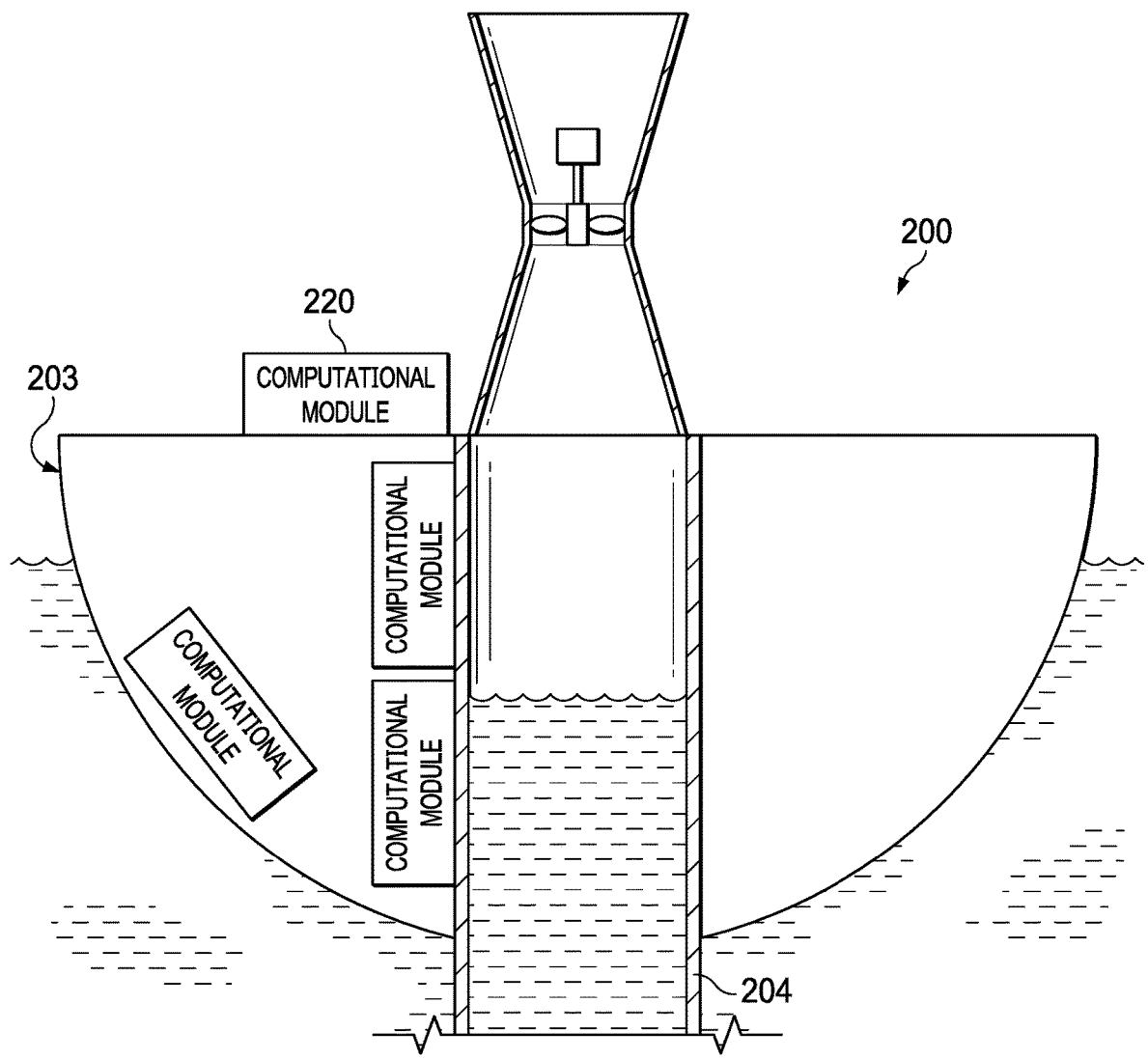
FIG. 34 is a cross sectional view of the embodiment of FIG. 32 with another different heat dissipation path.

FIG. 34 shows a profile cut-away view of the same embodiment IWC 200 of the current disclosure illustrated in FIGS. 7-11.

A simplified cut-away diagram of IWC 200 of FIGS. 7-11 is shown floating in body of water 201. IWC 200 is operating in such a way that the waterline 214 within central column 204 is below the surface of body of water 201, as described in FIG. 8.

FIG. 34 illustrates a configuration of embodiment 200 that incorporates four computational modules, e.g., 220, that utilize only conductive heat dissipation achieved directly and/or indirectly to the atmosphere and/or to the structure of the embodiment, e.g., to the walls of the buoy 203 and/or to the walls of the water column 204.

Figure 35:
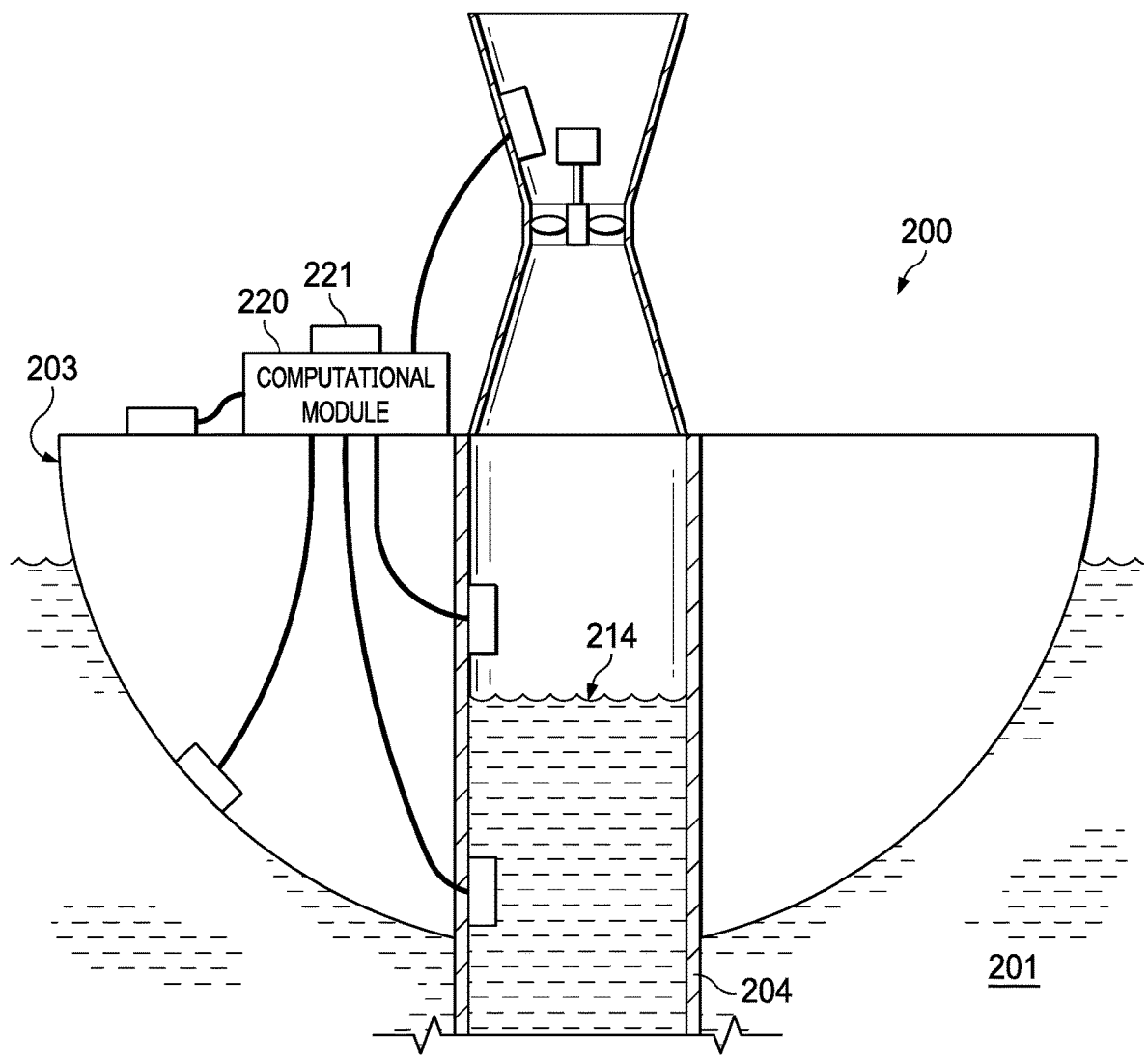
FIG. 35 is another variation of the embodiment of FIG. 32.

FIG. 35 shows a profile cut-away view of the same embodiment IWC 200 of the current disclosure illustrated in FIGS. 7-11.

A simplified cut-away diagram of IWC 200 of FIGS. 7-11 is shown floating in body of water 201. IWC 200 is operating in such a way that the waterline 214 within central column 204 is below the surface of body of water 201, as described in FIG. 8.

FIG. 35 illustrates a configuration of embodiment 200 that incorporates only a single and/or consolidated computational module 220 that utilizes a variety of heat dissipation mechanisms including direct conduction of heat to the structure of the embodiment (e.g., at and/or to the upper deck of the flotation module 203), and the exchange and/or radiation of heat by and/or through directly mounted 221 and remote radiators.

The scope of the present disclosure includes all computational module heat dissipation designs, architectures, mechanisms, methods, schemes, and/or systems, including, but not limited to, those involving phase-changing materials, fans, pumps, and two- or multi-stage heat exchangers.

We claim:

1. A reciprocating wave-to-electricity energy converter, comprising:
    an adjustably buoyant flotation structure adapted to float on a surface of a body of water,
    the adjustably buoyant flotation structure comprising a ballast compartment;
    a columnar body extending below the adjustably buoyant flotation structure, the columnar body defining a water chamber having a water inlet at an open lower end, the columnar body and the ballast compartment fluidly coupled by a valve that adjusts a water level in the ballast compartment by opening when a specified pressure in the columnar body is reached;

a turbine disposed at an upper end of the water chamber, the turbine driven by air moved by an oscillating column of water within the water chamber; and a generator coupled to the turbine for converting turbine rotation to electricity.

2. The reciprocating wave-to-electricity energy converter of claim 1, wherein the adjustably buoyant flotation structure has a bottom taper for decreasing a waterplane area of the adjustably buoyant flotation structure when water is removed from the ballast compartment.

3. The reciprocating wave-to-energy converter of claim 2, wherein the bottom taper is spherical cap shaped.

4. The reciprocating wave-to-energy converter of claim 2, wherein the bottom taper is frusto conical.

5. The reciprocating wave-to-electricity energy converter of claim 1, further comprising a valve at an upper end of the water chamber for regulating an air flow entering the water chamber.

6. The reciprocating wave-to-electricity energy converter of claim 5, wherein the valve is a one way valve.

7. The reciprocating wave-to-electricity energy converter of claim 6, wherein the one way valve preferentially admits air into the water chamber and the turbine preferentially rotates when air is expelled from the water chamber.

8. The reciprocating wave-to-electricity energy converter of claim 1, further comprising a valve at an upper end of the water chamber for regulating an air flow exiting the water chamber.

9. The reciprocating wave-to-electricity energy converter of claim 8, wherein the valve is a one way valve.

10. The reciprocating wave-to-electricity energy converter of claim 9, wherein the one way valve preferentially allows air to pass out of the water chamber and the turbine preferentially rotates when air enters the water chamber.

11. The reciprocating wave-to-electricity energy converter of claim 1, further comprising a water jacket around the columnar body.

12. The reciprocating wave-to-electricity energy converter of claim 1, wherein the water chamber narrows proximate to an upper end.

13. The reciprocating wave-to-electricity energy converter of claim 12, wherein the turbine is disposed in a narrowed portion of the water chamber.

14. The reciprocating wave-to-electricity energy converter of claim 1, wherein a portion of the air moved by the oscillating column of water is deflected by a deflector to propel the wave-to-electricity energy converter.

15. The reciprocating wave-to-electricity energy converter of claim 1, wherein the columnar body has a profile with a hydrodynamic drag that is less than that characteristic of a columnar body having a circular profile.

16. The reciprocating wave-to-electricity energy converter of claim 1, wherein the columnar body is flexible.

17. The reciprocating wave-to-electricity energy converter of claim 1, wherein the electricity is consumed at the reciprocating wave-to-electricity energy converter.

18. The reciprocating wave-to-electricity energy converter of claim 17, wherein the electricity is used to power a plurality of mutually networked computers.

19. The reciprocating wave-to-electricity energy converter of claim 18, wherein the plurality of mutually networked computers is cooled by transferring heat to the body of water.

20. The reciprocating wave-to-electricity energy converter of claim 1, further comprising a sail on the adjustably buoyant flotation structure.

21. The reciprocating wave-to-energy converter of claim 1, further comprising a check valve in the water chamber for regulating an air pressure in the water chamber.

22. The reciprocating wave-to-energy converter of claim 21, wherein the check valve at least partially controls a buoyancy of the adjustably buoyant flotation structure.

23. The reciprocating wave-to-electricity energy converter of claim 1, wherein a product of a volume of the internal ballast cavity and a density of seawater is greater than a dry mass of the converter.

24. The reciprocating wave-to-electricity energy converter of claim 1, further including bulkheads for dividing the internal ballast cavity into a plurality of sub-compartments.

25. A reciprocating wave-to-electricity energy converter, comprising:

a flotation structure adapted to float on a surface of a body of water;

a plurality of columnar bodies extending below the flotation structure, the columnar bodies each including a partially-filled water chamber having an open bottom end below the surface of the body of water and an upper end above the surface of the body of water;

a turbine disposed at the flotation structure and driven by air flow produced by water movement within at least one of the water chambers; and a generator coupled to the turbine for converting turbine rotation to electricity.

* * * * *